United States Patent
Tian et al.

(10) Patent No.: US 12,245,228 B2
(45) Date of Patent: Mar. 4, 2025

(54) SEMI-PERSISTENT SCHEDULING AND CONFIGURED GRANTS CONFIGURING BURSTS OF MULTIPLE TRANSMISSION OPPORTUNITIES

(71) Applicant: QUALCOMM Incorporated, San Diego, CA (US)

(72) Inventors: Qingjiang Tian, San Diego, CA (US); Mostafa Khoshnevisan, San Diego, CA (US); Jing Sun, San Diego, CA (US); Xiaoxia Zhang, San Diego, CA (US); Ahmed Abdelaziz Ibrahim Abdelaziz Zewail, San Diego, CA (US); Zhifei Fan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 17/545,334

(22) Filed: Dec. 8, 2021

(65) Prior Publication Data
US 2023/0180228 A1    Jun. 8, 2023

(51) Int. Cl.
*H04W 72/1273* (2023.01)
*H04W 72/0446* (2023.01)
*H04W 72/23* (2023.01)
*H04W 76/30* (2018.01)

(52) U.S. Cl.
CPC ... *H04W 72/1273* (2013.01); *H04W 72/0446* (2013.01); *H04W 72/23* (2023.01); *H04W 76/30* (2018.02)

(58) Field of Classification Search
CPC ......... H04W 72/1273; H04W 72/0446; H04W 72/23; H04W 76/30; H04W 72/11
See application file for complete search history.

(56) References Cited

U.S. PATENT DOCUMENTS

| | | | |
|---|---|---|---|
| 2019/0052420 A1 | 2/2019 | Manolakos et al. | |
| 2020/0374089 A1* | 11/2020 | Yang | H04L 1/1854 |
| 2022/0149997 A1* | 5/2022 | Wang | H04L 1/1864 |
| 2022/0217756 A1 | 7/2022 | Wu et al. | |
| 2023/0081792 A1* | 3/2023 | Kim | H04L 5/0053 370/329 |
| 2023/0179460 A1 | 6/2023 | Tian et al. | |
| 2023/0319822 A1* | 10/2023 | Park | H04W 72/232 370/329 |

* cited by examiner

*Primary Examiner* — Basil Ma
(74) *Attorney, Agent, or Firm* — Holland & Hart LLP

(57) ABSTRACT

Methods, systems, and devices for wireless communications are described. A wireless device such as a user equipment (UE) may receive, from a scheduling device such as a base station, control signaling which indicates a semi-persistent scheduling (SPS) configuration scheduling a burst of multiple downlink shared channel transmission opportunities during an SPS interval. Based on receiving the SPS configuration, the UE may receive downlink signaling from the base station in a downlink shared channel transmission opportunity of the SPS interval. In some other aspects, a UE may receive control signaling which indicates a configured grant (CG) that schedules a burst of multiple uplink shared channel transmission opportunities during a CG timing interval. Based on receiving the CG, the UE may transmit uplink signaling to the base station in an uplink shared channel transmission opportunity indicated by the CG.

30 Claims, 22 Drawing Sheets

SEMI-PERSISTENT SCHEDULING AND CONFIGURED GRANTS CONFIGURING BURSTS OF MULTIPLE TRANSMISSION OPPORTUNITIES

FIELD OF TECHNOLOGY

The following relates to wireless communications, including semi-persistent scheduling (SPS) and configured grants (CGs) configuring bursts of multiple transmission opportunities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications in relatively high frequency bands (e.g., frequency bands used in 5G or other wireless communications systems) may offer increased throughput. In some cases, however, such high frequency communications may be associated with increased propagation loss, increased signaling overhead, or both relative to communications in lower frequency bands. UEs and base stations operating in relatively high frequency bands may use a number of techniques to reduce control signaling overhead, which may negatively affect channel reliability.

SUMMARY

The described techniques relate to improved methods, systems, devices, and apparatuses that support semi-persistent scheduling (SPS) and configured grants (CGs) configuring bursts of multiple transmission opportunities. Some wireless communications systems may support relatively high frequency communications (e.g., communications in frequency range 4 (FR4) or other frequencies above a threshold) to increase wireless coverage and throughput. To reduce signaling overhead (e.g., control signaling overhead) associated with such high frequency communications, the wireless communications system may support configuring repeated burst communications in uplink, downlink, or both. For example, a base station may configure multi-uplink shared channel signaling, multi-downlink shared channel signaling, or both, where periodic instances of multiple shared channel transmission opportunities in a burst may be scheduled without dynamic grants. For example, a base station may transmit, to a user equipment (UE), control signaling which schedules bursts of multiple downlink shared channel transmission opportunities or multiple uplink shared channel transmission opportunities in accordance with an SPS configuration or a CG configuration, respectively. Based on an SPS configuration, the UE may receive one or more downlink shared channel transmissions from the base station in each of one or more SPS intervals. Additionally or alternatively, based on a CG configuration, the UE may transmit one or more uplink shared channel transmissions in each of one or more CG intervals.

A method for wireless communications at a UE is described. The method may include receiving, from a base station, control signaling indicating an SPS configuration scheduling a burst of multiple downlink shared channel transmission opportunities within a time interval of the SPS configuration and receiving, from the base station, downlink signaling in a downlink shared channel transmission opportunity of the multiple downlink shared channel transmission opportunities in accordance with the SPS configuration.

An apparatus for wireless communications at a UE is described. The apparatus may include a processor and a memory coupled with the processor, where the memory includes instructions executable by the processor to cause the apparatus to receive, from a base station, control signaling indicating an SPS configuration scheduling a burst of multiple downlink shared channel transmission opportunities within a time interval of the SPS configuration and receive, from the base station, downlink signaling in a downlink shared channel transmission opportunity of the multiple downlink shared channel transmission opportunities in accordance with the SPS configuration.

Another apparatus for wireless communications at a UE is described. The apparatus may include means for receiving, from a base station, control signaling indicating an SPS configuration scheduling a burst of multiple downlink shared channel transmission opportunities within a time interval of the SPS configuration and means for receiving, from the base station, downlink signaling in a downlink shared channel transmission opportunity of the multiple downlink shared channel transmission opportunities in accordance with the SPS configuration.

A non-transitory computer-readable medium storing code for wireless communications at a UE is described. The code may include instructions executable by a processor to receive, from a base station, control signaling indicating an SPS configuration scheduling a burst of multiple downlink shared channel transmission opportunities within a time interval of the SPS configuration and receive, from the base station, downlink signaling in a downlink shared channel transmission opportunity of the multiple downlink shared channel transmission opportunities in accordance with the SPS configuration.

Some examples of the method, apparatuses, and non-transitory computer-readable medium described herein may further include operations, features, means, or instructions for determining a first slot index for a first downlink shared channel transmission opportunity of the multiple downlink shared channel transmission opportunities associated with a first burst of the SPS configuration and determining a second slot index for a second downlink shared channel transmission opportunity of the multiple downlink shared channel transmission opportunities associated with the first burst based on the first slot index and a start and length indicator value (SLIV) included in a time domain resource allocation (TDRA) table entry indicated by the control signaling.

Some examples of the method, apparatuses, and non-transitory computer-readable medium described herein may further include operations, features, means, or instructions for determining a first feedback process identifier associated with a first downlink shared channel transmission opportunity of the multiple downlink shared channel transmission opportunities associated with a first burst of the SPS configuration according to a formula, determining a second feedback process identifier associated with a second downlink shared channel transmission opportunity of the multiple downlink shared channel transmission opportunities associated with the first burst based on incrementing the first feedback process identifier, and determining a third feedback process identifier associated with a first downlink shared channel transmission opportunity of the multiple downlink shared channel transmission opportunities associated with a second burst of the SPS configuration according to the formula.

Some examples of the method, apparatuses, and non-transitory computer-readable medium described herein may further include operations, features, means, or instructions for determining a first feedback process identifier associated with a first downlink shared channel transmission opportunity of the multiple downlink shared channel transmission opportunities associated with a first burst of the SPS configuration according to a formula, determining a second feedback process identifier associated with a second downlink shared channel transmission opportunity of the multiple downlink shared channel transmission opportunities associated with the first burst based on incrementing the first feedback process identifier, and determining a third feedback process identifier associated with a first downlink shared channel transmission opportunity of the multiple downlink shared channel transmission opportunities associated with a second burst of the SPS configuration based on incrementing a last feedback process identifier associated with a last downlink shared channel transmission opportunity of the multiple downlink shared channel transmission opportunities associated with the first burst.

Some examples of the method, apparatuses, and non-transitory computer-readable medium described herein may further include operations, features, means, or instructions for determining a first feedback process identifier associated with a first downlink shared channel transmission opportunity of the multiple downlink shared channel transmission opportunities associated with a first burst of the SPS configuration based on applying a first feedback process identifier offset value to a formula, determining a second feedback process identifier associated with a second downlink shared channel transmission opportunity of the multiple downlink shared channel transmission opportunities associated with the first burst based on applying a second feedback process identifier offset value to the formula, and determining a third feedback process identifier associated with a first downlink shared channel transmission opportunity of the multiple downlink shared channel transmission opportunities associated with a second burst of the SPS configuration based on applying the first feedback process identifier offset value to the formula.

Some examples of the method, apparatuses, and non-transitory computer-readable medium described herein may further include operations, features, means, or instructions for receiving, from the base station, downlink control information (DCI) signaling including a feedback process identifier bit field configured with an index value indicating the SPS configuration, where the control signaling includes radio resource control (RRC) signaling and activating the SPS configuration based on the feedback process identifier bit field of the DCI signaling configured with the index value indicating the SPS configuration, where receiving the downlink signaling may be based on activating the SPS configuration.

Some examples of the method, apparatuses, and non-transitory computer-readable medium described herein may further include operations, features, means, or instructions for determining that the DCI signaling activates the SPS configuration further based on the DCI signaling including a redundancy version bit field configured with at least a threshold quantity of initial bits set to zero, configured with all bits set to zero, or both.

Some examples of the method, apparatuses, and non-transitory computer-readable medium described herein may further include operations, features, means, or instructions for determining that the DCI signaling activates a subset of the multiple downlink shared channel transmission opportunities for the SPS configuration based on the DCI signaling including a redundancy version bit field, where each downlink shared channel transmission opportunity of the subset may be activated by a corresponding bit of the redundancy version bit field.

Some examples of the method, apparatuses, and non-transitory computer-readable medium described herein may further include operations, features, means, or instructions for determining that the DCI signaling activates a subset of consecutive downlink shared channel transmission opportunities of the multiple downlink shared channel transmission opportunities for the SPS configuration based on the DCI signaling including a redundancy version bit field, where the redundancy version bit field includes a quantity of consecutive bits set to zero indicating a corresponding quantity of the subset of consecutive downlink shared channel transmission opportunities activated based on the DCI signaling.

In some examples of the method, apparatuses, and non-transitory computer-readable medium described herein, the DCI signaling further includes a new data indicator bit field indicating activation of the SPS configuration, activation of a subset of the multiple downlink shared channel transmission opportunities for the SPS configuration, or a retransmission grant.

Some examples of the method, apparatuses, and non-transitory computer-readable medium described herein may further include operations, features, means, or instructions for receiving second DCI signaling including a second feedback process identifier bit field configured with a second index value indicating the SPS configuration, where the second DCI signaling includes deactivation DCI and deactivating one or more of the multiple downlink shared channel transmission opportunities for the SPS configuration based on one or more bit values of a redundancy version bit field of the second DCI signaling.

In some examples of the method, apparatuses, and non-transitory computer-readable medium described herein, receiving the downlink signaling in the downlink shared channel transmission opportunity may include operations, features, means, or instructions for receiving an initial portion of the downlink signaling in an initial downlink shared channel transmission opportunity of the multiple downlink shared channel transmission opportunities associated with a burst of the SPS configuration or in any downlink shared channel transmission opportunity of the multiple downlink shared channel transmission opportunities associated with the burst.

Some examples of the method, apparatuses, and non-transitory computer-readable medium described herein may further include operations, features, means, or instructions for receiving, from the base station, RRC signaling indicating that the downlink signaling may be configured to start at the initial downlink shared channel transmission opportunity or at any downlink shared channel transmission opportunity, where receiving the initial portion of the downlink signaling may be based on the RRC signaling.

Some examples of the method, apparatuses, and non-transitory computer-readable medium described herein may further include operations, features, means, or instructions for receiving, from the base station, DCI signaling indicating a release of the SPS configuration, transmitting, to the base station and in response to the DCI signaling indicating the release, an indication of an acknowledgment bit for the DCI signaling indicating the release, and releasing the SPS configuration based on the DCI signaling indicating the release.

Some examples of the method, apparatuses, and non-transitory computer-readable medium described herein may further include operations, features, means, or instructions for generating a codebook including the acknowledgment bit, where a location of the acknowledgment bit in the codebook corresponds to: a first downlink shared channel transmission opportunity of the multiple downlink shared channel transmission opportunities, a last downlink shared channel transmission opportunity of the multiple downlink shared channel transmission opportunities, a set of multiple downlink shared channel transmission opportunities of the multiple downlink shared channel transmission opportunities, or a combination thereof for the SPS configuration; a TDRA field value included in the DCI signaling indicating the release; a same slot in which the DCI signaling indicating the release may be received; or a combination thereof, and where transmitting the indication of the acknowledgment bit may be based on the generated codebook.

In some examples of the method, apparatuses, and non-transitory computer-readable medium described herein, the DCI signaling indicates a set of multiple releases of a set of multiple SPS configurations and the indication of the acknowledgment bit corresponds to a first SPS configuration of the set of multiple SPS configurations with an SPS configuration index value satisfying a threshold.

A method for wireless communications at a base station is described. The method may include transmitting, to a UE, control signaling indicating an SPS configuration scheduling a burst of multiple downlink shared channel transmission opportunities within a time interval of the SPS configuration and transmitting, to the UE, downlink signaling in a downlink shared channel transmission opportunity of the multiple downlink shared channel transmission opportunities in accordance with the SPS configuration.

An apparatus for wireless communications at a base station is described. The apparatus may include a processor and a memory coupled with the processor, where the memory includes instructions executable by the processor to cause the apparatus to transmit, to a UE, control signaling indicating an SPS configuration scheduling a burst of multiple downlink shared channel transmission opportunities within a time interval of the SPS configuration and transmit, to the UE, downlink signaling in a downlink shared channel transmission opportunity of the multiple downlink shared channel transmission opportunities in accordance with the SPS configuration.

Another apparatus for wireless communications at a base station is described. The apparatus may include means for transmitting, to a UE, control signaling indicating an SPS configuration scheduling a burst of multiple downlink shared channel transmission opportunities within a time interval of the SPS configuration and means for transmitting, to the UE, downlink signaling in a downlink shared channel transmission opportunity of the multiple downlink shared channel transmission opportunities in accordance with the SPS configuration.

A non-transitory computer-readable medium storing code for wireless communications at a base station is described. The code may include instructions executable by a processor to transmit, to a UE, control signaling indicating an SPS configuration scheduling a burst of multiple downlink shared channel transmission opportunities within a time interval of the SPS configuration and transmit, to the UE, downlink signaling in a downlink shared channel transmission opportunity of the multiple downlink shared channel transmission opportunities in accordance with the SPS configuration.

A method for wireless communications at a UE is described. The method may include receiving, from a base station, control signaling indicating a CG scheduling a burst of multiple uplink shared channel transmission opportunities within a time interval for the CG and transmitting, to the base station, uplink signaling in an uplink shared channel transmission opportunity of the multiple uplink shared channel transmission opportunities in accordance with the CG.

An apparatus for wireless communications at a UE is described. The apparatus may include a processor and a memory coupled with the processor, where the memory includes instructions executable by the processor to cause the apparatus to receive, from a base station, control signaling indicating a CG scheduling a burst of multiple uplink shared channel transmission opportunities within a time interval for the CG and transmit, to the base station, uplink signaling in an uplink shared channel transmission opportunity of the multiple uplink shared channel transmission opportunities in accordance with the CG.

Another apparatus for wireless communications at a UE is described. The apparatus may include means for receiving, from a base station, control signaling indicating a CG scheduling a burst of multiple uplink shared channel transmission opportunities within a time interval for the CG and means for transmitting, to the base station, uplink signaling in an uplink shared channel transmission opportunity of the multiple uplink shared channel transmission opportunities in accordance with the CG.

A non-transitory computer-readable medium storing code for wireless communications at a UE is described. The code may include instructions executable by a processor to receive, from a base station, control signaling indicating a CG scheduling a burst of multiple uplink shared channel transmission opportunities within a time interval for the CG and transmit, to the base station, uplink signaling in an uplink shared channel transmission opportunity of the multiple uplink shared channel transmission opportunities in accordance with the CG.

Some examples of the method, apparatuses, and non-transitory computer-readable medium described herein may further include operations, features, means, or instructions for determining a first symbol index and a first slot index for a first uplink shared channel transmission opportunity of the multiple uplink shared channel transmission opportunities associated with a first burst of the CG, determining a second symbol index for a second uplink shared channel transmission opportunity of the multiple uplink shared channel transmission opportunities associated with the first burst based on a corresponding SLIV included in the control signaling, and determining a second slot index for the second uplink shared channel transmission opportunity based on the first slot index and a slot offset indicated by a TDRA table entry indicated by the control signaling.

Some examples of the method, apparatuses, and non-transitory computer-readable medium described herein may further include operations, features, means, or instructions for determining a first feedback process identifier associated with a first uplink shared channel transmission opportunity of the multiple uplink shared channel transmission opportunities associated with a first burst of the CG according to a formula and based on a first value for a feedback process identifier offset included in the formula, a quantity of activated uplink shared channel transmission opportunities of the multiple uplink shared channel transmission opportunities included in the formula, or both, determining a second feedback process identifier associated with a second uplink shared channel transmission opportunity of the multiple uplink shared channel transmission opportunities associated with the first burst based on incrementing the first feedback process identifier, and determining a third feedback process identifier associated with a first uplink shared channel transmission opportunity of the multiple uplink shared channel transmission opportunities associated with a second burst of the CG according to the formula and based on a second value for the feedback process identifier offset included in the formula, the quantity of activated uplink shared channel transmission opportunities included in the formula, or both.

Some examples of the method, apparatuses, and non-transitory computer-readable medium described herein may further include operations, features, means, or instructions for determining a first feedback process identifier associated with a first uplink shared channel transmission opportunity of the multiple uplink shared channel transmission opportunities associated with a first burst of the CG based on applying a first feedback process identifier offset value to a formula, determining a second feedback process identifier associated with a second uplink shared channel transmission opportunity associated with the first burst based on applying a second feedback process identifier offset value to the formula, and determining a third feedback process identifier associated with a first uplink shared channel transmission opportunity of the multiple uplink shared channel transmission opportunities associated with a second burst of the CG based on applying the first feedback process identifier offset value to the formula.

Some examples of the method, apparatuses, and non-transitory computer-readable medium described herein may further include operations, features, means, or instructions for receiving, from the base station, DCI signaling including a feedback process identifier bit field configured with an index value indicating the CG, where the control signaling includes RRC signaling and activating the CG based on the feedback process identifier bit field of the DCI signaling configured with the index value indicating the CG, where transmitting the uplink signaling may be based on activating the CG.

Some examples of the method, apparatuses, and non-transitory computer-readable medium described herein may further include operations, features, means, or instructions for determining that the DCI signaling activates the CG further based on the DCI signaling including a redundancy version bit field configured with at least a threshold quantity of initial bits set to zero, configured with all bits set to zero, or both.

Some examples of the method, apparatuses, and non-transitory computer-readable medium described herein may further include operations, features, means, or instructions for determining that the DCI signaling activates a subset of the multiple uplink shared channel transmission opportunities for the CG based on one or more bit values of a redundancy version bit field included in the DCI signaling.

Some examples of the method, apparatuses, and non-transitory computer-readable medium described herein may further include operations, features, means, or instructions for receiving, from the base station, DCI signaling including a redundancy version bit field configured with at least a threshold quantity of initial bits set to zero, configured with all bits set to zero, or both, the redundancy version bit field indicating release of the CG and releasing the CG based on the redundancy version bit field of the DCI signaling.

In some examples of the method, apparatuses, and non-transitory computer-readable medium described herein, transmitting the uplink signaling in the uplink shared channel transmission opportunity may include operations, features, means, or instructions for transmitting an initial portion of the uplink signaling in an initial uplink shared channel transmission opportunity of the multiple uplink shared channel transmission opportunities associated with a burst of the CG or in any uplink shared channel transmission opportunity of the multiple uplink shared channel transmission opportunities associated with the burst.

Some examples of the method, apparatuses, and non-transitory computer-readable medium described herein may further include operations, features, means, or instructions for receiving, from the base station, RRC signaling indicating that the uplink signaling may be configured to start at the initial uplink shared channel transmission opportunity or at any uplink shared channel transmission opportunity, where transmitting the initial portion of the uplink signaling may be based on the RRC signaling.

Some examples of the method, apparatuses, and non-transitory computer-readable medium described herein may further include operations, features, means, or instructions for initiating one or more timers based on transmitting the uplink signaling, the one or more timers associated with the CG, where each timer of the one or more timers may be initiated based on a respective uplink shared channel transmission opportunity in which the uplink signaling may be transmitted for a burst of the CG or where the one or more timers initiated based on a last uplink shared channel transmission opportunity in which the uplink signaling may be transmitted for the burst and monitoring for feedback from the base station for a duration configured by the one or more timers based on the initiating.

Some examples of the method, apparatuses, and non-transitory computer-readable medium described herein may further include operations, features, means, or instructions for determining one or more repetition factors and a time domain pattern for the uplink signaling, where the one or more repetition factors includes a single repetition factor for each uplink shared channel transmission opportunity in which the uplink signaling may be transmitted or the one or more repetition factors include a set of multiple repetition factors corresponding to respective uplink shared channel transmission opportunities in which the uplink signaling may be transmitted, the time domain pattern indicates to transmit each repetition for a first uplink shared channel transmission opportunity before transmitting a first repetition for a second uplink shared channel transmission opportunity or to transmit a first repetition for each uplink shared channel transmission opportunity before transmitting a second repetition for the first uplink shared channel transmission opportunity, and the uplink signaling may be transmitted based on the one or more repetition factors and the time domain pattern.

A method for wireless communications at a base station is described. The method may include transmitting, to a UE, control signaling indicating a CG scheduling a burst of multiple uplink shared channel transmission opportunities within a time interval for the CG and receiving, from the UE, uplink signaling in an uplink shared channel transmission opportunity of the multiple uplink shared channel transmission opportunities in accordance with the CG.

An apparatus for wireless communications at a base station is described. The apparatus may include a processor and a memory coupled with the processor, where the memory includes instructions executable by the processor to cause the apparatus to transmit, to a UE, control signaling indicating a CG scheduling a burst of multiple uplink shared channel transmission opportunities within a time interval for the CG and receive, from the UE, uplink signaling in an uplink shared channel transmission opportunity of the multiple uplink shared channel transmission opportunities in accordance with the CG.

Another apparatus for wireless communications at a base station is described. The apparatus may include means for transmitting, to a UE, control signaling indicating a CG scheduling a burst of multiple uplink shared channel transmission opportunities within a time interval for the CG and means for receiving, from the UE, uplink signaling in an uplink shared channel transmission opportunity of the multiple uplink shared channel transmission opportunities in accordance with the CG.

A non-transitory computer-readable medium storing code for wireless communications at a base station is described. The code may include instructions executable by a processor to transmit, to a UE, control signaling indicating a CG scheduling a burst of multiple uplink shared channel transmission opportunities within a time interval for the CG and receive, from the UE, uplink signaling in an uplink shared channel transmission opportunity of the multiple uplink shared channel transmission opportunities in accordance with the CG.

DETAILED DESCRIPTION

Figure 1:
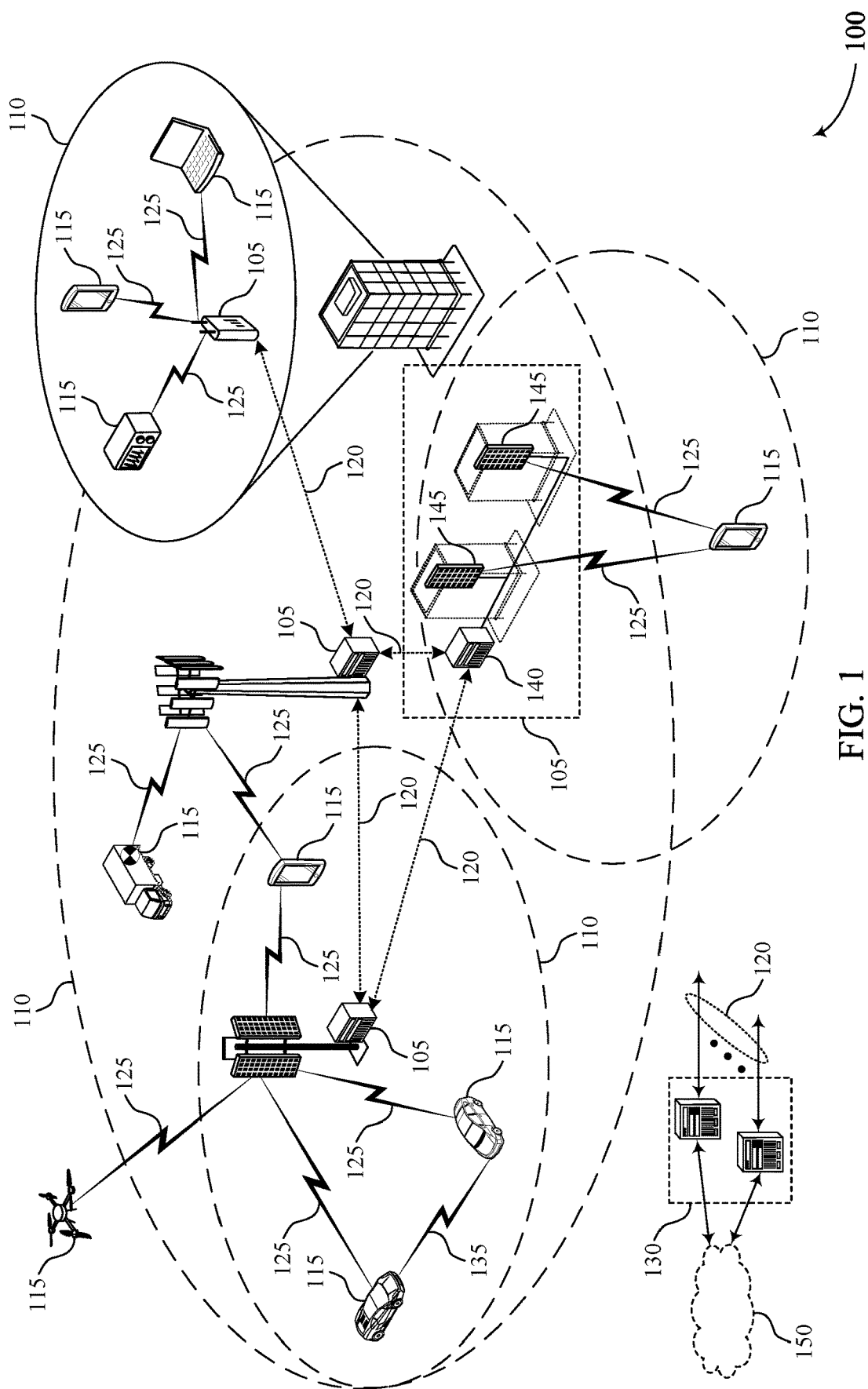
FIGS. 1 and 2 illustrate examples of wireless communications systems that support semi-persistent scheduling (SPS) and configured grants (CGs) configuring bursts of multiple transmission opportunities in accordance with aspects of the present disclosure.

Some wireless communications systems may support signaling on frequency bands approximately between 71 gigahertz (GHz) and 114.25 GHz (e.g., frequency range 4 (FR4), among other frequency bands) which may be associated with relatively high signaling rates, reduced interference thresholds, and increased channel stability thresholds as compared to lower frequency bands. To support such high frequency communications and to account for large propagation losses associated with high frequency communications, wireless devices may transmit information using a relatively large quantity of narrow beams to increase wireless coverage. In such cases, devices may use a number of techniques to reduce significant control signaling overhead associated with the high frequency bands, where the control signaling may be used for scheduling communications.

To reduce signaling overhead (e.g., control overhead), some wireless networks may support multi-uplink channel (e.g., multi-physical uplink shared channel (PUSCH)) and multi-downlink channel (e.g., multi-physical downlink shared channel (PDSCH)) signaling, where a control message—such as a downlink control information (DCI) message—may schedule multiple shared channel transmissions during a burst. In such cases, the DCI may schedule a longer burst of traffic rather than using a DCI to schedule each individual shared channel transmission. To efficiently schedule and activate periodic bursts of multiple shared channel transmissions, the wireless communications system may support signaling of multi-shared channel semi-persistent scheduling (SPS) or CGs. That is, a base station may use a single activation control message to activate multiple periodic bursts of transmission opportunities, where a burst of the multiple periodic bursts further schedules multiple transmission opportunities (e.g., for uplink or downlink transmissions).

For multi-PDSCH SPS signaling, a user equipment (UE) may receive an SPS configuration from a base station via an RRC message, and the RRC or an additional DCI signaling may activate one or more PDSCH opportunities of the SPS configuration. The UE may use the activated one or more PDSCH opportunities to receive one or more PDSCH transmissions within an SPS interval or across SPS intervals. For multi-PUSCH CG signaling, a UE may receive an RRC message for CG configuration for multiple uplink transmission opportunities, and the RRC message or an additional DCI message may activate one or more uplink transmission opportunities for transmitting uplink data during a configured time interval of the CG. In either case, the RRC, DCI, or both may serve as an activation signal to activate the SPS configuration or the CG for multiple time intervals, where each interval includes multiple opportunities for the UE to receive PDSCH or transmit PUSCH.

In some examples, after activation of a multi-PDSCH SPS, the UE may receive a second DCI message which may deactivate or release one or more of the multiple downlink transmission opportunities within a burst. Upon receiving the second DCI message which deactivates or releases the one or more of the multiple downlink transmission opportunities, the UE may transmit an acknowledgment message to acknowledge the reception of the second DCI message. The second DCI message may also prompt the UE to stop receiving during the one or more of the multiple downlink transmission opportunities.

In some examples, after activation of a multi-PUSCH CG, the UE may receive a second DCI message which may deactivate or release one or more of the multiple uplink transmission opportunities within a burst. Upon receiving the second DCI message which deactivates or releases the one or more multiple uplink transmission opportunities, the UE may transmit an acknowledgment message to acknowledge the reception of the second DCI message. The second DCI message may also prompt the UE to stop transmitting during the one or more multiple uplink transmission opportunities.

In addition, the SPS or CG configurations may include additional information that the UE may use to determine aspects of the multi-PDSCH or multi-PUSCH signaling. For example, the configurations may provide details related to transmission resources for PDSCH and PUSCH opportunities, feedback process IDs, feedback bit locations, activation and deactivation DCI features, CG timing information, or any combination of these or other aspects related to the configurations.

Aspects of the disclosure are initially described in the context of wireless communications systems. Aspects of the disclosure are further illustrated by and described with reference to apparatus diagrams, system diagrams, SPS and CG configurations, process flows, and flowcharts that relate to SPS and CG configuring bursts of multiple transmission opportunities.

FIG. 1 illustrates an example of a wireless communications system 100 that supports SPS and CGs configuring bursts of multiple transmission opportunities in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the wireless communications system 100 may support communications on relatively high frequency bands (e.g., FR4 or above) using a relatively large quantity of beams (e.g., narrow beams) to increase wireless coverage. To reduce signaling overhead (e.g., control overhead) associated with such high frequency communications, the wireless communications system 100 may support multi-uplink shared channel and multi-downlink shared channel signaling, where multiple shared channel transmissions during a burst may be scheduled with a single DCI message. For example, the single DCI message may activate a longer burst of traffic rather than using a DCI to initiate each of the multiple shared channel transmissions, respectively. To efficiently schedule and activate one or more shared channel transmissions of a multi-shared channel burst periodically, the wireless communications system may support signaling of multi-shared channel SPS or CGs.

For multi-PDSCH SPS signaling, a UE 115 may receive an SPS configuration configuring periodic bursts of one or more PDSCH transmission opportunities from a base station 105, and the UE 115 may receive RRC or DCI signaling activating one or more PDSCH opportunities of the SPS configuration. The UE 115 may use the activated PDSCH opportunities to receive one or more PDSCH transmissions. For multi-PUSCH CG signaling, the UE 115 may receive a CG configuration configuring periodic bursts of one or more PUSCH transmission opportunities from the base station 105, and the UE 115 may receive RRC or DCI signaling activating one or more PUSCH opportunities of the multiple uplink transmission opportunities configured by the CG. The UE 115 may use the activated PUSCH opportunities to transmit one or more PUSCH transmissions.

Figure 2:
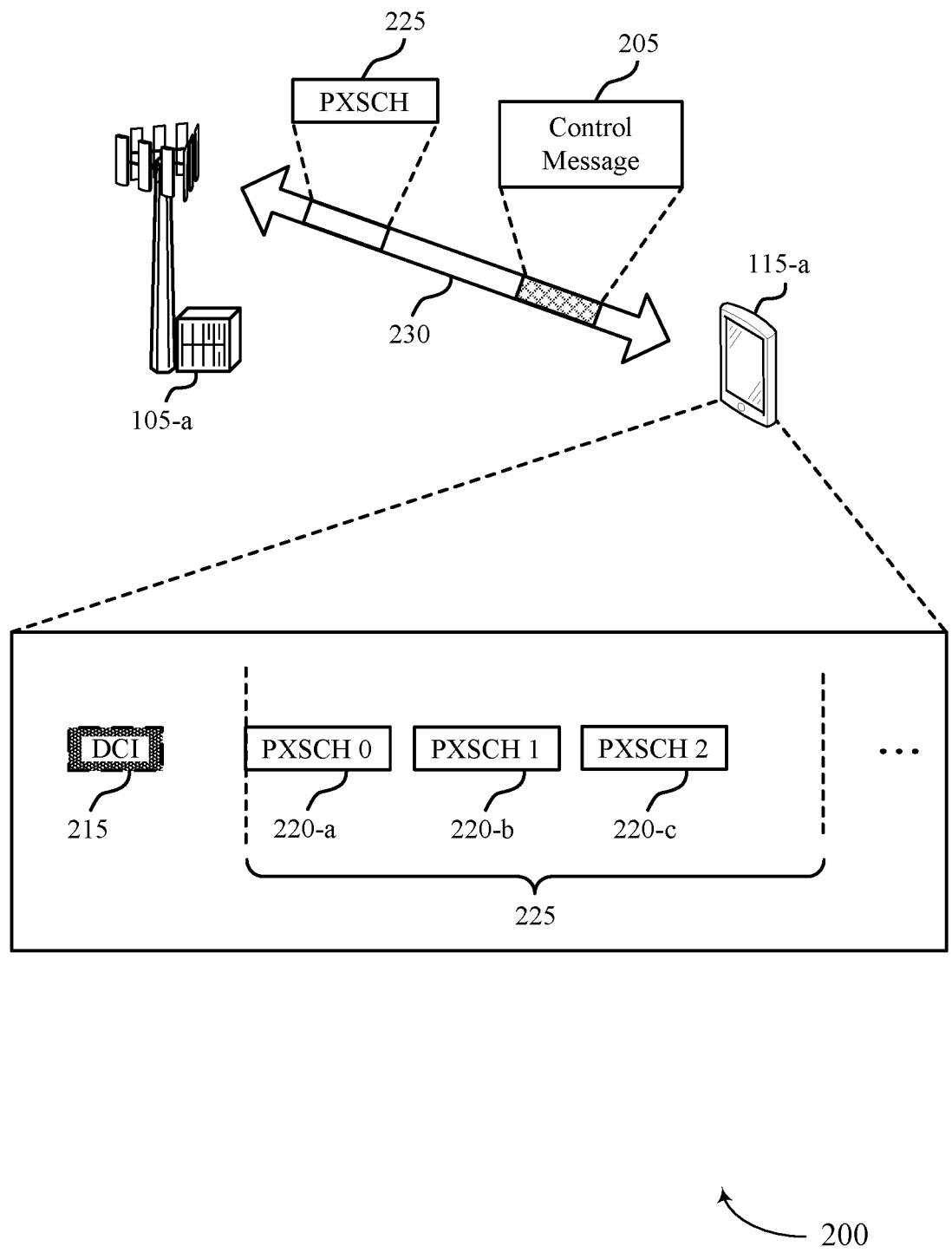

FIG. 2 illustrates an example of a wireless communications system 200 that supports SPS and CGs configuring bursts of multiple transmission opportunities in accordance with aspects of the present disclosure. For example, the wireless communications system 200 may support signaling between a base station 105-a and a UE 115-a, which may be examples of a base station 105 and a UE 115 described with reference to FIG. 1. The base station 105-a and the UE 115-a may communicate over a communication link 230. To reduce control signaling overhead, the base station 105-a may support configuring the UE 115-a with periodic bursts 225 of multiple transmission opportunities (e.g., via PXSCH i, which may indicate a PDSCH with HARQ ID i for downlink transmissions or a PUSCH with HARQ ID i for uplink transmissions), where the base station 105-a may activate the configuration using a single control signal (e.g., a control message 205).

In some cases, the wireless communications system 200 may support communications in relatively high frequency bands (e.g., approximately 71 GHz to 114.25 GHz bands for FR4), for example, for fixed devices or other devices in the wireless communications system 200. Communications in relatively high frequency bands may be associated with higher signaling rates than communications in lower frequency bands. In some cases, these high frequency communications may be associated with low mobility or no mobility use cases which include servicing a reduced number of devices located relatively far away from one another. In some such cases, the high frequency communications may have reduced rates of interference, increased channel stability (e.g., lower channel variation), and a higher probability of increased path loss. In addition, the effective isotropic radiated power (EIRP) for devices may be relatively large to support high frequency communications (e.g., 55 decibel milliwatts (dBm), or up to 85 dBm) and may be higher than the frequency range FR2-2 (e.g., approximately 52.6 GHz to 71 GHz), which may be affected by antenna gain capabilities of wireless devices.

To support high frequency communications and high EIRP, the wireless communications system 200 may support communications using a relatively large number of narrow beams between the base station 105-*a* and UEs 115 to increase wireless coverage. To reduce signaling overhead (e.g., control overhead) associated with the relatively large number of beams, some wireless networks may support multi-PUSCH and multi-PDSCH signaling, where multiple shared channel transmissions may be scheduled with a single control message 205. In such cases, the single control message 205 may activate a longer burst of traffic rather than using a DCI or RRC message to initiate each individual shared channel transmission. In addition, multiple shared channel transmissions may share the same modulation and coding scheme (MCS) and frequency domain resource assignment (FDRA) to further reduce overhead. To efficiently schedule and activate one or more shared channel transmissions of a multi-shared channel burst 225 periodically, the wireless communications system 200 may support signaling of multi-shared channel SPS or CGs to further reduce signaling overhead.

The base station 105-*a* may configure multi-PDSCH SPS to schedule periodic multi-PDSCH transmissions and may use CGs to schedule periodic multi-PUSCH transmissions. For multi-PDSCH SPS, the UE 115-*a* may receive an SPS configuration in the control message 205. The control message 205 may be an RRC message. In some cases, the RRC message may be accompanied by a DCI message 215 (e.g., an activation DCI for SPS type 2), which may further activate one or more PDSCH opportunities of the SPS configuration that the UE 115-*a* may use to receive the one or more PDSCH transmissions during an SPS interval periodically. In some other cases, depending on the type of SPS, an activation DCI may not be included (e.g., for SPS type 1, a single control message 205—an RRC message—may be used).

For multi-PUSCH CG, the UE 115-*a* may receive a CG for multiple uplink transmission opportunities in the control message 205. In some examples, the control message 205 may be an RRC message. In some cases, the RRC message may be accompanied by a DCI message 215 (e.g., an activation DCI for CG type 2), which may further activate one or more PUSCH opportunities of the CG configuration that the UE 115-*a* may use to transmit the one or more PUSCH transmissions during a CG interval periodically. In some other cases, depending on the type of CG, an activation DCI may not be included (e.g., for CG type 1). Instead, the RRC message may activate the multiple uplink transmission opportunities for transmitting uplink data during a configured time interval of the CG. In either case, the RRC message, the DCI message 215, or both, may serve as an activation signal to activate the SPS configuration or the CG for multiple time intervals (e.g., multiple periodic bursts 225), where each interval includes multiple opportunities for receiving PDSCH or transmitting PUSCH. For example, a burst 225 may include resources for a first shared channel transmission 220-*a*, a second shared channel transmission 220-*b*, and a third shared channel transmission 220-*c*, and the activation signal may activate multiple periodic bursts 225 according to the configuration defined by the control message 205. A burst 225 may include any quantity of shared channel transmission opportunities based on the configuration of the burst 225.

Figure 3:
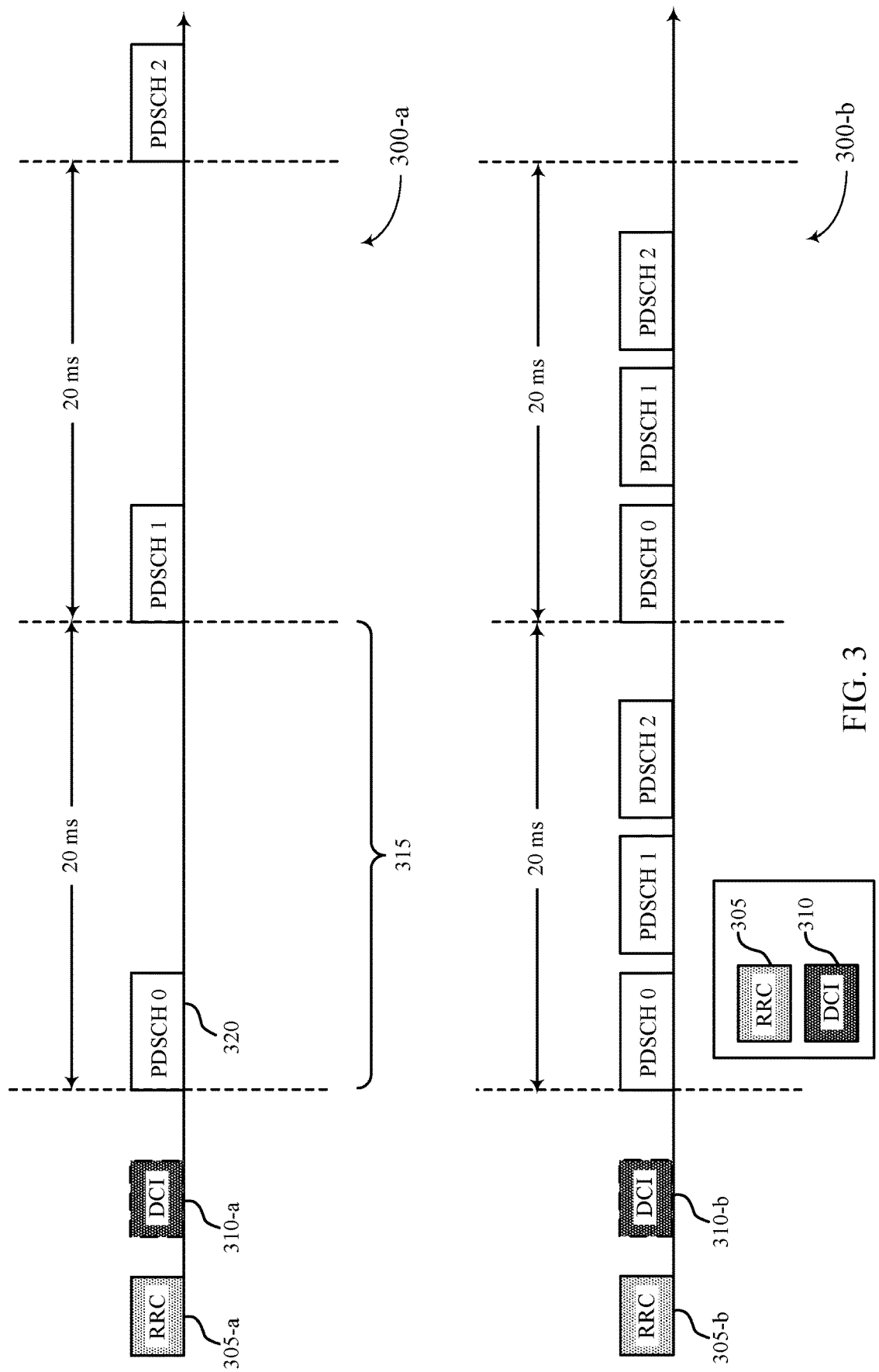
FIGS. 3 through 5 illustrate example SPS configurations that support configuring bursts of one or more downlink transmission opportunities in accordance with aspects of the present disclosure.

FIG. 3 illustrates an example of SPS configurations 300-*a* and 300-*b* that support configuring bursts of one or more downlink transmission opportunities in accordance with aspects of the present disclosure. In SPS configuration 300-*a*, each interval (e.g., in each SPS period of 20 ms) may have one downlink transmission opportunity, which may be referred to as a single-PDSCH SPS. The SPS configuration 300-*b* may include more than one downlink transmission opportunity in each interval (e.g. within each SPS period of 20 ms), which may be referred to as multi-PDSCH SPS. In some cases, SPS configurations 300-*a* and 300-*b* may be implemented at or by one or more wireless devices such as a base station 105, a UE 115, or both, which may be examples of the corresponding devices described herein.

SPS configurations 300-*a* and 300-*b* may support SPS configurations for receiving one or multiple PDSCH transmissions during a configured SPS time interval 315, such as a 20 ms SPS time interval. A UE 115 may receive the SPS configuration via control signaling such as RRC signaling 305 or DCI 310, and the UE 115 may store or clear the SPS configuration based on layer-1 signaling indicating activation or deactivation of the SPS configuration. In some examples, RRC signaling 305 may indicate a radio network temporary identifier (RNTI) such as a cs-RNTI, one or more HARQ feedback parameters (e.g., nrofHARQ-Processes, harq-ProcID-Offset), a periodicity for the SPS configuration, or a combination thereof.

In some examples, SPS configurations 300-*a* or 300-*b* may support type-1 or type-2 SPS scheduling. For type-1 SPS scheduling, the RRC signaling 305-*a* or 305-*b* may include all parameters for SPS such that SPS is activated upon the reception of the RRC message (e.g., DCI 310-*a* or 310-*b* may not be used to activate the SPS configuration). For type-2 SPS scheduling, RRC signaling 305-*a* or 305-*b* may be transmitted to the UE 115 to configure a subset of all parameters of the SPS, and then the DCI 310-*a* or 310-*b* may be used to configure the rest of the parameters of the SPS as well as activating the SPS configuration. In some such cases, configuration parameters may be included in both the RRC signaling 305 and the DCI 310, and the DCI 310 may activate the SPS configuration.

SPS configuration 300-*a* may support downlink SPS for transmissions of a PDSCH during each configured time interval 315 (e.g., one PDSCH transmission opportunity per 20 ms). A base station 105 may configure a UE 115 with a downlink SPS configuration, for example, using a CS-RNTI which indicates that the UE 115 may decode PDCCH with CRC scrambled by the CS-RNTI. In some examples, a UE 115 may receive RRC signaling 305-*a*, DCI 310-*a*, or both, which indicate an activation or release of the SPS configuration. In single-PDSCH SPS scheduling, the RRC signaling 305-*a* may include a number of parameters to configure downlink SPS monitoring. For example, the RRC signaling 305-*a* may include an indication of an SPS RNTI (e.g., cs-RNTI), a number of HARQ processes associated with the downlink SPS occasions and associated HARQ parameters (e.g., nrofHARQ-Processes,harq-ProcID-Offset-r16, harq-CodebookID-r16), an SPS periodicity defining the time interval 315 (e.g., periodicity, periodicityExt-r16), an MCS configuration (e.g., Mcs table), additional feedback information (e.g., N1pucch-AN), an SPS indexing configuration (e.g., sps-ConfigIndex-r16), a PDSCH aggregation parameter (e.g., pdsch-AggregationFactor-r16), or any combination of these or other SPS parameters. For the single-PDSCH SPS configuration 300-*a*, in some examples, the RRC signaling 305-*a* may additionally activate the SPS configuration.

For SPS configuration 300-*a* in some other examples, the DCI 310-*a* may indicate an activation or release of the SPS configuration. For example, if the DCI 310-*a* has a DCI format of 1_0, 1_1, or 1_2, the redundancy version (RV) fields of the DCI are set to zero (for DCI format 1_0 or 1_2) or the RV field for the enabled TB is set to zero (for DCI format 1_1), and the HARQ process number is set to zero when the UE is configured with one SPS or the HARQ process number is set to indicate the SPS configuration out of a set of SPS configurations for the UE, the DCI 310-*a* may indicate an activation of the SPS configuration. After receiving the activation DCI 310-*a*, the UE may start to monitor downlink transmissions periodically.

Additionally or alternatively, if the RV fields of the DCI 310-*a* are set to zero, the MCS field is set to one, the HARQ process number is set to zero when the UE is configured with one SPS, or the HARQ process number is set to indicate the SPS configuration out of a set of SPS configurations for the UE, and the FDRA field is set to zero (for dynamic switch FDRA or FDRA type 0) or the FDRA field is set to one (for FDRA type 1), the DCI 310-*a* may indicate a release of the SPS configuration. In some cases, the UE may transmit an acknowledgment message to acknowledge the reception of release DCI 310-*a*, and the release DCI 310-*a* may prompt the UE to stop monitoring downlink transmissions.

Based on information received in the RRC signaling 305-*a*, the DCI 310-*a*, or both, the UE 115 may monitor a single PDSCH opportunity (e.g., PDSCH 0, PDSCH 1, PDSCH 2) per configured SPS time interval 315 for a PDSCH transmission 320, such as once every 20 ms in the example of SPS configuration 300-*a*.

In single-PDSCH SPS, for example, according to the downlink SPS assignment in 300-*a*, the N$^{th}$ downlink assignment for PDSCH occurs in the slot given by Equation 1.

(numberOfSlotsPerFrame×SFN+slot number in the frame)=[numberOfSlotsPerFrame×SFN$_{start\ time}$+slot$_{start\ time}$)+N×periodicity×numberOfSlotsPerFrame/10]modulo(1024×numberOfSlotsPerFrame)     (1)

The SFN$_{start\ time}$ and slot$_{start\ time}$ are the SFN and slot, respectively, of the first transmission of PDSCH where the configured downlink assignment was initialized or re-initialized.

In some cases, a UE 115 supporting communications using SPS according to SPS configurations 300-*a* may calculate frequency resources to use for transmitting HARQ feedback. For example, the RRC 305 may include an indication of the number of HARQ processes assigned to the SPS configuration (e.g., for SPS configurations 300-*a* and 300-*b*, the corresponding number of HARQ processes may be equal to three, or nrofHARQProcesses=3).

For a single-PDSCH SPS (e.g., SPS configuration 300-*a*), a UE 115 may determine a HARQ process identifier (e.g., a feedback process identifier) based on a number of parameters associated with the SPS configuration and in accordance with a HARQ process offset. For example, for configured downlink assignments without an offset (e.g., harq-ProcID-Offset), the HARQ Process ID associated with a PDSCH in a slot where the downlink SPS transmission starts may be determined using Equation 2.

$$HARQ\text{ProcessID} = \left[\text{floor}\left(\frac{\text{CURRENT\_slot} \times 10}{\text{numberOfSlotsPerFrame} \times \text{periodicity}}\right)\right] \quad (2)$$

modulo nrofHARQProcesses

In Equation 2, CURRENT_slot=[(SFN×numberOfSlotsPerFrame)+slot number in the frame] and numberOfSlotsPerFrame is a number of consecutive slots per frame.

Additionally or alternatively, for configured downlink SPS assignments which include a HARQ ID offset (e.g., harq-ProcID-Offset), the HARQ Process ID associated with a PDSCH in a slot where the downlink transmission starts may be determined using Equation 3.

$$HARQ\text{ProcessID} = \left[\text{floor}\left(\frac{\text{CURRENT\_slot} \times 10}{\text{numberOfSlotsPerFrame} \times \text{periodicity}}\right)\right] \quad (3)$$

modulo nrofHARQProcesses+harq-ProcID-Offset

In some other examples, such as in SPS configuration 300-*b*, a UE 115 may be configured with a downlink SPS configuration which supports scheduling of multiple PDSCH opportunities per configured SPS time interval 315, for example, multiple PDSCH opportunities per 20 ms interval. The scheduling of the multiple PDSCH opportunities may reduce control signaling overhead (e.g., relative to single-PDSCH SPS scheduling) and may increase downlink throughput to enhance overall downlink scheduling efficiency. In some such examples, the RRC signaling 305-*b*, DCI 310-*b*, or both may indicate multiple PDSCH monitoring occasions per SPS interval (e.g., multiple PDSCH monitoring occasions per 20 ms SPS interval). To indicate multiple PDSCH transmission opportunities per SPS interval, the RRC signaling 305-*b* or the DCI 310-*b* may include or indicate a TDRA table entry which indicates M valid start and length indicators (SLIVs) and the number of SLIVs, M, may indicate the number of PDSCH transmission opportunities per SPS interval. Additionally or alternatively, the RRC signaling 305-*b* or the DCI 310-*b* may include a parameter M to explicitly configure the number of PDSCH transmission opportunities per SPS interval, and the RRC signaling 305-*b* or the DCI 310-*b* may also include a TDRA table entry which includes M or more valid SLIVs. The first M, or the last M, or a bit-map-indicated M SLIVs may be chosen (or indicated) out of the M or more SLIVs in the TDRA table entry. Along with M valid SLIVs, the RRC signaling 305-*b* or the DCI 310-*b* may include an RV field of M bits and NDI field of M bits. For example, the UE 115 may monitor for a burst of PDSCH transmissions 320 in multiple PDSCH transmission opportunities within an SPS time interval 315 based on the SPS configuration 300-*b*.

For the multi-PDSCH SPS configuration 300-*b*, the DCI 310-*b* may indicate an activation or deactivation (e.g., release) of the SPS configuration. For example, if the DCI 310-*b* has a DCI format of 1_0, 1_1 or 1_2, the RV fields of the DCI 310-*b* are set to zero (for DCI format 1_0 or 1_2) or the RV fields for the enabled TB are set to zero (for DCI format 1_1), and the HARQ process number is set to zero when the UE is configured with one SPS or the HARQ process number is set to indicate the SPS configuration out of a set of SPS configurations for the UE, the DCI 310-*b* may indicate an activation of the SPS configuration. In some examples, the UE may start to monitor multiple downlink transmission opportunities periodically after the reception of the activation DCI 310-*b*. Additionally or alternatively, if the HARQ process number is set to zero when the UE is configured with one SPS or the HARQ process number is set to indicate the SPS configuration out of a set of SPS configurations for the UE, the MCS field is set to one, the FDRA field is set to zero (for dynamic switch FDRA or FDRA type 0) or the FDRA field is set to one (for FDRA type 1), and the RV field (which may have M bits to indicate up to M PDSCH transmission opportunities in each burst) has all M-bits set to zero, the DCI 310-*b* may indicate a release of the SPS configuration. In some cases, the UE may transmit an acknowledgment indicator to acknowledge the reception of the release DCI 310-*b* and may stop monitoring for multiple downlink transmissions associated with the SPS.

In some cases, the SPS configuration 300-*b* may support partial activation or partial release of PDSCH transmission opportunities in the multi-PDSCH SPS configuration. For example, the UE 115 may receive a partial activation DCI for multi-PDSCH SPS. The time domain resource allocation (TDRA) field of the partial activation DCI or some other configuration parameter may indicate up to M PDSCH transmission opportunities per burst of the SPS configuration (e.g., corresponding to M valid SLIVs). The HARQ process ID in the partial activation DCI may be set to zero if a single SPS is configured for the UE 115 or to an SPS configuration index to indicate an SPS configuration if a set of SPS configurations are configured for the UE 115. The RV field, the new data indicator (NDI) field, or both of the DCI may indicate which PDSCH transmission opportunities to activate or release.

In some examples, the RV field may be an example of an M-bit RV field. The M-bit RV field may act as a bitmap corresponding to the M PDSCH transmission opportunities per burst in the multi-PDSCH SPS configuration. A bit value in the RV field may correspond to a respective PDSCH transmission opportunity within a multi-PDSCH burst. For example, a first bit value (e.g., "1") may indicate that the corresponding PDSCH transmission opportunity is not activated, while a second bit value (e.g., "0") may indicate that the corresponding PDSCH transmission opportunity is activated. Accordingly, an RV field with all zeroes may indicate a full activation DCI, while an RV field with a mixture of ones and zeroes may indicate a partial activation DCI. The NDI field may indicate a default value (e.g., "0"). For partial activation, the SPS configuration may leave a slot level gap for the skipped PDSCH transmission opportunities or may not leave a gap for the skipped PDSCH transmission opportunities.

In some other examples, the M-bit RV field may include a subsequence of m zeroes followed by a subsequence of M−m ones. For example, the partial activation DCI may activate PDSCH transmission opportunities in a contiguous manner (e.g., without skipping PDSCH transmission opportunities between activated opportunities). The quantity of consecutive zeroes may indicate the quantity of activated PDSCH transmission opportunities (e.g., starting with an initial PDSCH transmission opportunity in a burst and continuing for m−1 subsequent PDSCH transmission opportunities). The NDI field may indicate a default value (e.g., "0").

In yet some other examples, the partial activation DCI may include an M-bit NDI field. If all of the bits in the NDI field are set to a first bit value (e.g., "1"), the DCI may be a retransmission DCI. If all of the bits in the NDI field are set to a second bit value (e.g., "0"), the DCI may be a full activation DCI (e.g., activating all of the PDSCH transmission opportunities with a burst for a multi-PDSCH SPS configuration). If the NDI field includes a combination of first bit values and second bit values, the NDI field may act as a bitmap for partial activation. For example, a "1" bit value may indicate that the corresponding PDSCH transmission opportunity is not activated, while a "0" bit value may indicate that the corresponding PDSCH transmission opportunity is activated. The bits in the bitmap may correspond to specific PDSCH transmission opportunities, or the bitmap may indicate a quantity of consecutive PDSCH transmission opportunities that are activated. In some such examples, the RV field may include a set of "0" bit values.

A deactivation or release DCI may support similar techniques for partial deactivation or release (e.g., using bitmaps to indicate which PDSCH transmission opportunities are deactivated). Additionally or alternatively, a deactivation or release DCI may release a full multi-PDSCH SPS configuration. For example, to release all of the multi-PDSCH transmission opportunities within a burst, the deactivation or release DCI may include a HARQ bit field set to indicate the SPS configuration, an RV field set to all zeroes, an MCS field set to all ones, and an FDRA field set to zero (e.g., for dynamic switch FDRA or FDRA type 0) or the FDRA field set to one (e.g., for FDRA type 1). For partial deactivation, the M-bit RV field in the DCI may be set with a specific bit pattern indicates partial deactivation. For example, a first bit value (e.g., of "0") may indicate the release of corresponding PDSCH transmission opportunities and a second bit value (e.g., of "1") may indicate to maintain the corresponding PDSCH transmission opportunities as activated. In this way, the base station 105 may dynamically activate a full or a partial multi-PDSCH SPS configuration using a single control message and may dynamically deactivate the full or a partial multi-PDSCH SPS configuration using another single control message.

Figure 4:
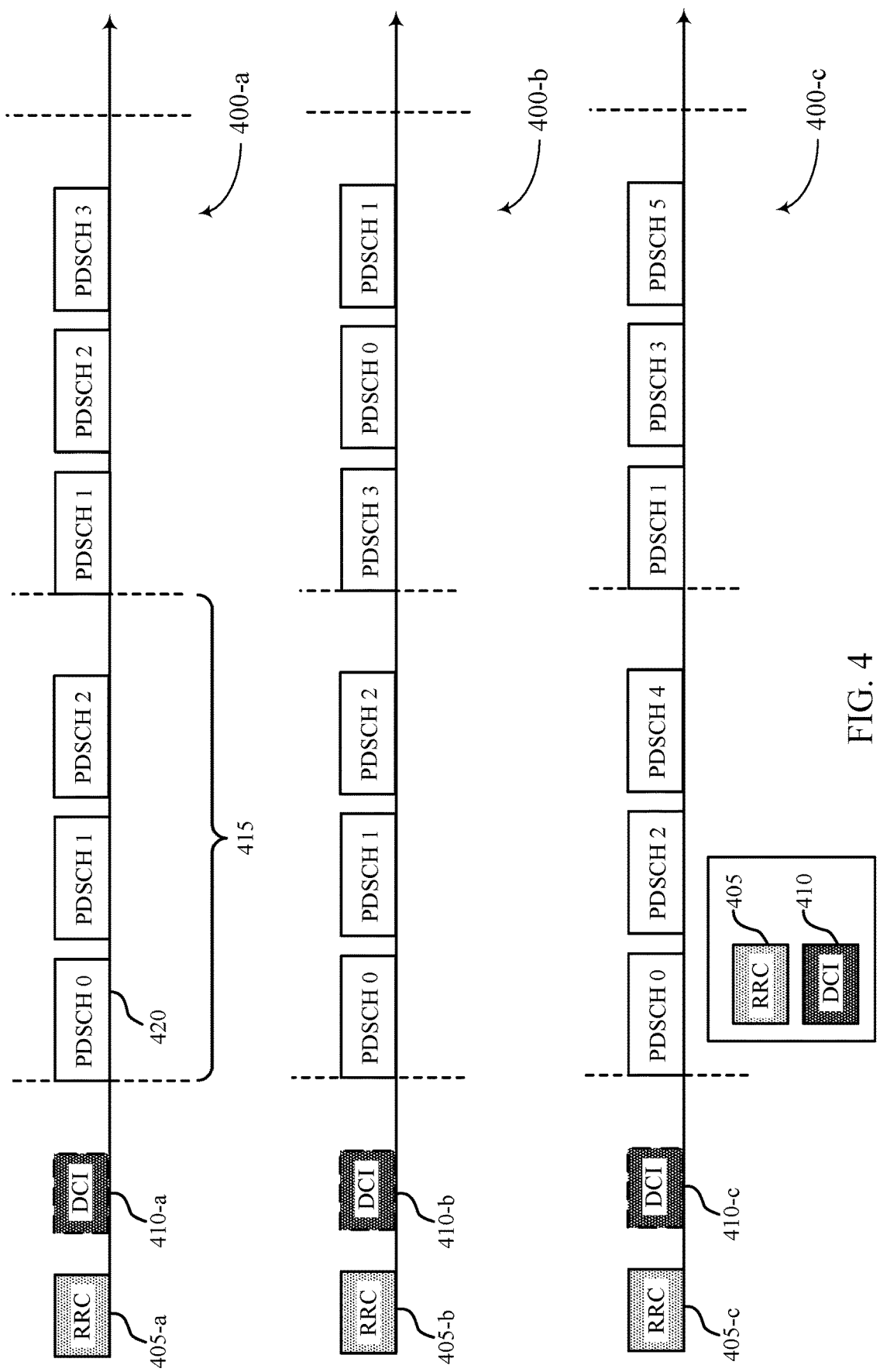

FIG. 4 illustrates an example of SPS configurations 400-*a*, 400-*b*, and 400-*c* that support configuring bursts of multiple downlink transmission opportunities in accordance with aspects of the present disclosure. For example, SPS configurations 400-*a*, 400-*b*, and 400-*c* may be implemented at or by one or more wireless devices such as a base station 105, a UE 115, or both, which may be examples of the corresponding devices described herein. The SPS configurations 400-*a*, 400-*b*, and 400-*c* may correspond to different techniques for determining feedback process identifiers (e.g., HARQ process IDs) for multi-PDSCH SPS configurations.

SPS configurations 400-*a*, 400-*b*, and 400-*c* may support multi-PDSCH signaling such that a single RRC message 405 (e.g., for type-1 SPS) or the RRC message 405 together with a DCI message 410 (e.g., for type-2 SPS) may schedule multiple shared channel transmissions in a configured SPS interval 415. In some such cases, the single DCI message 410 or RRC message 405 may activate a longer burst of traffic periodically as compared to an RRC or DCI message used to initiate an individual shared channel transmission.

In some examples, the RRC message 405 or DCI message 410 may include information that a UE 115 may use to determine one or more slot indices for PDSCH transmissions 420. For example, the UE 115 may calculate the slot index for a first PDSCH transmission opportunity of the multi-PDSCH SPS configuration and may use the slot index for the first PDSCH transmission opportunity to calculate the slot indices for the subsequent one or more additional PDSCH transmission opportunities (e.g., up to the Mth PDSCH transmission opportunity) of the multi-PDSCH configuration. The UE 115 may determine the slot index for the first PDSCH transmission opportunity in the N-th multi-PDSCH burst using Equation 4.

$$\text{(numberOfSlotsPerFrame} \times \text{SFN} + \text{slot number in the frame)} = [(\text{numberOfSlotsPerFrame} \times \text{SFN}_{start\ time} + \text{slot}_{start\ time}) + N \times \text{periodicity} \times \text{numberOfSlotsPerFrame}/10] \bmod (1024 \times \text{numberOfSlotsPerFrame}) \quad (4)$$

In Equation 4, $\text{SFN}_{start\ time}$ and $\text{slot}_{start\ time}$ are the SFN and slot, respectively, of the first transmission of PDSCH where the configured downlink assignment was initialized or re-initialized.

Upon determining the first slot index, the UE 115 may determine slot indices for the subsequent M−1 PDSCH transmission opportunities based on the first slot index and relative slot offset based on the selected SLIVs indicated in a TDRA table entry. In some cases, the TDRA table entry may be included or indicated in the RRC message 405, or the TDRA table entry may be included or indicated in the DCI message 410.

Additionally or alternatively, the UE 115 may determine a HARQ process ID for each PDSCH transmission 420 of the multi-PDSCH transmission. For example, in SPS configuration 400-*a*, the UE 115 may receive an RRC message 405-*a* and a DCI message 410-*a* which activates the SPS configuration 400-*a*. The UE 115 may determine a HARQ process ID for the first PDSCH transmission 420 of the multi-PDSCH transmission using Equation 3 as described herein and in accordance with a configured number of HARQ processes (e.g., nrofHARQ-Processes=4, (0, 1, 2, 3)) for the multi-PDSCH transmission, where the number of HARQ processes is equal to or larger than the number of PDSCH transmission opportunities scheduled per burst. For example, the first PDSCH transmission 420 in the first burst may correspond to a HARQ process ID of 0. The UE 115 and the base station 105 may use Equation 3 to determine the HARQ process ID for the first PDSCH transmission 420 in each burst of the SPS configuration, and may use an iterative process to determine the HARQ process IDs for the other PDSCH transmissions 420 in the bursts. In each of the SPS configurations, a PDSCH having the format PDSCH X may be referred to as a PDSCH transmission with HARQ process ID X.

For example, to determine subsequent M−1 HARQ process IDs for the subsequent M−1 PDSCHs in a burst, the HARQ process ID may be increased iteratively by 1 (e.g., increased by 1 for the second PDSCH to a HARQ process ID of 1, increased by another 1 for the third PDSCH to a HARQ process ID of 2, etc.). If a PDSCH transmission 420 corresponds to a maximum HARQ process ID value (e.g., 3) for the configured number of HARQ processes, increasing by 1 may cause the HARQ process ID value of the next PDSCH transmission 420 to return to 0. In some cases, across bursts, one or more HARQ process IDs may be reused before all HARQ process IDs are used (e.g., due to using Equation 3 or a similar equation to determine the first HARQ process ID in each burst). For example, the first PDSCH transmission 420 in the second SPS occasion may reuse a HARQ process ID from the first SPS occasion (e.g., a HARQ process ID of 1) before another HARQ process ID is used (e.g., a HARQ process ID of 3).

In SPS configuration 400-*b*, a UE 115 may receive an RRC message 405-*b*, a DCI message 410-*b*, or both to activate the SPS configuration 400-*b*. The UE 115 may determine a HARQ process ID for the first PDSCH transmission 420 of the first multi-PDSCH transmission burst (e.g., the first PDSCH transmission 420 scheduled after activation, such as after receiving the activation RRC message 405-*b* or the activation DCI message 410-*b*) using Equation 3 as described herein and in accordance with a configured number of HARQ processes (e.g., nrofHARQ-Processes=4, (0, 1, 2, 3)) for the multi-PDSCH transmission, where the number of HARQ processes is equal to or larger than the number of PDSCH transmission opportunities scheduled per burst. The HARQ ID for the first PDSCH in the first burst may be denoted HARQ$_{0,0}$, the UE 115 may determine the HARQ process ID for the second PDSCH transmission 420 in the first burst using (HARQ$_{0,0}$+1) modulo nrofHARQ-Processes+harq-ProcID-Offset. For a multi-PDSCH transmission in the N-th burst, the first PDSCH transmission 420 in the N-th burst may use a HARQ process ID of (HARQ$_{N-1,M-1}$+1) modulo nrofHARQ-Processes+harq-ProcID-Offset, where the HARQ process ID used by the last PDSCH of the (N−1)th PDSCH burst may be denoted as HARQ$_{N-1,M-1}$, and M is the number of PDSCHs in the (N−1)th burst. The HARQ process ID for the second PDSCH transmission 420 may be increased by 1 relative to the first HARQ process ID, and so on.

Stated alternatively, in SPS configuration 400-*b*, the UE 115 may reference a HARQ process ID used as the last HARQ process ID for the last PDSCH transmission 420 in a previous SPS burst and may begin numbering in a subsequent burst by increasing the last HARQ process ID from the previous burst by a value of 1. That is, the iteration process may span across bursts, such that the HARQ process ID for the last PDSCH transmission 420 for a first burst is increased by 1 to determine the HARQ process ID for the first PDSCH transmission 420 for a burst following the first burst. For example, a first multi-PDSCH burst in SPS configuration 400-*b* may include a PDSCH transmission 420 with a HARQ process ID of 0, a PDSCH transmission 420 with a HARQ process ID of 1, and a PDSCH transmission 420 with a HARQ process ID of 2. The second multi-PDSCH burst in SPS configuration 400-*b* may continue the iterative HARQ process ID determination and may include a PDSCH transmission 420 with a HARQ process ID of 3 (e.g., based on incrementing the last HARQ process ID in the preceding burst), a PDSCH transmission 420 with a HARQ process ID of 0 (e.g., based on incrementing past the maximum HARQ process ID value), and a PDSCH transmission 420 with a HARQ process ID of 1.

In SPS configuration 400-*c*, a UE 115 may receive an RRC message 405-*c*, a DCI message 410-*c*, or both to activate the SPS configuration 400-*c*. The UE 115 may determine a HARQ process ID for the i$^{th}$ PDSCH transmission 420 of the multi-PDSCH transmissions using Equation 5.

$$HARQ\text{ProcessID for } i\text{-}th \\ PUSCH = \left[\text{floor}\left(\frac{CURRENT\_slot \times 10}{numberOfSlotsPerFrame \times periodicity}\right)\right] \\ \text{modulo } nrofHARQ\text{Processes} + harq\text{-}ProcID\text{-}Offset\_i \quad (5)$$

In Equation 5, the feedback process ID offset harq-ProcID-Offset_i applies to the ith PDSCH transmission 420. In SPS configuration 400-*c*, the process ID offset may be incremented in sets of two (e.g., ProcessID-offset_i={0, 2, 4} for three PDSCH transmissions in a multi-PDSCH burst), although other offset values are possible. For example, for a starting PDSCH transmission 420 with a HARQ process ID of 0, the following PDSCH transmissions may have HARQ process IDs of 2 and 4 in accordance with an indicated offset of 2. For a starting PDSCH transmission 420 with a HARQ process ID of 1, the following PDSCH transmissions may have HARQ process IDs of 3 and 4 in accordance with the indicated offset of 2. In addition, SPS configuration 400-*c* may include a total number of six HARQ processes (e.g., nrofHARQ-Processes=6), where HARQ process ID values of 0 through 5 may be used.

In some examples, the DCI messages 410 may be activation DCI which activate the SPS configurations. For example, if the DCI message 410-*b* has a DCI format of 1_0, 1_1, or 1_2, the HARQ process number may be set to zero if a single SPS is configured for the UE and may be set to an index value (e.g., sps-config-index) to activate a specific SPS from multiple configured SPSs for the UE. Additionally or alternatively, RV fields of the DCI message 410 may have M bits, where M is the total number of PDSCH transmissions scheduled per multi-PDSCH burst (e.g., 3, as illustrated in FIG. 4). In some examples, the first two bits of the RV field may be set to zero, and a bit pattern may be defined for the additional M−2 bits (e.g., if M>2 bits). In some other examples, all M bits may be set to zero, where M is equal to the number of PDSCH transmission opportunities scheduled per multi-PDSH burst. In some examples, a DCI message 410 may be an activation DCI or a retransmission grant based on a value of an NDI included in the DCI. For example, an NDI value of zero may indicate an activation DCI and an NDI value of one may indicate a retransmission grant.

A base station 105 transmitting PDSCH in accordance with the SPS configurations 400-a, 400-b, and 400-c may determine a PDSCH transmission opportunity within the SPS multi-PDSCH bursts on which to begin downlink transmissions. In some cases, the base station 105 may begin transmitting at any of the PDSCH transmission opportunities within a burst. Alternatively, the base station 105 may be configured to start transmitting from the first PDSCH transmission opportunity within a burst (e.g., the base station 105 may refrain from starting downlink transmissions in a subsequent PDSCH transmission opportunity of a burst if the initial PDSCH transmission opportunity of the burst is not used for downlink signaling). In some cases, the base station 105 may configure an RRC parameter to enable the base station 105 to select between locations to begin transmitting PDSCH signaling (e.g., the base station 105 may select between beginning PDSCH transmissions at any of the PDSCH transmission opportunities or beginning PDSCH transmissions at the first PDSCH transmission opportunity in the burst). The UE 115 may receive the RRC parameter and determine monitoring behaviors based on the RRC parameter. For example, if the RRC parameter indicates that the base station 105 may start PDSCH signaling in any PDSCH transmission opportunity, the UE 115 may monitor each active PDSCH transmission opportunity in the SPS bursts. Alternatively, if the RRC parameter indicates that the base station 105 is configured to start PDSCH signaling in the first PDSCH transmission opportunity of a burst, the UE 115 may conserve power by refraining from monitoring subsequent PDSCH transmission opportunities within a burst if the UE 115 fails to detect PDSCH signaling in the initial PDSCH transmission opportunity of the burst. In some examples, the RRC parameter may include a demodulation reference signal (DMRS) bundling parameter (e.g., DMRSBundlingEnabled) to support DMRS bundling across the PDSCH burst. In such examples, when DMRS bundling is enabled, the UE 115 may begin PDSCH reception at the first PDSCH transmission opportunity of the burst, and if DMRS bundling is disabled, the UE 115 may begin PDSCH reception at any PDSCH transmission opportunity of the burst. In some other examples, the base station 105 may select between locations to begin transmitting the PDSCH signaling transparent to the UE 115.

Figure 5:
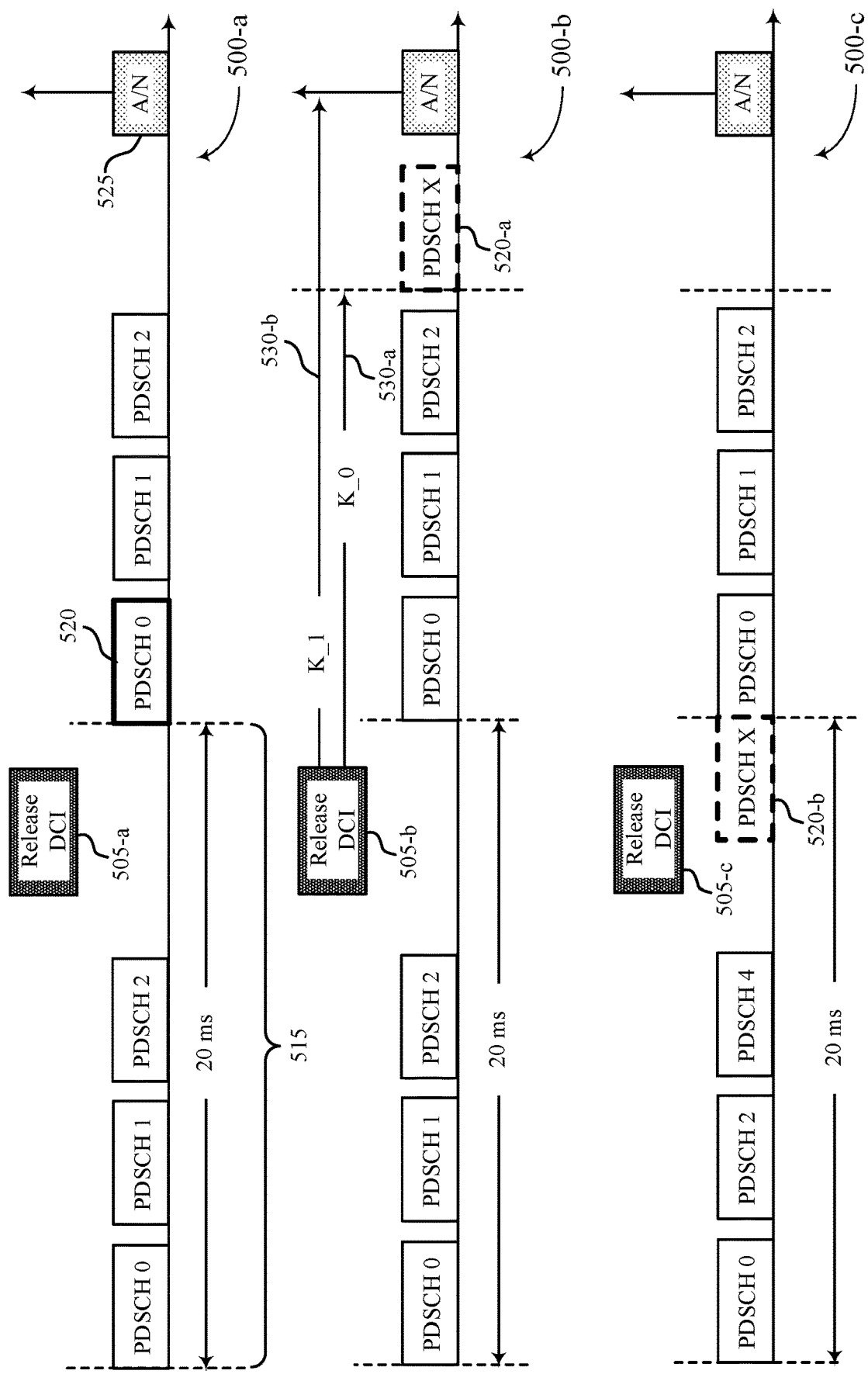

FIG. 5 illustrates an example of SPS configurations 500-a, 500-b, and 500-c that support configuring bursts of multiple downlink transmission opportunities in accordance with aspects of the present disclosure. For example, SPS configurations 500-a, 500-b, and 500-c may be implemented at or by one or more wireless devices such as a base station 105, a UE 115, or both, which may be examples of corresponding devices as described herein. The SPS configurations 500-a, 500-b, and 500-c may correspond to different techniques for releasing multi-PDSCH SPS configurations using a release DCI 505.

SPS configurations 500-a, 500-b, and 500-c may support multi-PDSCH signaling such that a single RRC or DCI message may schedule multiple shared channel transmissions in a configured SPS interval 515. In some such cases, the single DCI or RRC message may activate a longer burst of traffic as compared to an RRC or DCI message used to initiate an individual shared channel transmission. In addition, an activated SPS configuration may be released or deactivated using a release DCI 505 (e.g., a DCI format 1_0, 1_1, 1_2 having different values for one or more fields).

In some examples, the release DCI 505-a, 505-b, and 505-c may release or deactivate the SPS configurations 500-a, 500-b, and 500-c, respectively. For example, if a DCI message has a DCI format of 1_1 or 1_2, the HARQ process number may be set to zero if a single SPS is configured for the UE and may be set to an index value (e.g., sps-config-index) to indicate a specific SPS from multiple SPSs configured for the UE, the MCS field is set to one, the FDRA field is set to zero (for dynamic switch FDRA or FDRA type 0) or the FDRA field is set to one (for FDRA type 1). Additionally, an RV field of the DCI message may have M bits, where M is the total number of PDSCH transmission opportunities scheduled per multi-PDSCH burst. In some examples, the first two bits of the RV field may be set to zero, and a bit pattern may be defined for the additional M−2 bits (e.g., if M>2 bits). In some other examples, all M bits of the RV field may be set to zero, where M is equal to the number of PDSCH transmission opportunities scheduled per multi-PDSH burst. In some examples, a release DCI 505 may release a single SPS or a group of SPSs, for example, via an RRC configuration specifying a single SPS or a group of SPSs in a HARQ process ID parameter of the release DCI 505.

In some cases, a UE 115 may transmit HARQ feedback 525 (e.g., an ACK/NACK) to acknowledge the reception of the release DCI 505, for example using ACK/NACK bits in a type-1 HARQ codebook. The location of ACK/NACK bits for the release DCI 505 in the type-1 HARQ codebook may be based on the TDRA table entry included in or indicated by the release DCI 505. If the release DCI 505 is to release a single-PDSCH SPS configuration for a single PDSCH transmission (e.g., there may be one PDSCH transmission opportunity in each SPS interval 515), the UE 115 may generate the type-1 HARQ codebook to include the ACK/NACK bit at a location in the codebook corresponding to the slot location for the first SPS PDSCH to be transmitted if the UE would have not received the release DCI 505 (e.g., a location in the Type-1 HARQ-ACK codebook for HARQ-ACK information corresponding to a single PDSCH SPS release is the same as for a corresponding SPS PDSCH transmission, for example, based on a slot location of the SPS PDSCH transmission as described with reference to FIG. 4). In some such cases, the UE 115 may not receive another PDSCH transmission 520 in the PDSCH transmission opportunity associated with the ACK/NACK bit upon receiving release DCI 505 (e.g., such that the UE 115 does not experience a conflict between transmitting feedback information for the PDSCH transmission 520 and for the release DCI 505 in a same resource of the codebook). If the release DCI 505 is to release multiple SPS configurations, the location in the Type-1 HARQ-ACK codebook for HARQ-ACK information corresponding to multiple SPSs released by a single DCI is the same as releasing the SPS with the lowest SPS configuration index among the multiple SPSs to be released.

In SPS configuration 500-a (e.g., for releasing a multi-PDSCH SPS), an ACK/NACK bit to acknowledge the release DCI 505-a may be located within a type-1 HARQ codebook in a number of different locations (e.g., corresponding to different slot indices). In some examples, the ACK/NACK bit may be located in a resource corresponding to the first PDSCH transmission 520 within the multi-PDSCH SPS (e.g., corresponding to a HARQ process ID of 0), a last PDSCH transmission 520 within the multi-PDSCH SPS (e.g., corresponding to a HARQ process ID of 2), or another PDSCH transmission 520 within the first SPS multi-PDSCH burst if the UE would have not received the release DCI 505-a. For example, the UE 115 may generate HARQ feedback 525 for the release DCI 505-a based on a HARQ codebook and a resource in the HARQ codebook corresponding to the slot location for a first PDSCH transmission 520 in the next burst of the SPS configuration after the release DCI 505-a. The UE 115 may transmit the HARQ feedback 525 to the base station 105 in response to the release DCI 505-a. The base station 105 may receive the HARQ feedback 525 and may determine whether the release DCI 505-a was received successfully based on a location of an ACK/NACK bit in the HARQ codebook corresponding to the release DCI 505-a.

In SPS configuration 500-b, the ACK/NACK bit location in the HARQ codebook may be based on an imaginary PDSCH transmission 520-a (e.g., an "imaginary PDSCH"), where the location of the ACK/NACK information for the SPS release may be based on the TDRA field in the release DCI 505-b. For example, a base station 105 may configure a first offset value K0 530-a in the release DCI 505-b, which may indicate the offset between the release DCI 505-b and the imaginary PDSCH transmission 520-a, and a second offset value K1 530-b in the release DCI 505-b, which may indicate the offset between the release DCI 505-b and the HARQ feedback 525 transmission. In some such examples, the physical uplink control channel (PUCCH) occasion for transmitting the HARQ feedback 525 may be based on the value of K0, the value of K1, or both and the ACK/NACK information for the release DCI 505-b may be included in the codebook based on a slot index determined for the imaginary PDSCH transmission 520-a. In some examples, the TDRA entry indicated by the release DCI 505-b may have multiple SLIVs which may indicate multiple candidates for the location of the imaginary PDSCH transmission 520-a (e.g., "PDSCH X"). Additionally or alternatively, the location of the imaginary PDSCH transmission 520-a may be located at a first PDSCH transmission opportunity indicated by the TDRA entry, a last PDSCH transmission opportunity indicated by the TDRA entry, or at another PDSCH transmission opportunity indicated by the TDRA entry out of multiple SLIVs.

In SPS configuration 500-c, the ACK/NACK bit location in the HARQ codebook may be based on an imaginary PDSCH transmission 520-b (e.g., an "imaginary PDSCH") that is located at the same slot as the release DCI 505-c. For example, a base station 105 may configure a first offset value K0 530-a in the release DCI 505-c to be zero (e.g., such that the imaginary PDSCH transmission 520-b and the release DCI 505-c have a same slot location). The location of the ACK/NACK bit for the release DCI 505-c in the codebook may correspond to the slot in which the release DCI 505-c was received. In some such examples, the UE 115 may not receive scheduling for another SPS PDSCH transmission in the same slot (e.g., or in the same SPS time interval for the current burst) as the release DCI 505-c.

In some other examples, if the UE 115 is configured with multiple SPS configurations and a release DCI 505 is to release multiple SPSs, the UE 115 may select the SPS with a lowest configuration index (e.g., sps-ConfigIndex) or an index that satisfies some other criteria out of the multiple SPSs to release. If the SPS is a multi-PDSCH SPS configuration, the ACK/NACK bit to acknowledge the release DCI 505 may be located in a number of different locations (e.g., slot indices) by following a similar procedure as the release DCI 505-a. For example, the ACK/NACK bit may be located in the codebook according to a first PDSCH within SPS multi-PDSCH, a last PDSCH within the SPS multi-PDSCH, or another PDSCH within the multi-PDSCH burst for the SPS with the SPS index satisfying the criteria for feedback.

Figure 6:
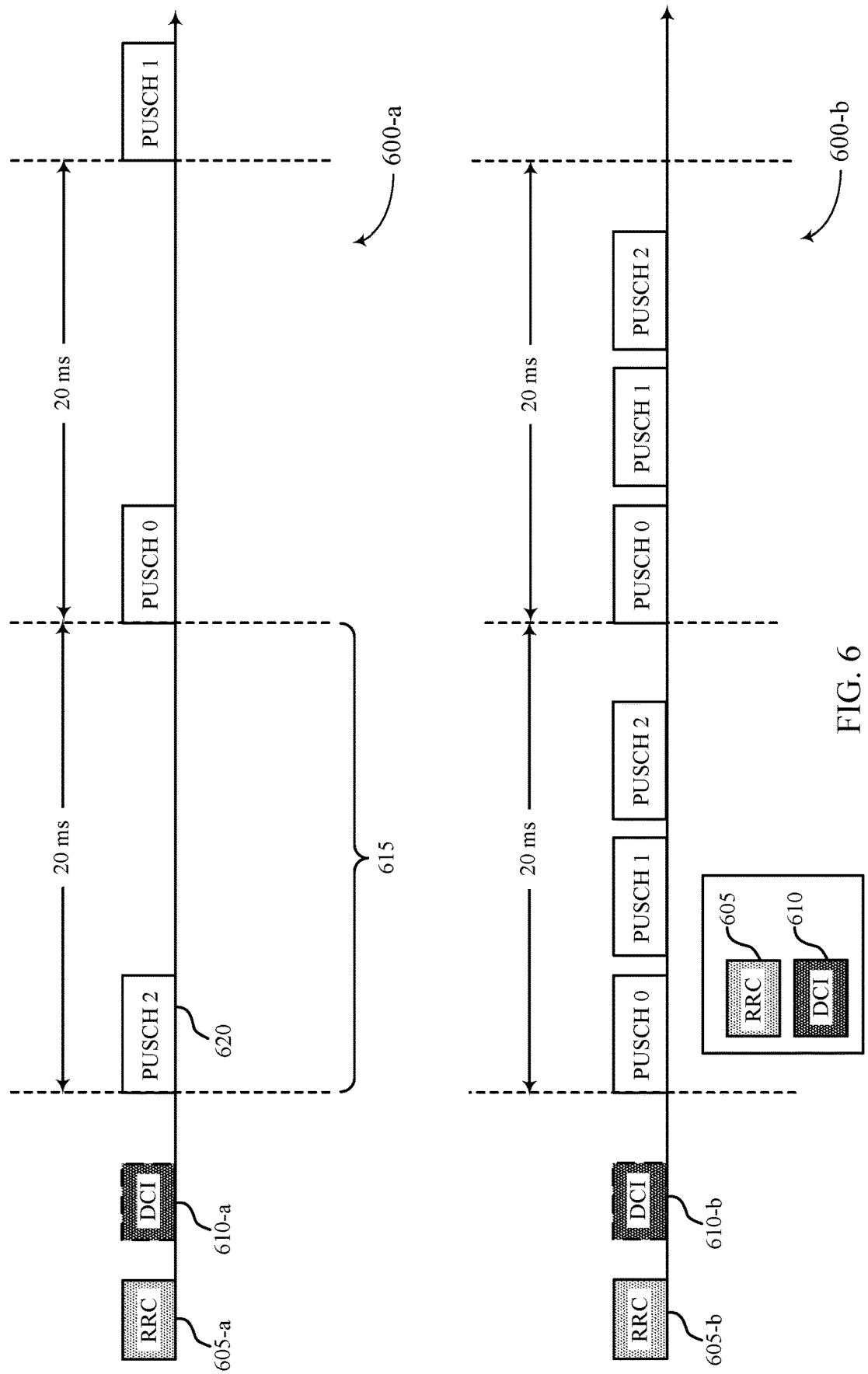
FIGS. 6 through 8 illustrate example CG configurations that support configuring bursts of one or more uplink transmission opportunities in accordance with aspects of the present disclosure.

FIG. 6 illustrates an example of CG configurations 600-a and 600-b that supports configuring bursts of multiple uplink transmission opportunities in accordance with aspects of the present disclosure. For example, CG configurations 600-a and 600-b may be implemented at or by one or more wireless devices such as a base station 105, a UE 115, or both, which may be examples of corresponding devices described herein.

CG configurations 600-a and 600-b may support transmitting one or multiple PUSCH transmissions 620 during a CG time interval 615, such as a 20 ms CG time interval 615. To support uplink CG signaling, a UE 115 may receive an uplink grant via control signaling such as RRC signaling 605, DCI 610, or both.

After an uplink grant is configured for a CG where there is one PUSCH transmission opportunity within each CG interval, as illustrated by CG configuration 600-a, a medium access control (MAC) entity may indicate that the Nth (N>=0) uplink grant occurs in a symbol based on Equation 6. That is, for a single-PUSCH CG configuration 600-a, the first symbol index for the Nth PUSCH transmission opportunity may be determined according to Equation 6.

$$[(SFN \times numberOfSlotsPerFrame \times numberOfSymbolsPerSlot) + (\text{slot number in the frame} \times numberOfSymbolsPerSlot) + \text{symbol number in the slot}] = [(SFN_{start\ time} \times numberOfSlotsPerFrame \times numberOfSymbolsPerSlot + slotstart\ time \times numberOfSymbolsPerSlot + symbolstart\ time) + N \times periodicity] \bmod (1024 \times numberOfSlotsPerFrame \times numberOfSymbolsPerSlot) \quad (6)$$

The SFNstart time, slotstart time, and symbolstart time are the SFN, slot, and symbol, respectively, of the first transmission opportunity of PUSCH after the configured uplink grant is initialized or re-initialized. The periodicity may be measured in symbols.

CG configuration 600-a may support uplink CG transmissions of PUSCH during each configured time interval 615 (e.g., one PUSCH transmission 620 per 20 ms). A base station 105 may transmit a CG to the UE 115, which may indicate scheduling for transmitting PUSCH. In some examples, the UE 115 may receive RRC signaling 605-a, DCI 610-a, or both which indicate the uplink CG scheduling the uplink transmission occasions for the UE 115. In single-PUSCH CG scheduling, the RRC signaling 605-a may include a number of parameters to configure uplink CG information. For example, the RRC signaling 605-a may include an indication of a number of HARQ processes associated with the CG PUSCH and associated HARQ parameters (e.g., nrofHARQ-Processes, harq-ProcID-Offset-r16, harq-CodebookID-r16), a CG periodicity defining the time interval 615 (e.g., periodicity, periodicityExt-r16), an MCS configuration (e.g., Mcs=table), or some combination of these or other CG parameters.

For the CG configuration 600-a, the RRC signaling 605-a or the DCI 610-a may indicate an activation or release of the CG configuration. For example, if the DCI 610-a has a DCI format of 0_0, 1_1, or 1_2, RV fields of the DCI are set to zero, and the HARQ process number is set as 0 if there is one CG configured for the UE or the HARQ process number is set as the configuration index of the CG out of a set of CG configurations for the UE, the DCI 610-a may indicate an activation of the CG configuration. Additionally or alternatively, if RV fields of the DCI 610-a are set to zero, the MCS field value is set to one, the HARQ process number is set to zero if there is one CG configured for the UE or the HARQ process number is set as the configuration index of the CG out of a set of CG configurations for the UE, and the FDRA field is set to zero (for FDRA type 2 with 30 kHz subcarrier spacing (SCS)) or the FDRA field is set to one otherwise, the DCI 610-a may indicate a release of the CG configuration.

Based on information received in the RRC signaling 605-a, DCI 610-a, or both, the UE 115 may transmit data (e.g., a PUSCH transmission 620) in a single uplink transmission opportunity per CG time interval and in accordance with the uplink grant, such as once every 20 ms in the example illustrated in FIG. 6.

In some other examples, such as in CG configuration 600-b, a UE may be configured with a CG configuration which supports scheduling of multiple PUSCH transmission opportunities per CG time interval 615, for example, multiple uplink CG opportunities per 20 ms interval. The scheduling of the multiple PUSCH transmission opportunities may reduce control signaling overhead (e.g., relative to single-PUSCH CG scheduling) and may increase throughput to enhance overall uplink scheduling efficiency. In some such examples, the RRC signaling 605-b, DCI 610-b, or both may indicate multiple uplink CG occasions per CG interval (e.g., multiple PUSCH transmission opportunities for PUSCH transmissions 620 per 20 ms interval). In some cases, to indicate multiple PUSCH transmission opportunities per CG interval, the RRC signaling 605 or the DCI 610 may include a TDRA field which indicates M valid SLIVs. Additionally or alternatively, the RRC signaling 605-b or the DCI 610-b may include a parameter M to explicitly configure the number of PUSCH transmission opportunities per CG interval, and the RRC signaling 605-b or the DCI 610-b may also include or indicate a TDRA table entry which includes M or more valid SLIVs. The first M, or the last M, or a bit-map-indicated M SLIVs may be chosen (e.g., configured) out of the M or more SLIVs in the TDRA table entry.

For the multiple-PUSCH CG configuration 600-b, the RRC signaling 605-b or the DCI 610-b may indicate an activation or deactivation (e.g., release) of the CG configuration. For example, if the DCI 610-b has a DCI format of 0_0, 1_1, or 1_2, RV fields of the DCI are set to zero, and the HARQ process number is set to zero if one CG is configured for the UE or the HARQ process number is set as the configuration index (e.g., config index) of a CG configuration out of a set of CG configurations configured for the UE, the DCI 610-b may indicate an activation of the CG configuration. Additionally or alternatively, if RV fields of the DCI 610-b are set to zero, the MCS field value is set to one, the FDRA field is set to zero (for FDRA type 2 with 30 kHz SCS) or the FDRA field is set to one otherwise, and the HARQ process number is set to zero if one CG is configured for the UE or the HARQ process number is set as the configuration index (e.g., config index) of a CG configuration out of a set of CG configurations if the UE is configured with multiple CG configurations, the DCI 610-b may indicate a release of the CG configuration.

In some cases, the UE 115 may calculate frequency resources to use for transmitting HARQ feedback. For example, the DCI 610 may include an indication of the number of HARQ processes corresponding to the CG configuration (e.g., for CG configurations 600-a and 600-b, the corresponding number of HARQ processes may be equal to three, or nrofHARQProcesses=3). The UE 115 may use the number of HARQ processes to determine a HARQ process ID corresponding to each PUSCH transmission 620.

Figure 7:
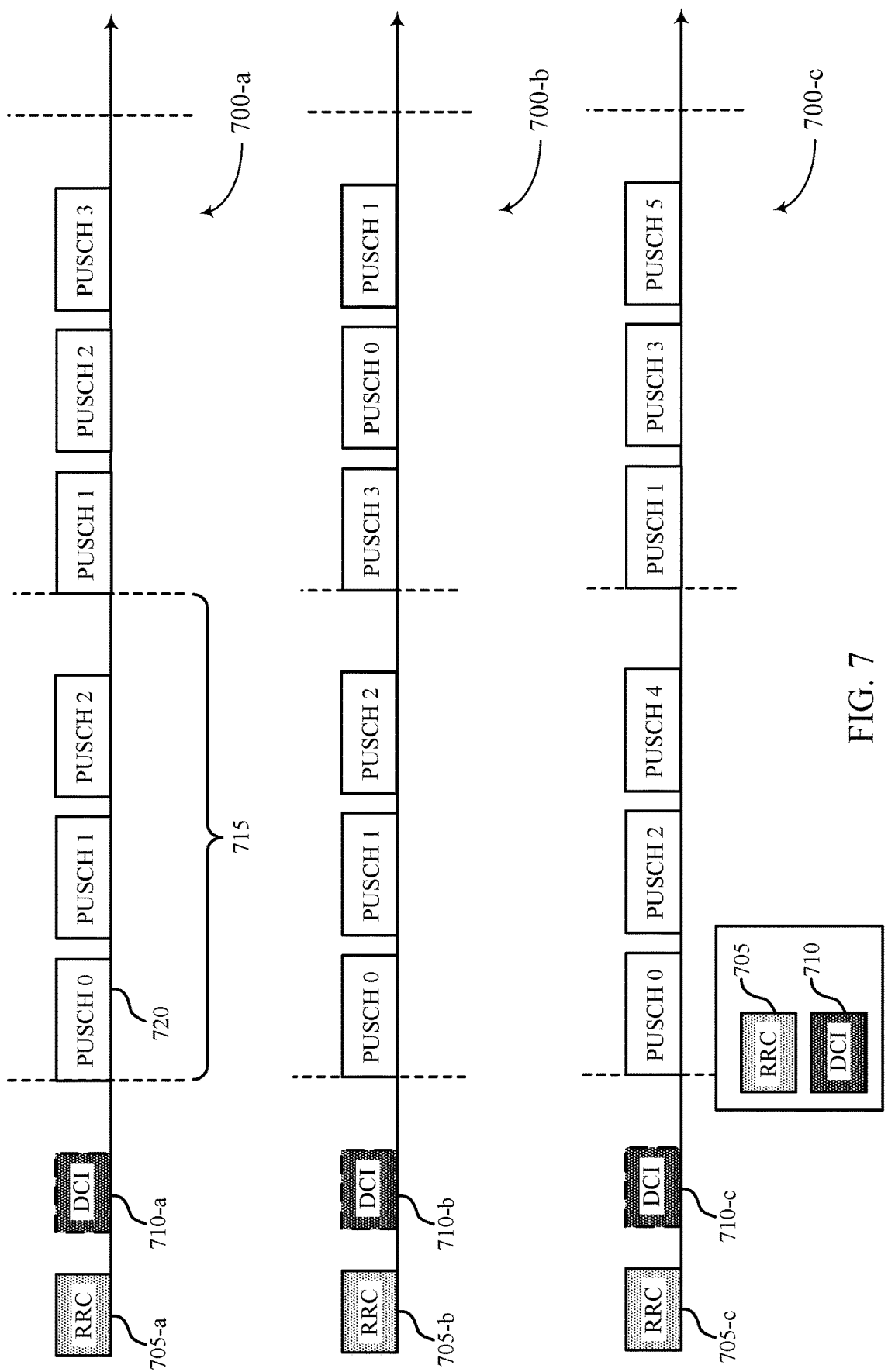

FIG. 7 illustrates example CG configurations 700-a, 700-b, and 700-c that support configuring bursts of multiple uplink transmission opportunities in accordance with aspects of the present disclosure. For example, CG configurations 700-a, 700-b, and 700-c may be implemented at or by one or more wireless devices such as a base station 105, a UE 115, or both, which may be examples of corresponding devices described herein. The CG configurations 700-a, 700-b, and 700-c may correspond to different techniques for determining feedback process identifiers (e.g., HARQ process IDs) for multi-PUSCH CG configurations.

CG configurations 700-a, 700-b, and 700-c may support multi-PUSCH signaling such that a single RRC message 705 or DCI message 710 may schedule a burst of multiple shared channel transmissions in a CG interval 715. In some such cases, the single DCI message 710 or RRC message 705 may activate a longer burst of traffic as compared to an RRC or DCI message used to initiate an individual shared channel transmission.

In some examples, the RRC message 705 or the DCI message 710 may include information that a UE 115 may use to determine one or more symbol indices, slot indices, or both for PUSCH transmissions 720. For example, the UE 115 may calculate a symbol index and a slot index of a first PUSCH of the multi-PUSCH CG configuration and may use the symbol index and the slot index of the first PUSCH to calculate symbol indices and slot indices for one or more additional PUSCHs (e.g., up to the Mth PUSCH) of the multi-PUSCH configuration. The UE 115 may determine a symbol index, a slot index, or both for the first PUSCH of the Nth multi-PUSCH burst using Equation 6 described herein.

Upon determining the first slot index, the UE 115 may determine the symbol indices and the slot indices for subsequent M−1 PUSCHs based on the first slot index and a slot offset or a SLIV indicated in a TDRA table. In some cases, the TDRA table may be included in or indicated by the RRC message 705, or the TDRA table may be included in or indicated by the DCI message 710.

Additionally or alternatively, the UE 115 may determine a HARQ process ID for each PUSCH transmission 720 of the multi-PUSCH transmission configuration. For example, in CG configuration 700-a, the UE 115 may receive an RRC message 705-a, a DCI message 710-a, or both which activates the CG configuration 700-a. The UE 115 may determine a HARQ process ID for the first PUSCH transmission 720 of the multi-PUSCH configuration using Equation 7 and in accordance with a configured number of HARQ processes (e.g., nrofHARQ-Processes=4, (0, 1, 2, 3)) for the multi-PUSCH configuration, where the number of HARQ processes is equal to or larger than the number of PUSCH transmission opportunities scheduled per burst.

$$HARQProcessID = \tag{7}$$
$$\left[\text{floor}\left(\frac{CURRENT\_symbol}{periodicity}\right)\right] \text{modulo } nrofHARQProcesses +$$
$$harq - ProcID - \text{Offset}$$

To determine subsequent M−1 HARQ process IDs for the subsequent M−1 PUSCH transmissions 720, the HARQ process ID value may be increased iteratively by 1 (e.g., increased by 1 from 0 for the first PUSCH transmission 720 to 1 for the second PUSCH transmission 720, then to 2 for the third PUSCH transmission 720). In some cases, the UE 115 may determine the HARQ process ID value using Equation 7 for the first PUSCH transmission 720 in each burst of the multi-PUSCH CG configuration. Accordingly, one or more HARQ process IDs may be reused before all HARQ process IDs are used (e.g., across bursts).

In CG configuration 700-b, a UE 115 may receive an RRC message 705-b, a DCI message 710-b, or both which activates the CG configuration 700-b. The UE 115 may determine a HARQ process ID for the first PUSCH transmission 720 of the multi-PUSCH configuration (e.g., the first PUSCH scheduled after the activation DCI in a first burst) using Equation 8 and in accordance with a configured number of HARQ processes (e.g., nrofHARQ-Processes=4, (0, 1, 2, 3)) for the multi-PUSCH CG configuration.

$$HARQProcessID \text{ for } i-th \text{ PUSCH} = \tag{8}$$
$$\left\{\# \text{ of activated } PUSCHs \times \left[\text{floor}\left(\frac{CURRENT\_symbol}{periodicity}\right)\right]\right\}$$
$$\text{modulo } nrofHARQProcesses + harq - ProcID - \text{Offset}$$

In some such cases, the number of HARQ processes may be equal to or larger than the number of PUSCH transmission opportunities scheduled per burst. The UE 115 may determine the HARQ process ID for the first PUSCH transmission in the N-th burst as $(HARQ_{N-1,M-1}+1)$ modulo nrofHARQ-Processes+harq-ProcID-Offset, where the HARQ process ID used by the last PUSCH of the (N−1)th PUSCH burst is $HARQ_{N-1,M-1}$, and M is the number of PUSCHs in the (N−1)th burst. In such examples, the first PUSCH in the Nth PUSCH burst may use a HARQ process ID of $(HARQ_{N-1,M-1}+1)$ modulo nrofHARQ-Processes+harq-ProcID-Offset, the HARQ process ID for the second PUSCH may be increased by 1 relative to the first HARQ process ID, and so on.

Stated alternatively, in CG configuration 700-b, the UE 115 may reference a HARQ process ID used as the last HARQ process ID in a previous CG burst, and begin numbering in a subsequent burst using the last HARQ process ID from the previous burst (e.g., incrementing by one). For example, a first multi-PUSCH burst in CG configuration 700-b may include a first PUSCH transmission 720 corresponding to a HARQ process ID of 0 (e.g., based on Equation 8), a second PUSCH transmission 720 corresponding to a HARQ process ID of 1 (e.g., based on incrementing the HARQ process ID value), and a third PUSCH transmission 720 corresponding to a HARQ process ID of 2. The second multi-PUSCH burst may include a first PUSCH transmission 720 corresponding to a HARQ process ID of 3 (e.g., based on incrementing the HARQ process ID value of the last PUSCH transmission 720 in the preceding burst), a second PUSCH transmission 720 corresponding to a HARQ process ID of 0 (e.g., based on incrementing past the maximum HARQ process ID value allowed for the CG and returning to 0), and a third PUSCH transmission 720 corresponding to a HARQ process ID of 1.

In CG configuration 700-c, a UE 115 may receive an RRC message 705-c, a DCI message 710-c, or both which activates the CG configuration 700-c. The UE 115 may determine a HARQ process ID for the $i^{th}$ PUSCH transmission 720 of the multi-PUSCH CG configuration using Equation 9.

$$HARQProcessID \text{ for } i-th \text{ PUSCH} = \tag{9}$$
$$\left\{\left[\text{floor}\left(\frac{CURRENT\_symbol}{periodicity}\right)\right]\right\} \text{modulo } nrofHARQProcesses +$$
$$harq - ProcID - \text{Offset}\_i$$

In Equation 9, the process ID offset harq-ProciD-Offset_i applies to the ith PUSCH or SLIV. In CG configuration 700-c, the process ID offset may be incremented by two (e.g., ProcessID-offset_i={0, 2, 4}), although other offset values are possible. For example, for a starting PUSCH transmission 720 corresponding to a HARQ process ID value of 0, the following PUSCH transmissions 720 may correspond to a HARQ process ID of 2 and a HARQ process ID of 4 in accordance with the indicated offset of 2. For a starting PUSCH transmission 720 corresponding to a HARQ process ID of 1, the following PUSCH transmissions 720 may correspond to HARQ process IDs of 3 and 5 in accordance with the indicated offset of 2. In addition, CG configuration 700-c may include a total number of six HARQ processes (e.g., nrofHARQ-Processes=6), such that HARQ process ID values 0 through 5 may be used for HARQ feedback.

In some examples, a UE 115 may use a CG timer (e.g., ConfiguredGrantTimer) to determine a time to protect a HARQ buffer when performing uplink transmissions. For example, in some cases, when the UE 115 transmits a PUSCH transmission 720, the UE 115 may begin a respective CG timer. While the CG timer is running, the UE 115 may maintain information in a HARQ buffer for retransmitting the PUSCH transmission 720 if the base station 105 fails to successfully receive or decode the PUSCH transmission 720 and, for example, resends a grant or returns a NACK for the PUSCH transmission 720. For a multi-PUSCH CG configuration, the UE 115 may use multiple CG timers, where different CG timers count for different PUSCH transmissions individually. The duration of a CG timer may not be shorter than the duration of each CG burst. In some other examples, the UE 115 may initiate the CG timers for the PUSCH transmissions 720 in a burst after transmission of the last PUSCH transmission 720 in the CG burst. In such examples, the counting (e.g., the active duration(s) of the timer(s)) may apply to all PUSCH transmissions 720 in the multi-PUSCH burst.

In some examples, a DCI message 710 may be an activation DCI which activates a CG configuration (e.g., for a type-2 CG configuration). For example, if the DCI message 710 has a DCI format of 0_0, 0_1, or 0_2, and the HARQ process number is set to zero for a single CG or is set to an index value to indicate a specific CG from multiple CGs, the DCI message 710 may indicate a CG configuration for activation. Additionally or alternatively, an RV field of the DCI message 710 may have M bits, where M is the total number of PUSCH transmission opportunities scheduled per multi-PUSCH burst. In some examples, the first two bits of the RV field may be set to zero, and a bit pattern may be defined for the additional M−2 bits (e.g., if M>2 bits). In some other examples, all M bits may be set to zero, where M is equal to the number of PUSCH transmission opportunities scheduled per multi-PUSCH burst. In some examples, a DCI message 710 may be an activation DCI or a retransmission grant based on a value of an NDI field included in the DCI. For example, an NDI value of zero may indicate an activation DCI and an NDI value of one may indicate a retransmission grant. In some examples, the DCI message 710 may fully or partially activate a multi-PUSCH CG configuration, fully or partially deactivate or release a multi-PUSCH CG configuration, or both (e.g., similar to multi-PDSCH SPS as described herein).

A UE 115 transmitting a PUSCH transmission 720 in accordance with the CG configurations 700-a, 700-b, or 700-c may determine a PUSCH transmission opportunity on which to begin transmissions. In some examples, the starting position of the uplink CG may be in the middle of a repetition when an RV for the repetition is zero (e.g., when startingFromRV0 is set to "on"). In some cases, the UE 115 may begin transmitting at any of the PUSCH transmission opportunities in a multi-PUSCH burst. In some other cases, the UE 115 may start transmitting from the first PUSCH transmission opportunity in a multi-PUSCH burst (e.g., and may refrain from starting with a subsequent PUSCH transmission opportunity in the burst if the first PUSCH transmission opportunity is not used). In some other cases, the base station 105 may select between configurations for PUSCH transmission opportunity selection, and the UE 115 may receive an RRC parameter configuring the UE 115 to either begin transmitting PUSCH transmissions 720 in a first PUSCH transmission opportunity of a burst or to begin transmitting PUSCH transmissions 720 in any PUSCH transmission opportunities of a burst. In some cases, the UE 115 may transmit the PUSCH transmissions 720 without slot gaps to maintain phase coherence. Additionally or alternatively, the UE 115 may piggyback additional uplink control information (UCI) with the PUSCH transmissions 720.

Figure 8:
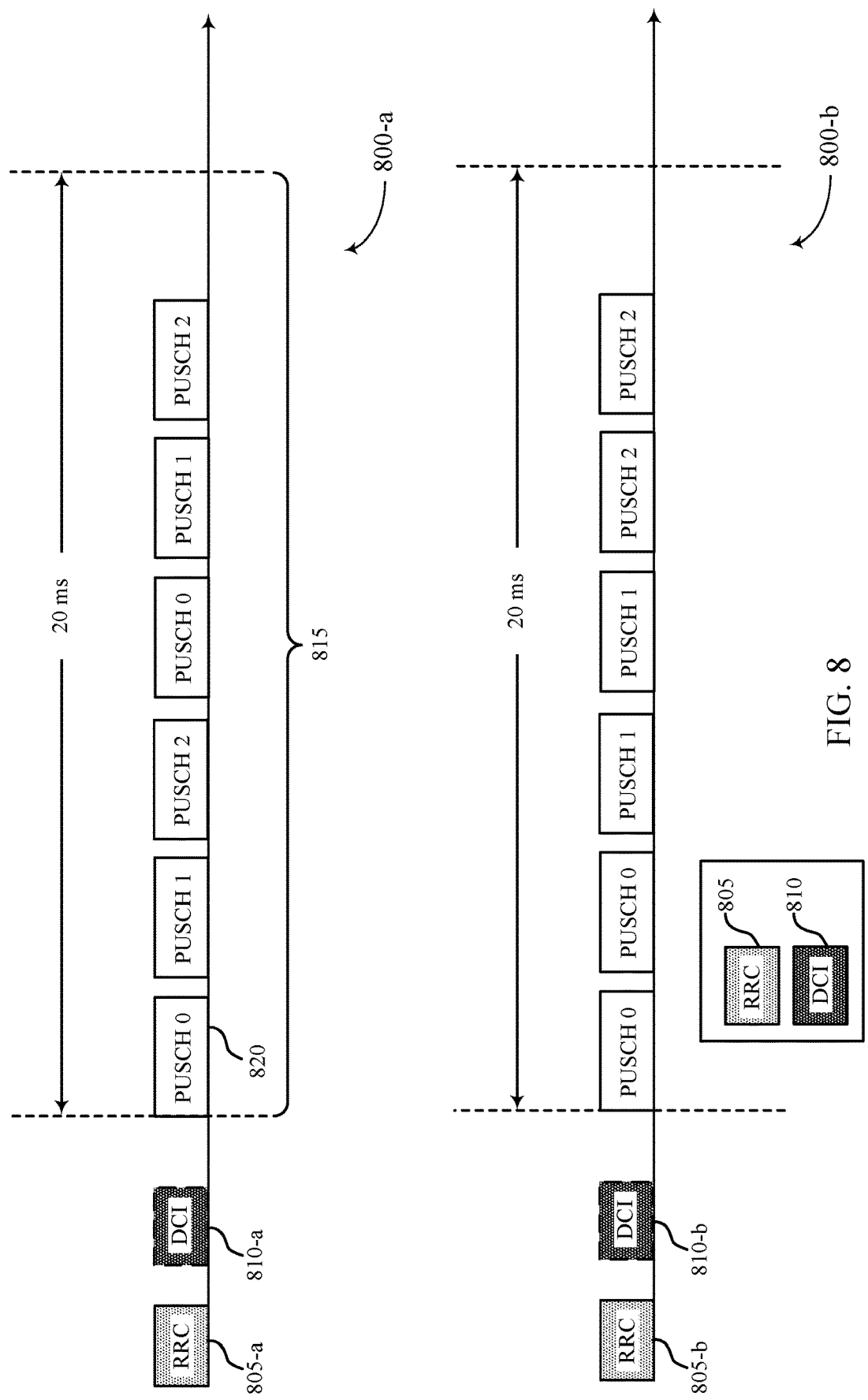

FIG. 8 illustrates example CG configurations 800-a and 800-b that support configuring bursts of multiple uplink transmission opportunities in accordance with aspects of the present disclosure. For example, CG configurations 800-a and 800-b may be implemented at or by one or more wireless devices such as a base station 105, a UE 115, or both, which may be examples of corresponding devices described herein.

CG configurations 800-a and 800-b may support multi-PUSCH signaling such that a single RRC message 805 may schedule multiple shared channel transmissions in a CG interval 815. In some such cases, a single DCI message 810 or RRC message 805 may activate a longer burst of traffic as compared to an RRC or DCI message used to initiate an individual shared channel transmission.

In CG configuration 800-a, a UE 115 may use a repetition factor k and a time domain pattern to transmit repetitions of PUSCH transmissions 820 based on a multi-PUSCH scheduling received in an RRC message 805-a, a DCI message 810-a, or both. In some cases, transmitting one or more repetitions of the PUSCH transmissions 820 may increase uplink signaling reliability. The repetition factor k may be applied to all PUSCH transmissions 820 (or a subset of PUSCH transmissions 820), and the time domain pattern may be applied such that the UE 115 completes a first repetition for all PUSCH transmissions 820 (e.g., a first PUSCH transmission corresponding to a HARQ process ID of 0, a first PUSCH transmission corresponding to a HARQ process ID of 1, and a first PUSCH transmission corresponding to a HARQ process ID of 2), then completes a second repetition for all of the PUSCH transmissions 820 (e.g., a repetition of the first PUSCH transmission corresponding to the HARQ process ID of 0, a repetition of the first PUSCH transmission corresponding to the HARQ process ID of 1, and a repetition of the first PUSCH transmission corresponding to the HARQ process ID of 2).

In CG configuration 800-b, the UE 115 may implement a repetition factor $k_i$ and a time domain pattern to transmit repetitions of PUSCH transmissions 820 based on a multi-PUSCH scheduling received in an RRC message 805-b, a DCI message 810-b, or both. In CG configuration 800-b, a PUSCH transmission 820 may have its own respective repetition factor $k_i$ and the time domain pattern be such that a repetition is applied to a first PUSCH transmission 820 (e.g., a first PUSCH transmission corresponding to a HARQ process ID of 0 is transmitted, then a repetition of the first PUSCH transmission corresponding to the HARQ process ID of 0 is transmitted subsequently) before transmitting a second PUSCH transmission 820. For example, after transmitting the repetitions for the first PUSCH transmission 820 in the multi-PUSCH burst, the UE 115 may transmit a PUSCH transmission 820 corresponding to a HARQ process ID of 1 and one or more repetitions for this PUSCH transmission 820, then a PUSCH transmission 820 corresponding to a HARQ process ID of 2 and one or more repetitions for this PUSCH transmission 820.

Figure 9:
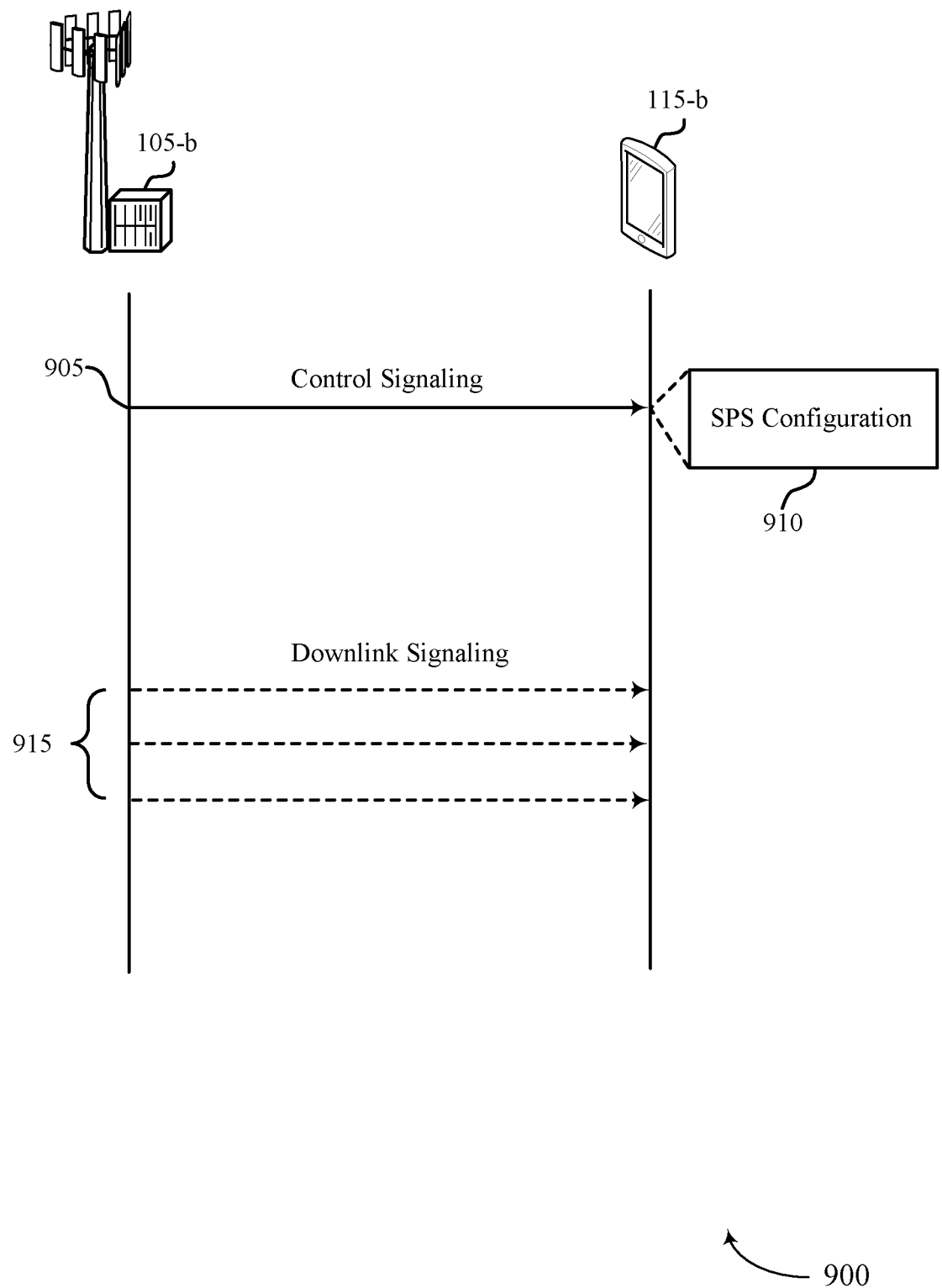
FIGS. 9 and 10 illustrate example process flows that support SPS and CGs configuring bursts of multiple transmission opportunities in accordance with aspects of the present disclosure.

FIG. 9 illustrates an example of a process flow 900 that supports SPS and CGs configuring bursts of multiple transmission opportunities in accordance with aspects of the present disclosure. For example, the process flow 900 may include communications between a base station 105-b and a UE 115-b, which may be examples of a base station 105 and a UE 115 described with reference to FIGS. 1 and 2. In the following description of the process flow 900, the communications between the base station 105-b and the UE 115-b may be transmitted in a different order than the example order shown, or the operations may be performed in different orders or at different times or by different devices. Additionally or alternatively, some operations may also be omitted from the process flow 900, and other operations may be added to the process flow 900.

At 905, the base station 105-b may transmit, and the UE 115-b may receive, control signaling indicating an SPS configuration 910. The SPS configuration 910 may schedule a burst of multiple downlink shared channel transmission opportunities within a time interval of the SPS configuration. That is, the SPS configuration 910 may configure multiple bursts according to a periodicity of the SPS configuration 910, where each burst includes multiple configured resource occasions for PDSCH transmissions.

In some examples, the UE 115-b may determine a first slot index for a first downlink shared channel transmission opportunity of the multiple downlink shared channel transmission opportunities and a second slot index for a second downlink shared channel transmission opportunity of the multiple downlink shared channel transmission opportunities. The UE 115-b may determine the second slot index based on the first slot index and an SLIV value included in a TDRA table entry indicated by the control signaling.

In some examples, the UE 115-b may determine a first feedback (e.g., HARQ) process identifier using a formula (e.g., an equation, as described herein) associated with a first downlink shared channel transmission opportunity of the multiple downlink shared channel transmission opportunities and may determine a second feedback process identifier associated with a second downlink shared channel transmission based on incrementing the first feedback process identifier. The UE 115-*b* may determine a third feedback process identifier using the formula associated with a first downlink shared channel transmission opportunity of the multiple downlink shared channel transmission opportunities. In some other cases, the UE 115-*b* may determine the third feedback process identifier based on incrementing a last feedback process identifier associated with a last downlink shared channel transmission opportunity of the multiple downlink shared transmission opportunities. In some other examples, the UE 115-*b* may determine the second and third feedback process identifiers based on applying respective feedback process identifier values to the formula used to determine the first feedback process identifier.

In some cases, the UE 115-*b* may receive DCI signaling (activated by RRC) which includes a feedback process identifier bit field configured with an index value indicating the SPS configuration 910. The DCI signaling may activate the SPS configuration based on the feedback process identifier bit field of the DCI signaling. In some examples, the DCI signaling may activate the SPS configuration based on the DCI including an RV bit field configured with at least a threshold quantity of initial bits set to zero, configured with all bits set to zero, or both. In some examples, the DCI signaling may activate a subset of the multiple downlink shared channel transmission opportunities based on the DCI signaling including an RV bit field which activates each downlink shared channel transmission opportunity of the subset using a corresponding bit of the RV bit field.

In some examples, the DCI signaling may activate a subset of consecutive downlink shared channel transmission opportunities of the multiple downlink shared channel transmission opportunities based on an RV bit field in the DCI. In some such examples, the RV bit field may include a quantity of consecutive bits set to zero indicating a corresponding quantity of the subset of activated consecutive downlink shared channel transmission opportunities. In some other examples, the DCI may include an NDI bit field indicating activation of the SPS configuration, activation of a subset of the multiple downlink shared channel transmission opportunities for the SPS configuration, or a retransmission grant.

In some other examples, the UE 115-*b* may receive a second DCI (e.g., a deactivation or release DCI) which includes a second feedback process identifier bit field configured with a second index value indicating the SPS configuration. Based on receiving the second DCI, the UE 115-*b* may deactivate one or more of the multiple downlink shared channel transmission opportunities for the SPS configuration based on one or more bit values of an RV bit field of the second DCI.

In some other examples, the UE 115-*b* may transmit an indication of an acknowledgment bit for the DCI indicating the deactivation of the SPS configuration. For example, the UE 115-*b* may generate a codebook which includes the acknowledgment bit. The location of the acknowledgment bit may be at a first downlink shared channel transmission opportunity of the multiple downlink shared channel transmission opportunities, a last downlink shared channel transmission opportunity of the multiple downlink shared channel transmission opportunities, a number of downlink shared channel transmission opportunities of the multiple downlink shared channel transmission opportunities, or a combination thereof for the SPS configuration. In some other cases, the location of the acknowledgment bit corresponds to a TDRA field value included in the DCI signaling indicating the release, a same slot in which the DCI signaling is received, or a combination thereof. In some cases, the DCI signaling may indicate more than one release of SPS configurations, and the indication of the acknowledgment bit corresponds to a first SPS configuration of multiple SPS configurations with an SPS configuration index value satisfying a threshold.

At 915, the base station 105-*b* may transmit, and the UE 115-*b* may receive, downlink signaling in a downlink shared channel transmission opportunity of the multiple downlink shared channel transmission opportunities based on the SPS configuration 910.

In some cases, the UE 115-*b* may receive an initial portion of the downlink signaling in an initial downlink shared channel transmission opportunity of the multiple downlink shared channel transmission opportunities associated with a burst of the SPS configuration or in any downlink shared channel transmission opportunity of the multiple downlink shared channel transmission opportunities associated with the burst. In some examples, the UE 115-*b* may receive RRC signaling which indicates that the downlink signaling is configured to start at the initial downlink shared channel transmission opportunity or at any downlink shared channel transmission opportunity.

Figure 10:
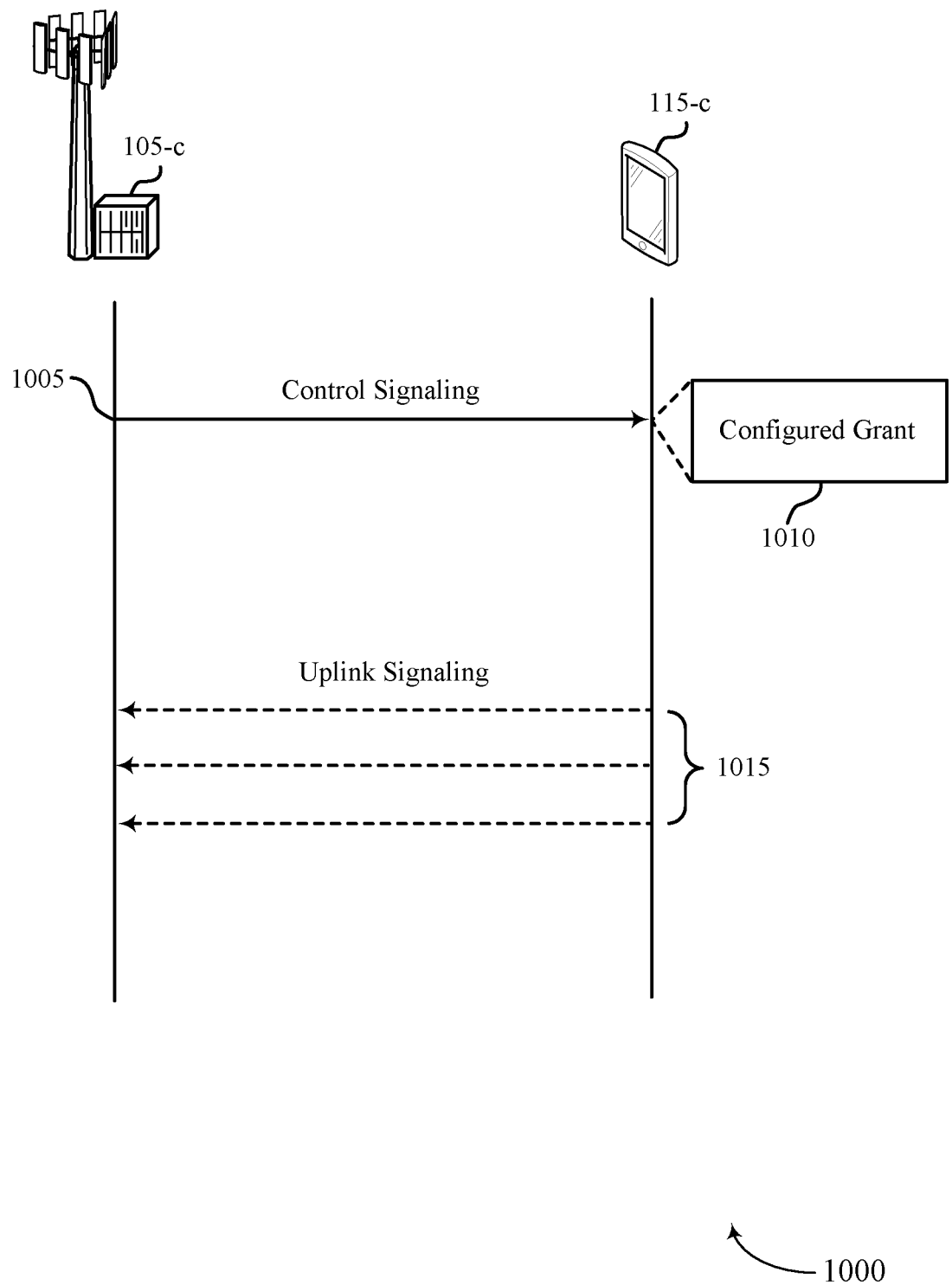

FIG. 10 illustrates an example of a process flow 1000 that supports SPS and CGs configuring bursts of multiple transmission opportunities in accordance with aspects of the present disclosure. For example, the process flow 1000 may include communications between a base station 105-*c* and a UE 115-*c*, which may be examples of a base station 105 and a UE 115 described with reference to FIGS. 1 and 2. In the following description of the process flow 1000, the communications between the base station 105-*c* and the UE 115-*c* may be transmitted in a different order than the example order shown, or the operations may be performed in different orders or at different times or by different devices. Additionally or alternatively, some operations may also be omitted from the process flow 1000, and other operations may be added to the process flow 1000.

At 1005, the base station 105-*c* may transmit, and the UE 115-*c* may receive, control signaling indicating a CG 1010 which schedules a burst of multiple uplink shared channel transmission opportunities within a time interval for the CG. That is, the CG 1010 may configure multiple bursts according to a periodicity of the CG 1010, where each burst includes multiple configured resource occasions for PUSCH transmissions.

In some examples, the UE 115-*c* may determine a first symbol index and a first slot index for a first uplink shared channel transmission opportunity of the multiple uplink shared channel transmission opportunities and a second slot index for a second uplink shared channel transmission opportunity of the multiple uplink shared channel transmission opportunities. The UE 115-*c* may determine the second slot index based on the first slot index and an SLIV value included in a TDRA table entry indicated by the control signaling.

In some examples, the UE 115-*c* may determine a first feedback (e.g., HARQ) process identifier using a formula (e.g., an equation, as described herein) associated with a first uplink shared channel transmission opportunity of the multiple uplink shared channel transmission opportunities and may determine a second feedback process identifier associated with a second uplink shared channel transmission based on incrementing the first feedback process identifier. The UE 115-*c* may determine a third feedback process identifier using the formula associated with a first uplink shared channel transmission opportunity of the multiple uplink shared channel transmission opportunities. In some other cases, the UE 115-c may determine the third feedback process identifier based on incrementing a last feedback process identifier associated with a last uplink shared channel transmission opportunity of the multiple uplink shared transmission opportunities. In some other examples, the UE 115-c may determine the second and third feedback process identifiers based on applying respective feedback process identifier values to the formula used to determine the first feedback process identifier.

In some cases, the UE 115-c may receive DCI signaling (activated by RRC) which includes a feedback process identifier bit field configured with an index value indicating the CG 1010. The DCI signaling may activate the CG based on the feedback process identifier bit field of the DCI signaling. In some examples, the DCI signaling may activate the CG based on the DCI including an RV bit field configured with at least a threshold quantity of initial bits set to zero, configured with all bits set to zero, or both. In some examples, the DCI signaling may activate a subset of the multiple uplink shared channel transmission opportunities based on the DCI signaling including an RV bit field which activates each uplink shared channel transmission opportunity of the subset using a corresponding bit of the RV bit field.

In some examples, the DCI signaling may activate a subset of consecutive uplink shared channel transmission opportunities of the multiple uplink shared channel transmission opportunities based on an RV bit field in the DCI. In some such examples, the RV bit field may include a quantity of consecutive bits set to zero indicating a corresponding quantity of the subset of activated consecutive uplink shared channel transmission opportunities. In some other examples, the DCI may include an NDI bit field indicating activation of the CG, activation of a subset of the multiple uplink shared channel transmission opportunities for the CG, or a retransmission grant.

At 1015, the UE 115-c may transmit, and the base station 105-c may receive, uplink signaling in an uplink shared channel transmission opportunity of the multiple uplink shared channel transmission opportunities based on the CG 1010.

In some cases, the UE 115-c may transmit an initial portion of the uplink signaling in an initial uplink shared channel transmission opportunity of the multiple uplink shared channel transmission opportunities associated with a burst of the CG or in any uplink shared channel transmission opportunity of the multiple uplink shared channel transmission opportunities associated with the burst. In some examples, the UE 115-c may receive RRC signaling which indicates that the uplink signaling is configured to start at the initial uplink shared channel transmission opportunity or at any uplink shared channel transmission opportunity.

In some cases, the UE 115-c may initiate one or more timers based on transmitting the uplink signaling at 1010. In some such cases, the one or more timers may be associated with the CG, and each timer may be initiated based on a respective uplink shared channel transmission opportunity in which the uplink signaling is transmitted for a burst of the CG or based on a last uplink shared channel transmission opportunity in which the uplink signaling is transmitted for the burst. Based on initiating the timers, the UE 115-c may monitor for feedback from the base station 105-c for a duration configured by the one or more timers.

In some other examples, the UE 115-c may determine one or more repetition factors and a time domain pattern for the uplink signaling. The one or more repetition factors may include a single repetition factor for each uplink shared channel transmission opportunity in which the uplink signaling is transmitted. In some other examples, the one or more repetition factors include a set of repetition factors corresponding to respective uplink shared channel transmission opportunities in which the uplink signaling is transmitted. The determined time domain pattern may indicate that the UE 115-c transmits each repetition for a first uplink shared channel transmission opportunity before transmitting a first repetition for a second uplink shared channel transmission opportunity. Alternatively, the determined time domain pattern may indicate that the UE 115-c transmits a first repetition for each uplink shared channel transmission opportunity before transmitting a second repetition for the first uplink shared channel transmission opportunity.

Figure 11:
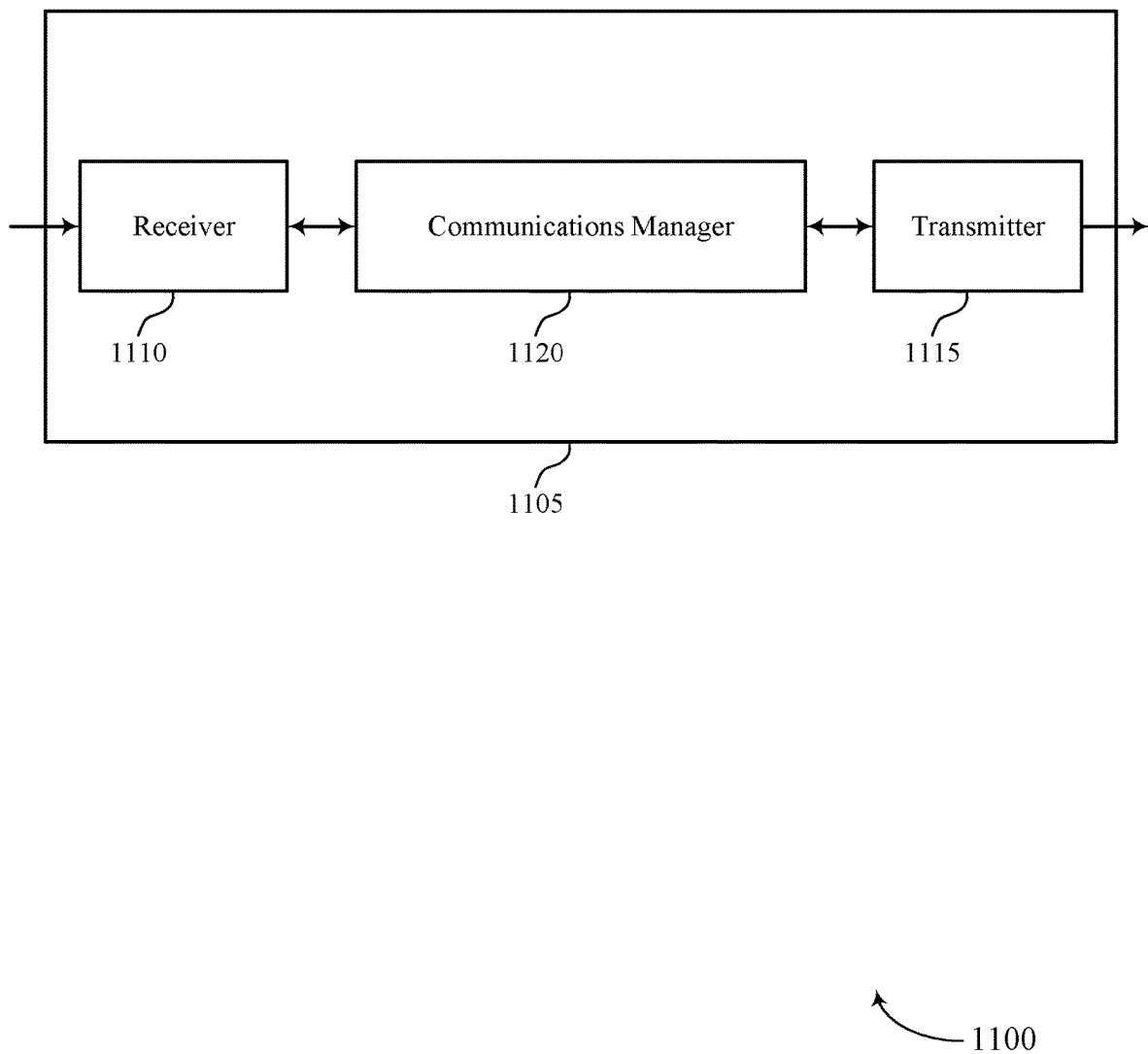
FIGS. 11 and 12 show block diagrams of devices that support SPS and CGs configuring bursts of multiple transmission opportunities in accordance with aspects of the present disclosure.

FIG. 11 shows a block diagram 1100 of a device 1105 that supports SPS and CGs configuring bursts of multiple transmission opportunities in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to SPS and CGs configuring bursts of multiple transmission opportunities). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to SPS and CGs configuring bursts of multiple transmission opportunities). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of SPS and CGs configuring bursts of multiple transmission opportunities as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. For example, the communications manager 1120 may be configured as or otherwise support a means for receiving, from a base station, control signaling indicating an SPS configuration scheduling a burst of multiple downlink shared channel transmission opportunities within a time interval of the SPS configuration. The communications manager 1120 may be configured as or otherwise support a means for receiving, from the base station, downlink signaling in a downlink shared channel transmission opportunity of the multiple downlink shared channel transmission opportunities in accordance with the SPS configuration.

Additionally or alternatively, the communications manager 1120 may support wireless communications at a UE in accordance with examples as disclosed herein. For example, the communications manager 1120 may be configured as or otherwise support a means for receiving, from a base station, control signaling indicating a CG scheduling a burst of multiple uplink shared channel transmission opportunities within a time interval for the CG. The communications manager 1120 may be configured as or otherwise support a means for transmitting, to the base station, uplink signaling in an uplink shared channel transmission opportunity of the multiple uplink shared channel transmission opportunities in accordance with the CG.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for efficient power consumption, and more efficient utilization of communication resources.

Figure 12:
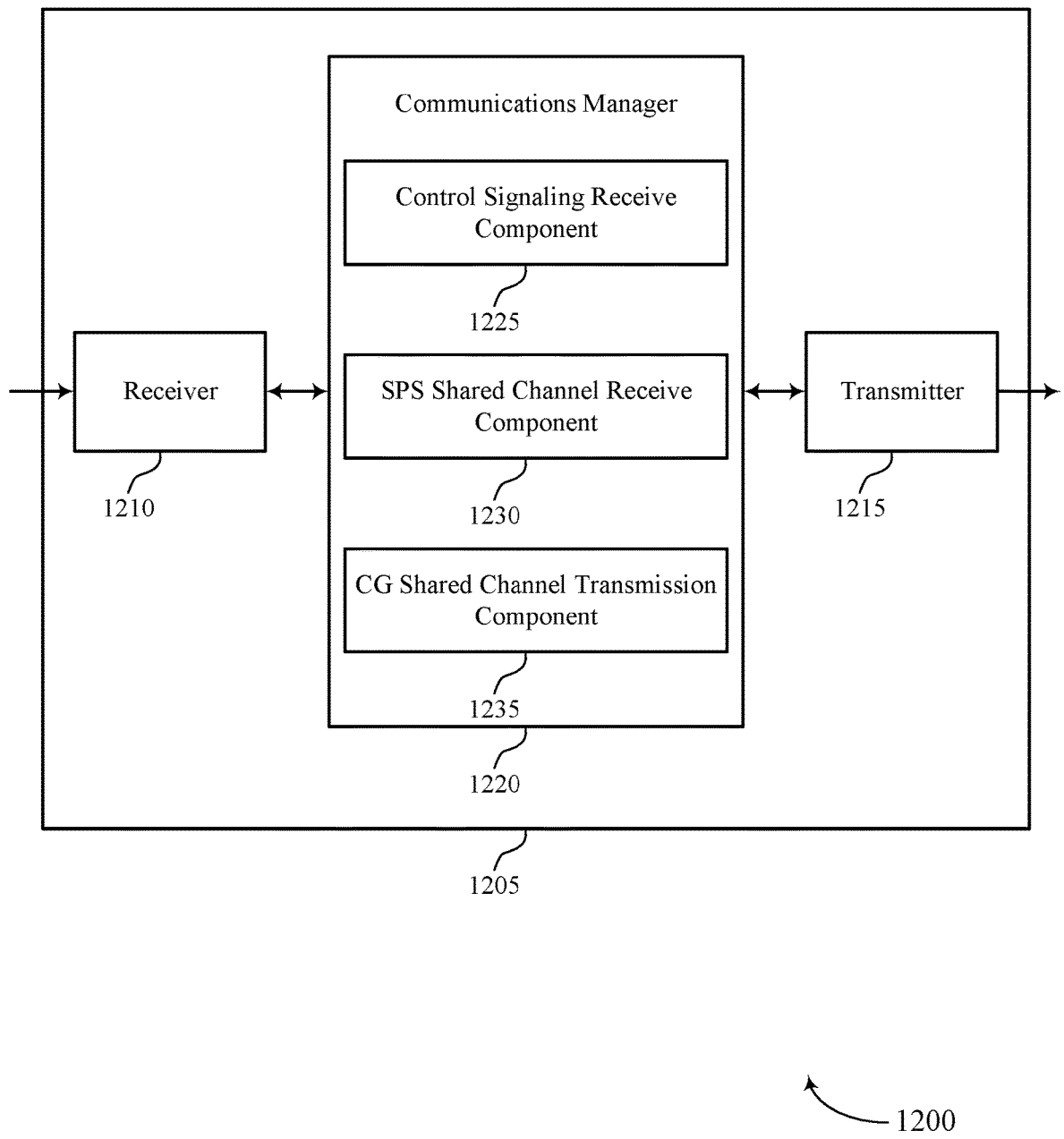

FIG. 12 shows a block diagram 1200 of a device 1205 that supports SPS and CGs configuring bursts of multiple transmission opportunities in accordance with aspects of the present disclosure. The device 1205 may be an example of aspects of a device 1105 or a UE 115 as described herein.

The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to SPS and CGs configuring bursts of multiple transmission opportunities). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to SPS and CGs configuring bursts of multiple transmission opportunities). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of SPS and CGs configuring bursts of multiple transmission opportunities as described herein. For example, the communications manager 1220 may include a control signaling receive component 1225, an SPS shared channel receive component 1230, a CG shared channel transmission component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a UE in accordance with examples as disclosed herein. The control signaling receive component 1225 may be configured as or otherwise support a means for receiving, from a base station, control signaling indicating an SPS configuration scheduling a burst of multiple downlink shared channel transmission opportunities within a time interval of the SPS configuration. The SPS shared channel receive component 1230 may be configured as or otherwise support a means for receiving, from the base station, downlink signaling in a downlink shared channel transmission opportunity of the multiple downlink shared channel transmission opportunities in accordance with the SPS configuration.

Additionally or alternatively, the communications manager 1220 may support wireless communications at a UE in accordance with examples as disclosed herein. The control signaling receive component 1225 may be configured as or otherwise support a means for receiving, from a base station, control signaling indicating a CG scheduling a burst of multiple uplink shared channel transmission opportunities within a time interval for the CG. The CG shared channel transmission component 1235 may be configured as or otherwise support a means for transmitting, to the base station, uplink signaling in an uplink shared channel transmission opportunity of the multiple uplink shared channel transmission opportunities in accordance with the CG.

Figure 13:
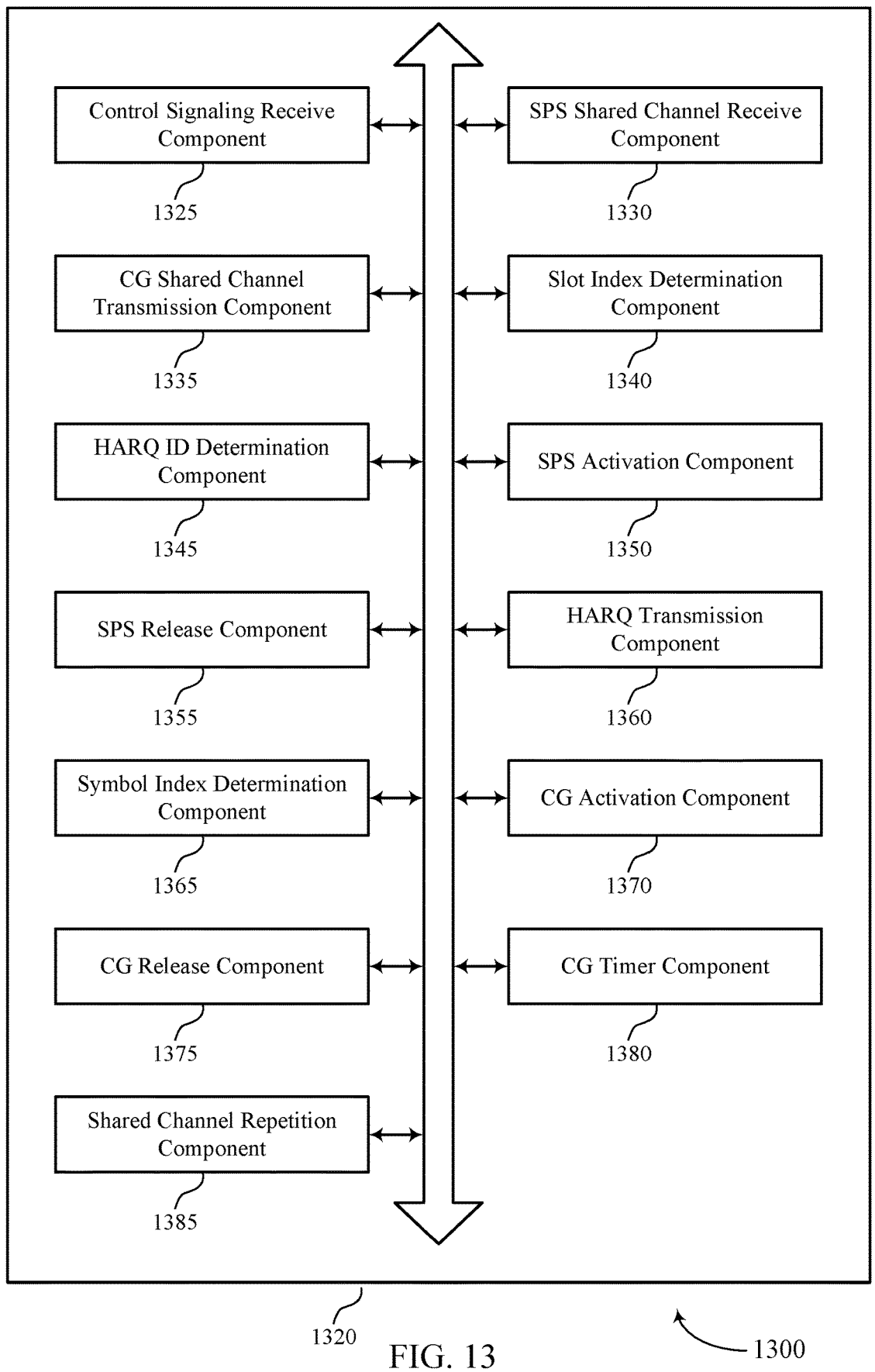
FIG. 13 shows a block diagram of a communications manager that supports SPS and CGs configuring bursts of multiple transmission opportunities in accordance with aspects of the present disclosure.

FIG. 13 shows a block diagram 1300 of a communications manager 1320 that supports SPS and CGs configuring bursts of multiple transmission opportunities in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of SPS and CGs configuring bursts of multiple transmission opportunities as described herein. For example, the communications manager 1320 may include a control signaling receive component 1325, an SPS shared channel receive component 1330, a CG shared channel transmission component 1335, a slot index determination component 1340, a HARQ ID determination component 1345, an SPS activation component 1350, an SPS release component 1355, a HARQ transmission component 1360, a symbol index determination component 1365, a CG activation component 1370, a CG release component 1375, a CG timer component 1380, a shared channel repetition component 1385, or any combination thereof. Each of these components may communicate, directly or indirectly, with one another (e.g., via one or more buses).

The communications manager 1320 may support wireless communications at a UE in accordance with examples as disclosed herein. The control signaling receive component 1325 may be configured as or otherwise support a means for receiving, from a base station, control signaling indicating an SPS configuration scheduling a burst of multiple downlink shared channel transmission opportunities within a time interval of the SPS configuration. The SPS shared channel receive component 1330 may be configured as or otherwise support a means for receiving, from the base station, downlink signaling in a downlink shared channel transmission opportunity of the multiple downlink shared channel transmission opportunities in accordance with the SPS configuration.

In some examples, the slot index determination component 1340 may be configured as or otherwise support a means for determining a first slot index for a first downlink shared channel transmission opportunity of the multiple downlink shared channel transmission opportunities associated with a first burst of the SPS configuration. In some examples, the slot index determination component 1340 may be configured as or otherwise support a means for determining a second slot index for a second downlink shared channel transmission opportunity of the multiple downlink shared channel transmission opportunities associated with the first burst based on the first slot index and an SLIV included in a TDRA table entry indicated by the control signaling.

In some examples, the HARQ ID determination component 1345 may be configured as or otherwise support a means for determining a first feedback process identifier associated with a first downlink shared channel transmission opportunity of the multiple downlink shared channel transmission opportunities associated with a first burst of the SPS configuration according to a formula. In some examples, the HARQ ID determination component 1345 may be configured as or otherwise support a means for determining a second feedback process identifier associated with a second downlink shared channel transmission opportunity of the multiple downlink shared channel transmission opportunities associated with the first burst based on incrementing the first feedback process identifier. In some examples, the HARQ ID determination component 1345 may be configured as or otherwise support a means for determining a third feedback process identifier associated with a first downlink shared channel transmission opportunity of the multiple downlink shared channel transmission opportunities associated with a second burst of the SPS configuration according to the formula.

In some examples, the HARQ ID determination component 1345 may be configured as or otherwise support a means for determining a first feedback process identifier associated with a first downlink shared channel transmission opportunity of the multiple downlink shared channel transmission opportunities associated with a first burst of the SPS configuration according to a formula. In some examples, the HARQ ID determination component 1345 may be configured as or otherwise support a means for determining a second feedback process identifier associated with a second downlink shared channel transmission opportunity of the multiple downlink shared channel transmission opportunities associated with the first burst based on incrementing the first feedback process identifier. In some examples, the HARQ ID determination component 1345 may be configured as or otherwise support a means for determining a third feedback process identifier associated with a first downlink shared channel transmission opportunity of the multiple downlink shared channel transmission opportunities associated with a second burst of the SPS configuration based on incrementing a last feedback process identifier associated with a last downlink shared channel transmission opportunity of the multiple downlink shared channel transmission opportunities associated with the first burst.

In some examples, the HARQ ID determination component 1345 may be configured as or otherwise support a means for determining a first feedback process identifier associated with a first downlink shared channel transmission opportunity of the multiple downlink shared channel transmission opportunities associated with a first burst of the SPS configuration based on applying a first feedback process identifier offset value to a formula. In some examples, the HARQ ID determination component 1345 may be configured as or otherwise support a means for determining a second feedback process identifier associated with a second downlink shared channel transmission opportunity of the multiple downlink shared channel transmission opportunities associated with the first burst based on applying a second feedback process identifier offset value to the formula. In some examples, the HARQ ID determination component 1345 may be configured as or otherwise support a means for determining a third feedback process identifier associated with a first downlink shared channel transmission opportunity of the multiple downlink shared channel transmission opportunities associated with a second burst of the SPS configuration based on applying the first feedback process identifier offset value to the formula.

In some examples, the control signaling receive component 1325 may be configured as or otherwise support a means for receiving, from the base station, DCI signaling including a feedback process identifier bit field configured with an index value indicating the SPS configuration, where the control signaling includes RRC signaling. In some examples, the SPS activation component 1350 may be configured as or otherwise support a means for activating the SPS configuration based on the feedback process identifier bit field of the DCI signaling configured with the index value indicating the SPS configuration, where receiving the downlink signaling is based on activating the SPS configuration.

In some examples, the SPS activation component 1350 may be configured as or otherwise support a means for determining that the DCI signaling activates the SPS configuration further based on the DCI signaling including an RV bit field configured with at least a threshold quantity of initial bits set to zero, configured with all bits set to zero, or both.

In some examples, the SPS activation component 1350 may be configured as or otherwise support a means for determining that the DCI signaling activates a subset of the multiple downlink shared channel transmission opportunities for the SPS configuration based on the DCI signaling including an RV bit field, where each downlink shared channel transmission opportunity of the subset is activated by a corresponding bit of the RV bit field.

In some examples, the SPS activation component 1350 may be configured as or otherwise support a means for determining that the DCI signaling activates a subset of consecutive downlink shared channel transmission opportunities of the multiple downlink shared channel transmission opportunities for the SPS configuration based on the DCI signaling including an RV bit field, where the RV bit field includes a quantity of consecutive bits set to zero indicating a corresponding quantity of the subset of consecutive downlink shared channel transmission opportunities activated based on the DCI signaling.

In some examples, the DCI signaling further includes an NDI bit field indicating activation of the SPS configuration, activation of a subset of the multiple downlink shared channel transmission opportunities for the SPS configuration, or a retransmission grant.

In some examples, the control signaling receive component 1325 may be configured as or otherwise support a means for receiving second DCI signaling including a second feedback process identifier bit field configured with a second index value indicating the SPS configuration, where the second DCI signaling includes deactivation DCI. In some examples, the SPS release component 1355 may be configured as or otherwise support a means for deactivating one or more of the multiple downlink shared channel transmission opportunities for the SPS configuration based on one or more bit values of an RV bit field of the second DCI signaling.

In some examples, to support receiving the downlink signaling in the downlink shared channel transmission opportunity, the control signaling receive component 1325 may be configured as or otherwise support a means for receiving an initial portion of the downlink signaling in an initial downlink shared channel transmission opportunity of the multiple downlink shared channel transmission opportunities associated with the burst of the SPS configuration or in any downlink shared channel transmission opportunity of the multiple downlink shared channel transmission opportunities associated with the burst.

In some examples, the control signaling receive component 1325 may be configured as or otherwise support a means for receiving, from the base station, RRC signaling indicating that the downlink signaling is configured to start at the initial downlink shared channel transmission opportunity or at any downlink shared channel transmission opportunity, where receiving the initial portion of the downlink signaling is based on the RRC signaling.

In some examples, the SPS release component 1355 may be configured as or otherwise support a means for receiving, from the base station, DCI signaling indicating a release of the SPS configuration. In some examples, the HARQ transmission component 1360 may be configured as or otherwise support a means for transmitting, to the base station and in response to the DCI signaling indicating the release, an indication of an acknowledgment bit for the DCI signaling indicating the release. In some examples, the SPS release component 1355 may be configured as or otherwise support a means for releasing the SPS configuration based on the DCI signaling indicating the release.

In some examples, the HARQ transmission component 1360 may be configured as or otherwise support a means for generating a codebook including the acknowledgment bit, where a location of the acknowledgment bit in the codebook corresponds to: a first downlink shared channel transmission opportunity of the multiple downlink shared channel transmission opportunities, a last downlink shared channel transmission opportunity of the multiple downlink shared channel transmission opportunities, a set of multiple downlink shared channel transmission opportunities of the multiple downlink shared channel transmission opportunities, or a combination thereof for the SPS configuration; a TDRA field value included in the DCI signaling indicating the release; a same slot in which the DCI signaling indicating the release is received; or a combination thereof. In some examples, transmitting the indication of the acknowledgment bit is based on the generated codebook.

In some examples, the DCI signaling indicates a set of multiple releases of a set of multiple SPS configurations. In some examples, the indication of the acknowledgment bit corresponds to a first SPS configuration of the set of multiple SPS configurations with a SPS configuration index value satisfying a threshold.

Additionally or alternatively, the communications manager 1320 may support wireless communications at a UE in accordance with examples as disclosed herein. In some examples, the control signaling receive component 1325 may be configured as or otherwise support a means for receiving, from a base station, control signaling indicating a CG scheduling a burst of multiple uplink shared channel transmission opportunities within a time interval for the CG. The CG shared channel transmission component 1335 may be configured as or otherwise support a means for transmitting, to the base station, uplink signaling in an uplink shared channel transmission opportunity of the multiple uplink shared channel transmission opportunities in accordance with the CG.

In some examples, the symbol index determination component 1365 may be configured as or otherwise support a means for determining a first symbol index and a first slot index for a first uplink shared channel transmission opportunity of the multiple uplink shared channel transmission opportunities associated with a first burst of the CG. In some examples, the symbol index determination component 1365 may be configured as or otherwise support a means for determining a second symbol index for a second uplink shared channel transmission opportunity of the multiple uplink shared channel transmission opportunities associated with the first burst based on a corresponding SLIV included in the control signaling. In some examples, the symbol index determination component 1365 may be configured as or otherwise support a means for determining a second slot index for the second uplink shared channel transmission opportunity based on the first slot index and a slot offset indicated by a TDRA table entry indicated by the control signaling.

In some examples, the HARQ ID determination component 1345 may be configured as or otherwise support a means for determining a first feedback process identifier associated with a first uplink shared channel transmission opportunity of the multiple uplink shared channel transmission opportunities associated with a first burst of the CG according to a formula and based on a first value for a feedback process identifier offset included in the formula, a quantity of activated uplink shared channel transmission opportunities of the multiple uplink shared channel transmission opportunities included in the formula, or both. In some examples, the HARQ ID determination component 1345 may be configured as or otherwise support a means for determining a second feedback process identifier associated with a second uplink shared channel transmission opportunity of the multiple uplink shared channel transmission opportunities associated with the first burst based on incrementing the first feedback process identifier. In some examples, the HARQ ID determination component 1345 may be configured as or otherwise support a means for determining a third feedback process identifier associated with a first uplink shared channel transmission opportunity of the multiple uplink shared channel transmission opportunities associated with a second burst of the CG according to the formula and based on a second value for the feedback process identifier offset included in the formula, the quantity of activated uplink shared channel transmission opportunities included in the formula, or both.

In some examples, the HARQ ID determination component 1345 may be configured as or otherwise support a means for determining a first feedback process identifier associated with a first uplink shared channel transmission opportunity of the multiple uplink shared channel transmission opportunities associated with a first burst of the CG based on applying a first feedback process identifier offset value to a formula. In some examples, the HARQ ID determination component 1345 may be configured as or otherwise support a means for determining a second feedback process identifier associated with a second uplink shared channel transmission opportunity associated with the first burst based on applying a second feedback process identifier offset value to the formula. In some examples, the HARQ ID determination component 1345 may be configured as or otherwise support a means for determining a third feedback process identifier associated with a first uplink shared channel transmission opportunity of the multiple uplink shared channel transmission opportunities associated with a second burst of the CG based on applying the first feedback process identifier offset value to the formula.

In some examples, the control signaling receive component 1325 may be configured as or otherwise support a means for receiving, from the base station, DCI signaling including a feedback process identifier bit field configured with an index value indicating the CG, where the control signaling includes RRC signaling. In some examples, the CG activation component 1370 may be configured as or otherwise support a means for activating the CG based on the feedback process identifier bit field of the DCI signaling configured with the index value indicating the CG, where transmitting the uplink signaling is based on activating the CG.

In some examples, the CG activation component 1370 may be configured as or otherwise support a means for determining that the DCI signaling activates the CG further based on the DCI signaling including an RV bit field configured with at least a threshold quantity of initial bits set to zero, configured with all bits set to zero, or both.

In some examples, the CG activation component 1370 may be configured as or otherwise support a means for determining that the DCI signaling activates a subset of the multiple uplink shared channel transmission opportunities for the CG based on one or more bit values of an RV bit field included in the DCI signaling.

In some examples, the CG release component 1375 may be configured as or otherwise support a means for receiving, from the base station, DCI signaling including an RV bit field configured with at least a threshold quantity of initial bits set to zero, configured with all bits set to zero, or both, the RV bit field indicating release of the CG. In some examples, the CG release component 1375 may be configured as or otherwise support a means for releasing the CG based on the RV bit field of the DCI signaling.

In some examples, to support transmitting the uplink signaling in the uplink shared channel transmission opportunity, the CG shared channel transmission component 1335 may be configured as or otherwise support a means for transmitting an initial portion of the uplink signaling in an initial uplink shared channel transmission opportunity of the multiple uplink shared channel transmission opportunities associated with the burst of the CG or in any uplink shared channel transmission opportunity of the multiple uplink shared channel transmission opportunities associated with the burst.

In some examples, the control signaling receive component 1325 may be configured as or otherwise support a means for receiving, from the base station, RRC signaling indicating that the uplink signaling is configured to start at the initial uplink shared channel transmission opportunity or at any uplink shared channel transmission opportunity, where transmitting the initial portion of the uplink signaling is based on the RRC signaling.

In some examples, the CG timer component 1380 may be configured as or otherwise support a means for initiating one or more timers based on transmitting the uplink signaling, the one or more timers associated with the CG, where each timer of the one or more timers is initiated based on a respective uplink shared channel transmission opportunity in which the uplink signaling is transmitted for the burst of the CG or where the one or more timers are initiated based on a last uplink shared channel transmission opportunity in which the uplink signaling is transmitted for the burst. In some examples, the control signaling receive component 1325 may be configured as or otherwise support a means for monitoring for feedback from the base station for a duration configured by the one or more timers based on the initiating.

In some examples, the shared channel repetition component 1385 may be configured as or otherwise support a means for determining one or more repetition factors and a time domain pattern for the uplink signaling, where: the one or more repetition factors includes a single repetition factor for each uplink shared channel transmission opportunity in which the uplink signaling is transmitted or the one or more repetition factors include a set of multiple repetition factors corresponding to respective uplink shared channel transmission opportunities in which the uplink signaling is transmitted; the time domain pattern indicates to transmit each repetition for a first uplink shared channel transmission opportunity before transmitting a first repetition for a second uplink shared channel transmission opportunity or to transmit a first repetition for each uplink shared channel transmission opportunity before transmitting a second repetition for the first uplink shared channel transmission opportunity; and the uplink signaling is transmitted based on the one or more repetition factors and the time domain pattern.

Figure 14:
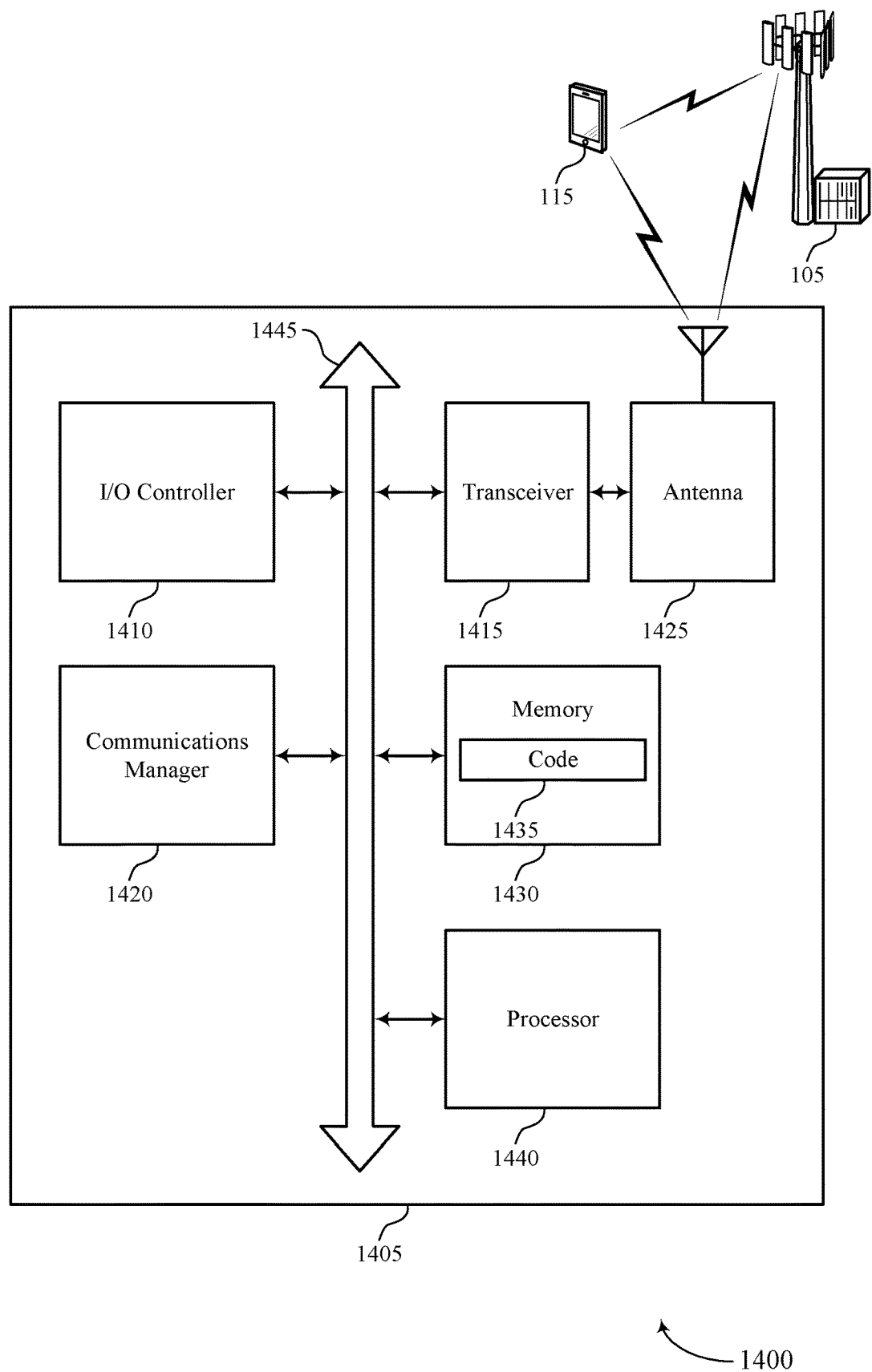
FIG. 14 shows a diagram of a system including a device that supports SPS and CGs configuring bursts of multiple transmission opportunities in accordance with aspects of the present disclosure.

FIG. 14 shows a diagram of a system 1400 including a device 1405 that supports SPS and CGs configuring bursts of multiple transmission opportunities in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting SPS and CGs configuring bursts of multiple transmission opportunities). For example, the device 1405 or a component of the device 1405 may include a processor 1440 and memory 1430 coupled to the processor 1440, the processor 1440 and memory 1430 configured to perform various functions described herein.

The communications manager 1420 may support wireless communications at a UE in accordance with examples as disclosed herein. For example, the communications manager 1420 may be configured as or otherwise support a means for receiving, from a base station, control signaling indicating an SPS configuration scheduling a burst of multiple downlink shared channel transmission opportunities within a time interval of the SPS configuration. The communications manager 1420 may be configured as or otherwise support a means for receiving, from the base station, downlink signaling in a downlink shared channel transmission opportunity of the multiple downlink shared channel transmission opportunities in accordance with the SPS configuration.

Additionally or alternatively, the communications manager 1420 may support wireless communications at a UE in accordance with examples as disclosed herein. For example, the communications manager 1420 may be configured as or otherwise support a means for receiving, from a base station, control signaling indicating a CG scheduling a burst of multiple uplink shared channel transmission opportunities within a time interval for the CG. The communications manager 1420 may be configured as or otherwise support a means for transmitting, to the base station, uplink signaling in an uplink shared channel transmission opportunity of the multiple uplink shared channel transmission opportunities in accordance with the CG.

By including or configuring the communications manager 1420 in accordance with examples as described herein, the device 1405 may support techniques for improved communication reliability, reduced latency, more efficient utilization of communication resources, improved coordination between devices, increased wireless coverage, and increased communications throughput.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of SPS and CGs configuring bursts of multiple transmission opportunities as described herein, or the processor 1440 and the memory 1430 may be otherwise configured to perform or support such operations.

Figure 15:
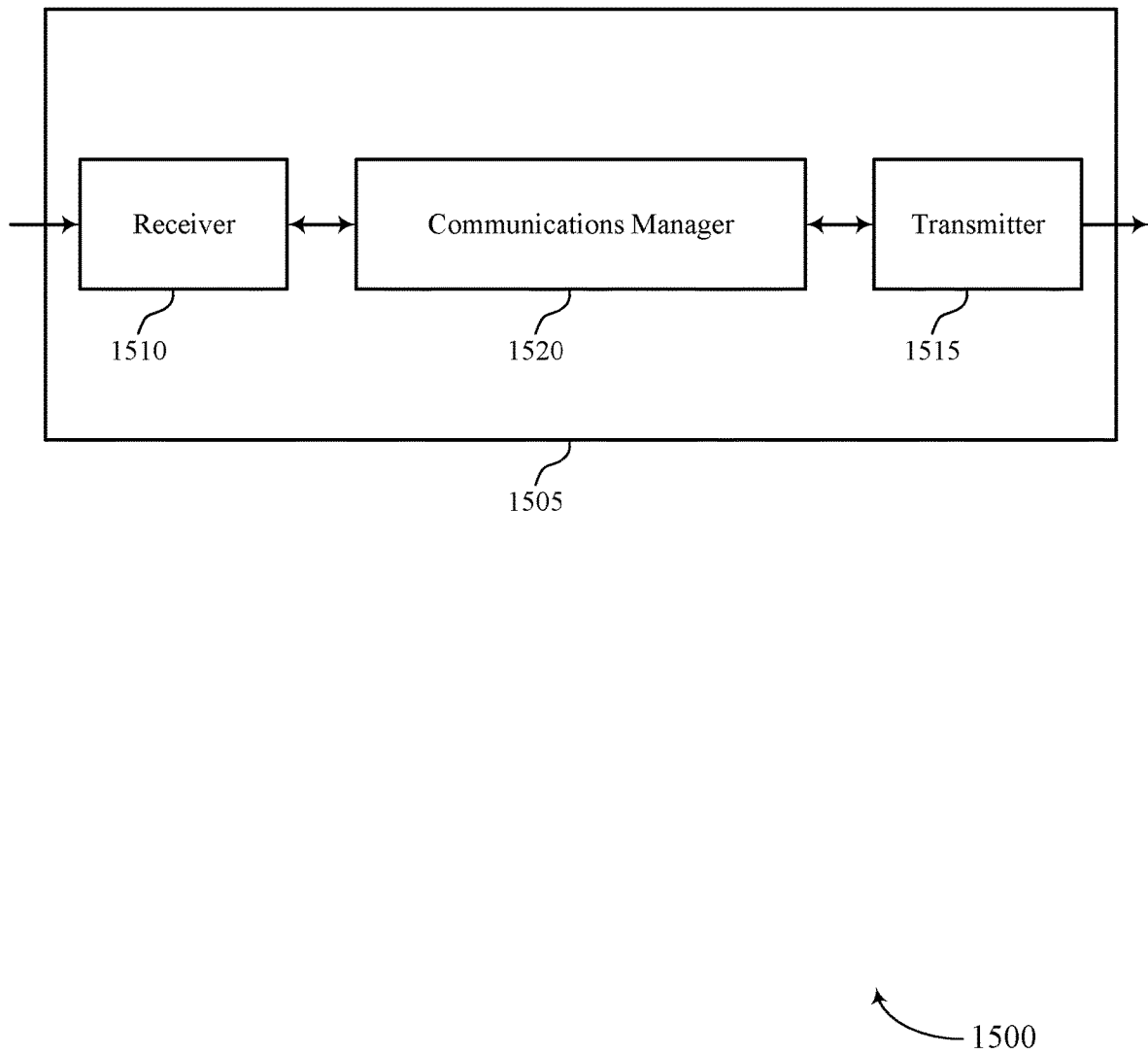
FIGS. 15 and 16 show block diagrams of devices that support SPS and CGs configuring bursts of multiple transmission opportunities in accordance with aspects of the present disclosure.

FIG. 15 shows a block diagram 1500 of a device 1505 that supports SPS and CGs configuring bursts of multiple transmission opportunities in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to SPS and CGs configuring bursts of multiple transmission opportunities). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to SPS and CGs configuring bursts of multiple transmission opportunities). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of SPS and CGs configuring bursts of multiple transmission opportunities as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a base station in accordance with examples as disclosed herein. For example, the communications manager 1520 may be configured as or otherwise support a means for transmitting, to a UE, control signaling indicating an SPS configuration scheduling a burst of multiple downlink shared channel transmission opportunities within a time interval of the SPS configuration. The communications manager 1520 may be configured as or otherwise support a means for transmitting, to the UE, downlink signaling in a downlink shared channel transmission opportunity of the multiple downlink shared channel transmission opportunities in accordance with the SPS configuration.

Additionally or alternatively, the communications manager 1520 may support wireless communications at a base station in accordance with examples as disclosed herein. For example, the communications manager 1520 may be configured as or otherwise support a means for transmitting, to a UE, control signaling indicating a CG scheduling a burst of multiple uplink shared channel transmission opportunities within a time interval for the CG. The communications manager 1520 may be configured as or otherwise support a means for receiving, from the UE, uplink signaling in an uplink shared channel transmission opportunity of the multiple uplink shared channel transmission opportunities in accordance with the CG.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for efficient power consumption and more efficient utilization of communication resources.

Figure 16:
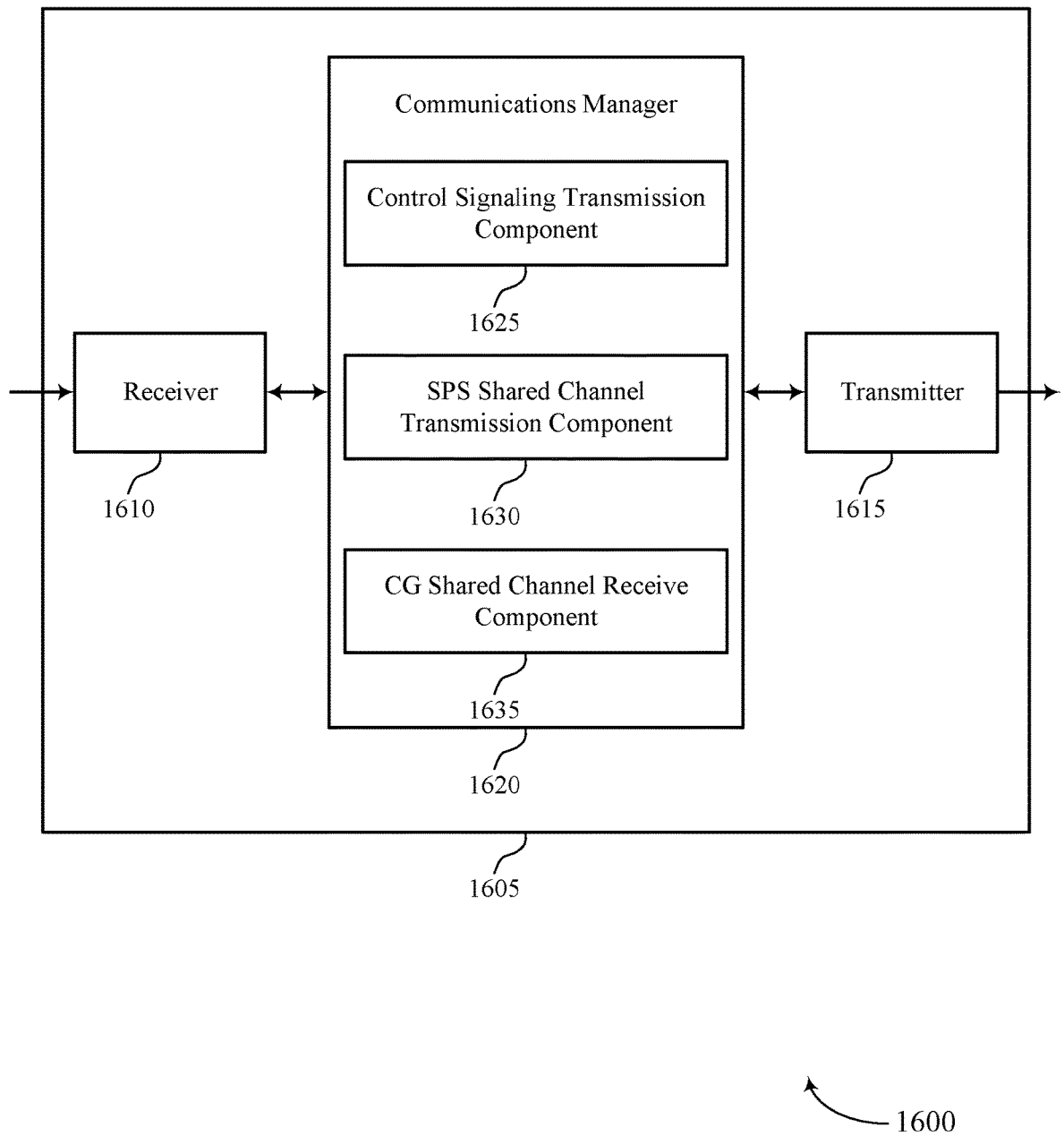

FIG. 16 shows a block diagram 1600 of a device 1605 that supports SPS and CGs configuring bursts of multiple transmission opportunities in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to SPS and CGs configuring bursts of multiple transmission opportunities). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to SPS and CGs configuring bursts of multiple transmission opportunities). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of SPS and CGs configuring bursts of multiple transmission opportunities as described herein. For example, the communications manager 1620 may include a control signaling transmission component 1625, an SPS shared channel transmission component 1630, a CG shared channel receive component 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a base station in accordance with examples as disclosed herein. The control signaling transmission component 1625 may be configured as or otherwise support a means for transmitting, to a UE, control signaling indicating an SPS configuration scheduling a burst of multiple downlink shared channel transmission opportunities within a time interval of the SPS configuration. The SPS shared channel transmission component 1630 may be configured as or otherwise support a means for transmitting, to the UE, downlink signaling in a downlink shared channel transmission opportunity of the multiple downlink shared channel transmission opportunities in accordance with the SPS configuration.

Additionally or alternatively, the communications manager 1620 may support wireless communications at a base station in accordance with examples as disclosed herein. The control signaling transmission component 1625 may be configured as or otherwise support a means for transmitting, to a UE, control signaling indicating a CG scheduling a burst of multiple uplink shared channel transmission opportunities within a time interval for the CG. The CG shared channel receive component 1635 may be configured as or otherwise support a means for receiving, from the UE, uplink signaling in an uplink shared channel transmission opportunity of the multiple uplink shared channel transmission opportunities in accordance with the CG.

Figure 17:
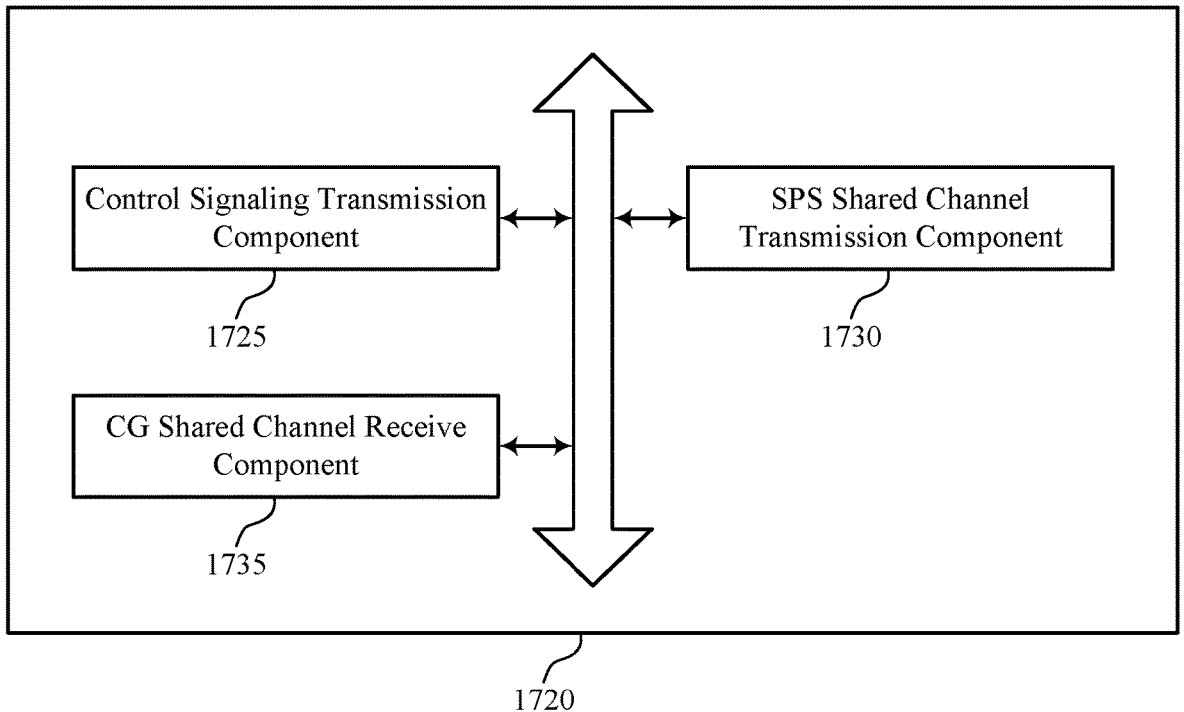
FIG. 17 shows a block diagram of a communications manager that supports SPS and CGs configuring bursts of multiple transmission opportunities in accordance with aspects of the present disclosure.

FIG. 17 shows a block diagram 1700 of a communications manager 1720 that supports SPS and CGs configuring bursts of multiple transmission opportunities in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of SPS and CGs configuring bursts of multiple transmission opportunities as described herein. For example, the communications manager 1720 may include a control signaling transmission component 1725, an SPS shared channel transmission component 1730, a CG shared channel receive component 1735, or any combination thereof. Each of these components may communicate, directly or indirectly, with one another (e.g., via one or more buses).

The communications manager 1720 may support wireless communications at a base station in accordance with examples as disclosed herein. The control signaling transmission component 1725 may be configured as or otherwise support a means for transmitting, to a UE, control signaling indicating an SPS configuration scheduling a burst of multiple downlink shared channel transmission opportunities within a time interval of the SPS configuration. The SPS shared channel transmission component 1730 may be configured as or otherwise support a means for transmitting, to the UE, downlink signaling in a downlink shared channel transmission opportunity of the multiple downlink shared channel transmission opportunities in accordance with the SPS configuration.

Additionally or alternatively, the communications manager 1720 may support wireless communications at a base station in accordance with examples as disclosed herein. In some examples, the control signaling transmission component 1725 may be configured as or otherwise support a means for transmitting, to a UE, control signaling indicating a CG scheduling a burst of multiple uplink shared channel transmission opportunities within a time interval for the CG. The CG shared channel receive component 1735 may be configured as or otherwise support a means for receiving, from the UE, uplink signaling in an uplink shared channel transmission opportunity of the multiple uplink shared channel transmission opportunities in accordance with the CG.

Figure 18:
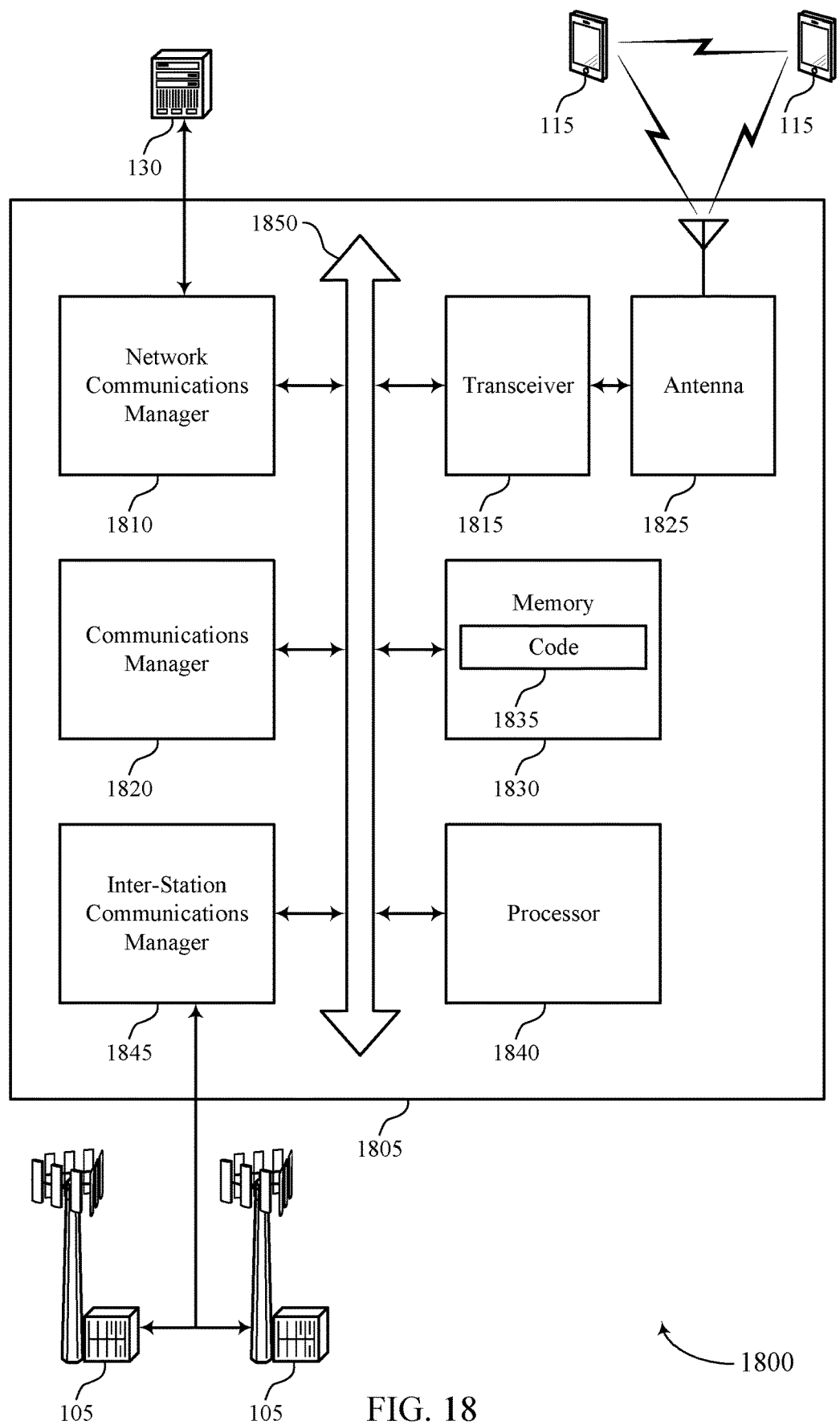
FIG. 18 shows a diagram of a system including a device that supports SPS and CGs configuring bursts of multiple transmission opportunities in accordance with aspects of the present disclosure.

FIG. 18 shows a diagram of a system 1800 including a device 1805 that supports SPS and CGs configuring bursts of multiple transmission opportunities in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825.

The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting SPS and CGs configuring bursts of multiple transmission opportunities). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communications at a base station in accordance with examples as disclosed herein. For example, the communications manager 1820 may be configured as or otherwise support a means for transmitting, to a UE, control signaling indicating an SPS configuration scheduling a burst of multiple downlink shared channel transmission opportunities within a time interval of the SPS configuration. The communications manager 1820 may be configured as or otherwise support a means for transmitting, to the UE, downlink signaling in a downlink shared channel transmission opportunity of the multiple downlink shared channel transmission opportunities in accordance with the SPS configuration.

Additionally or alternatively, the communications manager 1820 may support wireless communications at a base station in accordance with examples as disclosed herein. For example, the communications manager 1820 may be configured as or otherwise support a means for transmitting, to a UE, control signaling indicating a CG scheduling a burst of multiple uplink shared channel transmission opportunities within a time interval for the CG. The communications manager 1820 may be configured as or otherwise support a means for receiving, from the UE, uplink signaling in an uplink shared channel transmission opportunity of the multiple uplink shared channel transmission opportunities in accordance with the CG.

By including or configuring the communications manager 1820 in accordance with examples as described herein, the device 1805 may support techniques for improved communication reliability, reduced latency, more efficient utilization of communication resources, improved coordination between devices, increased wireless coverage, and increased communications throughput.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of SPS and CGs configuring bursts of multiple transmission opportunities as described herein, or the processor 1840 and the memory 1830 may be otherwise configured to perform or support such operations.

Figure 19:
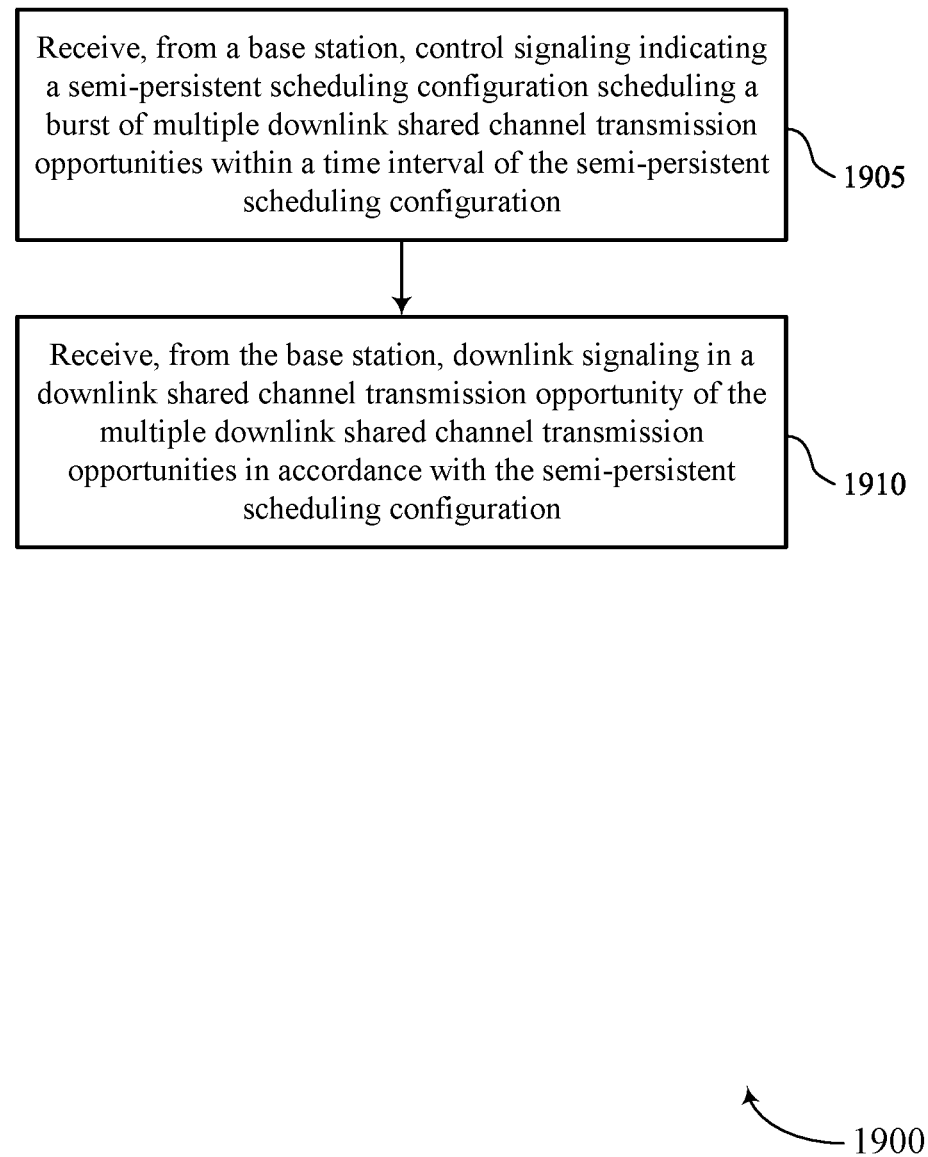
FIGS. 19 through 22 show flowcharts illustrating methods that support SPS and CGs configuring bursts of multiple transmission opportunities in accordance with aspects of the present disclosure.

FIG. 19 shows a flowchart illustrating a method 1900 that supports SPS and CGs configuring bursts of multiple transmission opportunities in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, control signaling indicating a semi-persistent scheduling configuration scheduling a burst of multiple downlink shared channel transmission opportunities within a time interval of the semi-persistent scheduling configuration. The operations of 1905 may be performed in accordance with examples as disclosed herein. In some examples, aspects of the operations of 1905 may be performed by a control signaling receive component 1325 as described with reference to FIG. 13.

At 1910, the method may include receiving, from the base station, downlink signaling in a downlink shared channel transmission opportunity of the multiple downlink shared channel transmission opportunities in accordance with the semi-persistent scheduling configuration. The operations of 1910 may be performed in accordance with examples as disclosed herein. In some examples, aspects of the operations of 1910 may be performed by an SPS shared channel receive component 1330 as described with reference to FIG. 13.

Figure 20:
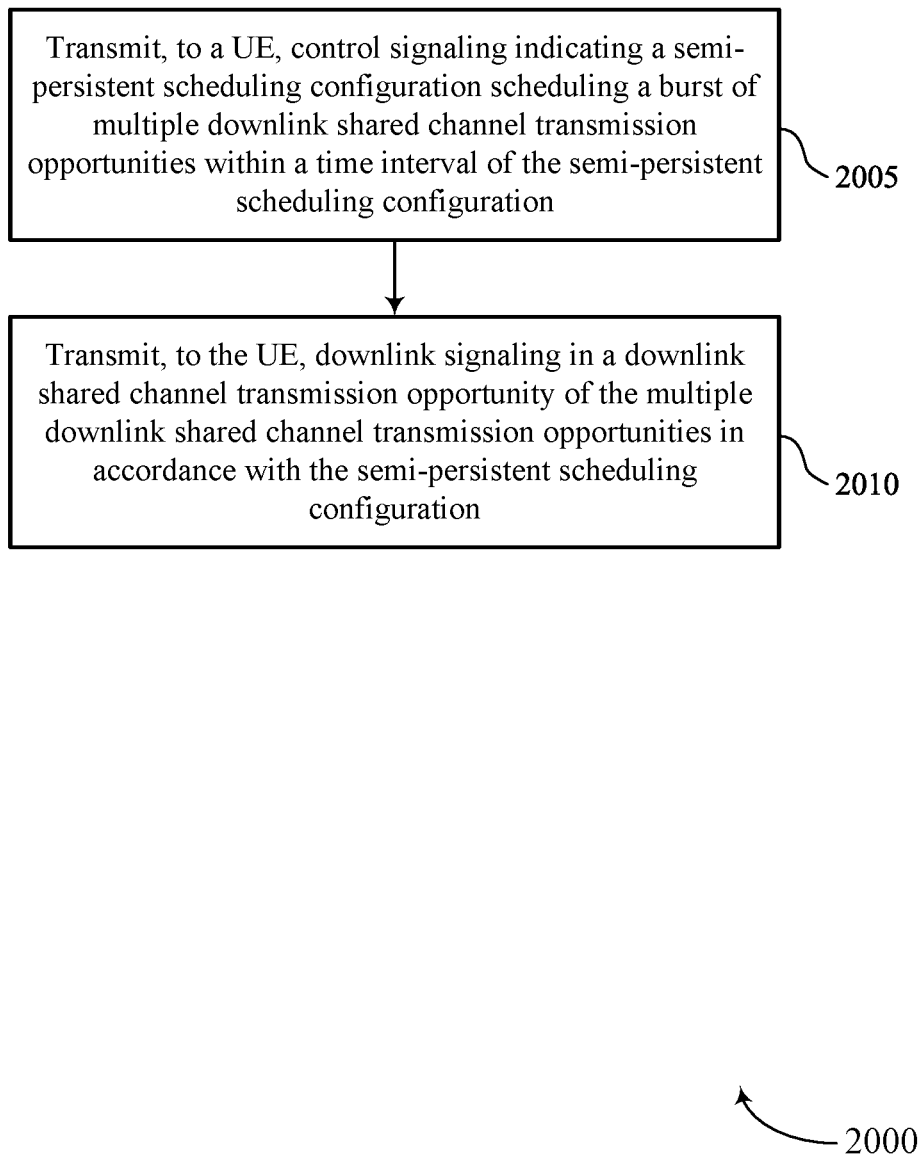

FIG. 20 shows a flowchart illustrating a method 2000 that supports SPS and CGs configuring bursts of multiple transmission opportunities in accordance with aspects of the present disclosure. The operations of the method 2000 may be implemented by a base station or its components as described herein. For example, the operations of the method 2000 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, control signaling indicating a semi-persistent scheduling configuration scheduling a burst of multiple downlink shared channel transmission opportunities within a time interval of the semi-persistent scheduling configuration. The operations of 2005 may be performed in accordance with examples as disclosed herein. In some examples, aspects of the operations of 2005 may be performed by a control signaling transmission component 1725 as described with reference to FIG. 17.

At 2010, the method may include transmitting, to the UE, downlink signaling in a downlink shared channel transmission opportunity of the multiple downlink shared channel transmission opportunities in accordance with the semi-persistent scheduling configuration. The operations of 2010 may be performed in accordance with examples as disclosed herein. In some examples, aspects of the operations of 2010 may be performed by an SPS shared channel transmission component 1730 as described with reference to FIG. 17.

Figure 21:
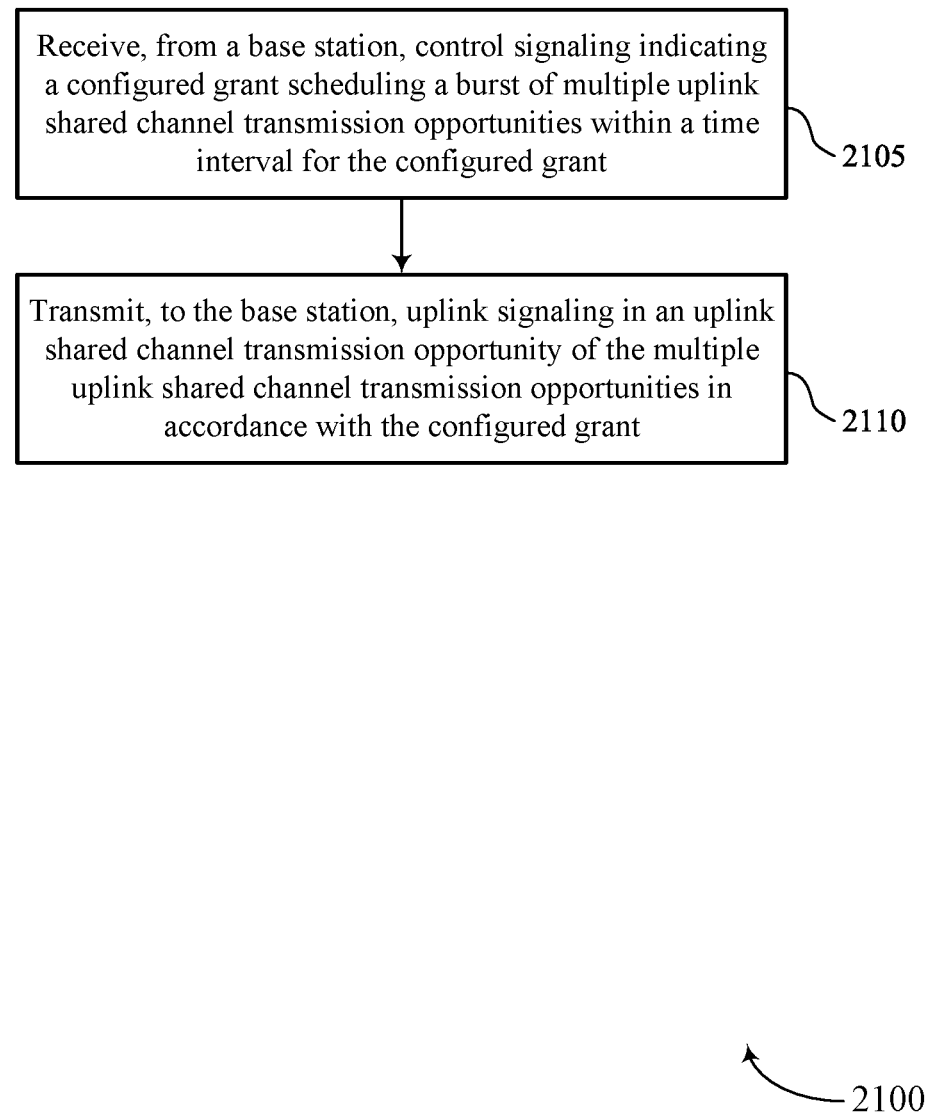

FIG. 21 shows a flowchart illustrating a method 2100 that supports SPS and CGs configuring bursts of multiple transmission opportunities in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, control signaling indicating a CG scheduling a burst of multiple uplink shared channel transmission opportunities within a time interval for the CG. The operations of 2105 may be performed in accordance with examples as disclosed herein. In some examples, aspects of the operations of 2105 may be performed by a control signaling receive component 1325 as described with reference to FIG. 13.

At 2110, the method may include transmitting, to the base station, uplink signaling in an uplink shared channel transmission opportunity of the multiple uplink shared channel transmission opportunities in accordance with the CG. The operations of 2110 may be performed in accordance with examples as disclosed herein. In some examples, aspects of the operations of 2110 may be performed by a CG shared channel transmission component 1335 as described with reference to FIG. 13.

Figure 22:
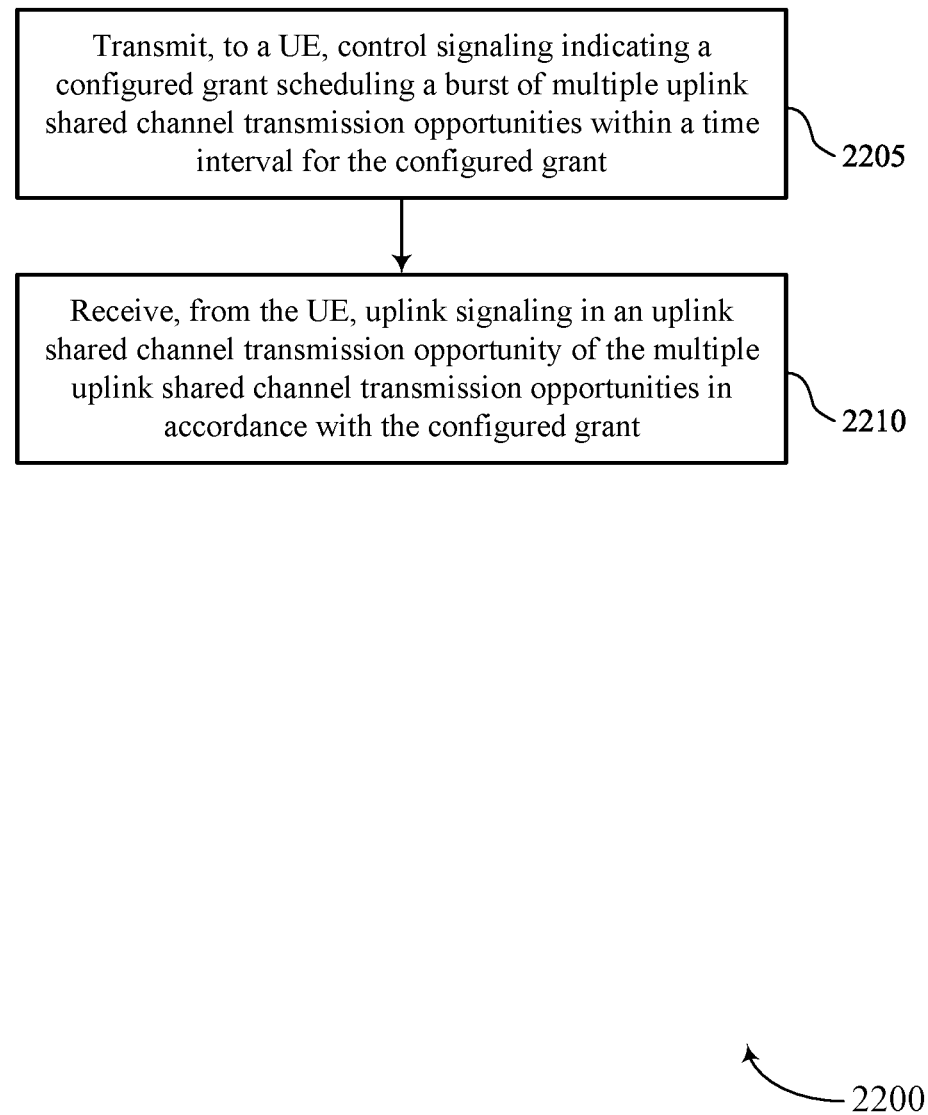

FIG. 22 shows a flowchart illustrating a method 2200 that supports SPS and CGs configuring bursts of multiple transmission opportunities in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, control signaling indicating a CG scheduling a burst of multiple uplink shared channel transmission opportunities within a time interval for the CG. The operations of 2205 may be performed in accordance with examples as disclosed herein. In some examples, aspects of the operations of 2205 may be performed by a control signaling transmission component 1725 as described with reference to FIG. 17.

At 2210, the method may include receiving, from the UE, uplink signaling in an uplink shared channel transmission opportunity of the multiple uplink shared channel transmission opportunities in accordance with the CG. The operations of 2210 may be performed in accordance with examples as disclosed herein. In some examples, aspects of the operations of 2210 may be performed by a CG shared channel receive component 1735 as described with reference to FIG. 17.

The following provides an overview of aspects of the present disclosure:

Aspect 1: A method for wireless communications at a UE, comprising: receiving, from a base station, control signaling indicating an SPS configuration scheduling a burst of multiple downlink shared channel transmission opportunities within a time interval of the SPS configuration; and receiving, from the base station, downlink signaling in a downlink shared channel transmission opportunity of the multiple downlink shared channel transmission opportunities in accordance with the SPS configuration.

Aspect 2: The method of aspect 1, further comprising: determining a first slot index for a first downlink shared channel transmission opportunity of the multiple downlink shared channel transmission opportunities associated with a first burst of the SPS configuration; and determining a second slot index for a second downlink shared channel transmission opportunity of the multiple downlink shared channel transmission opportunities associated with the first burst based at least in part on the first slot index and a SLIV included in a TDRA table entry indicated by the control signaling.

Aspect 3: The method of any of aspects 1 through 2, further comprising: determining a first feedback process identifier associated with a first downlink shared channel transmission opportunity of the multiple downlink shared channel transmission opportunities associated with a first burst of the SPS configuration according to a formula; determining a second feedback process identifier associated with a second downlink shared channel transmission opportunity of the multiple downlink shared channel transmission opportunities associated with the first burst based at least in part on incrementing the first feedback process identifier; and determining a third feedback process identifier associated with a first downlink shared channel transmission opportunity of the multiple downlink shared channel transmission opportunities associated with a second burst of the SPS configuration according to the formula.

Aspect 4: The method of any of aspects 1 through 3, further comprising: determining a first feedback process identifier associated with a first downlink shared channel transmission opportunity of the multiple downlink shared channel transmission opportunities associated with a first burst of the SPS configuration according to a formula; determining a second feedback process identifier associated with a second downlink shared channel transmission opportunity of the multiple downlink shared channel transmission opportunities associated with the first burst based at least in part on incrementing the first feedback process identifier; and determining a third feedback process identifier associated with a first downlink shared channel transmission opportunity of the multiple downlink shared channel transmission opportunities associated with a second burst of the SPS configuration based at least in part on incrementing a last feedback process identifier associated with a last downlink shared channel transmission opportunity of the multiple downlink shared channel transmission opportunities associated with the first burst.

Aspect 5: The method of any of aspects 1 through 4, further comprising: determining a first feedback process identifier associated with a first downlink shared channel transmission opportunity of the multiple downlink shared channel transmission opportunities associated with a first burst of the SPS configuration based at least in part on applying a first feedback process identifier offset value to a formula; determining a second feedback process identifier associated with a second downlink shared channel transmission opportunity of the multiple downlink shared channel transmission opportunities associated with the first burst based at least in part on applying a second feedback process identifier offset value to the formula; and determining a third feedback process identifier associated with a first downlink shared channel transmission opportunity of the multiple downlink shared channel transmission opportunities associated with a second burst of the SPS configuration based at least in part on applying the first feedback process identifier offset value to the formula.

Aspect 6: The method of any of aspects 1 through 5, further comprising: receiving, from the base station, DCI signaling comprising a feedback process identifier bit field configured with an index value indicating the SPS configuration, wherein the control signaling comprises RRC signaling; and activating the SPS configuration based at least in part on the feedback process identifier bit field of the DCI signaling configured with the index value indicating the SPS configuration, wherein receiving the downlink signaling is based at least in part on activating the SPS configuration.

Aspect 7: The method of aspect 6, further comprising: determining that the DCI signaling activates the SPS configuration further based at least in part on the DCI signaling comprising a RV bit field configured with at least a threshold quantity of initial bits set to zero, configured with all bits set to zero, or both.

Aspect 8: The method of any of aspects 6 through 7, further comprising: determining that the DCI signaling activates a subset of the multiple downlink shared channel transmission opportunities for the SPS configuration based at least in part on the DCI signaling comprising a RV bit field, wherein each downlink shared channel transmission opportunity of the subset is activated by a corresponding bit of the RV bit field.

Aspect 9: The method of any of aspects 6 through 8, further comprising: determining that the DCI signaling activates a subset of consecutive downlink shared channel transmission opportunities of the multiple downlink shared channel transmission opportunities for the SPS configuration based at least in part on the DCI signaling comprising a RV bit field, wherein the RV bit field comprises a quantity of consecutive bits set to zero indicating a corresponding quantity of the subset of consecutive downlink shared channel transmission opportunities activated based at least in part on the DCI signaling.

Aspect 10: The method of any of aspects 6 through 9, wherein the DCI signaling further comprises a new data indicator bit field indicating activation of the SPS configuration, activation of a subset of the multiple downlink shared channel transmission opportunities for the SPS configuration, or a retransmission grant.

Aspect 11: The method of any of aspects 6 through 10, further comprising: receiving second DCI signaling comprising a second feedback process identifier bit field configured with a second index value indicating the SPS configuration, wherein the second DCI signaling comprises deactivation DCI; and deactivating one or more of the multiple downlink shared channel transmission opportunities for the SPS configuration based at least in part on one or more bit values of a RV bit field of the second DCI signaling.

Aspect 12: The method of any of aspects 1 through 11, wherein receiving the downlink signaling in the downlink shared channel transmission opportunity comprises: receiving an initial portion of the downlink signaling in an initial downlink shared channel transmission opportunity of the multiple downlink shared channel transmission opportunities associated with a burst of the SPS configuration or in any downlink shared channel transmission opportunity of the multiple downlink shared channel transmission opportunities associated with the burst.

Aspect 13: The method of aspect 12, further comprising: receiving, from the base station, RRC signaling indicating that the downlink signaling is configured to start at the initial downlink shared channel transmission opportunity or at any downlink shared channel transmission opportunity, wherein receiving the initial portion of the downlink signaling is based at least in part on the RRC signaling.

Aspect 14: The method of any of aspects 1 through 13, further comprising: receiving, from the base station, DCI signaling indicating a release of the SPS configuration; transmitting, to the base station and in response to the DCI signaling indicating the release, an indication of an acknowledgment bit for the DCI signaling indicating the release; and releasing the SPS configuration based at least in part on the DCI signaling indicating the release.

Aspect 15: The method of aspect 14, further comprising: generating a codebook comprising the acknowledgment bit, wherein a location of the acknowledgment bit in the codebook corresponds to: a first downlink shared channel transmission opportunity of the multiple downlink shared channel transmission opportunities, a last downlink shared channel transmission opportunity of the multiple downlink shared channel transmission opportunities, a plurality of downlink shared channel transmission opportunities of the multiple downlink shared channel transmission opportunities, or a combination thereof for the SPS configuration, a TDRA field value included in the DCI signaling indicating the release, a same slot in which the DCI signaling indicating the release is received, or a combination thereof, wherein transmitting the indication of the acknowledgment bit is based at least in part on the generated codebook.

Aspect 16: The method of any of aspects 14 through 15, wherein the DCI signaling indicates a plurality of releases of a plurality of SPS configurations; and the indication of the acknowledgment bit corresponds to a first SPS configuration of the plurality of SPS configurations with an SPS configuration index value satisfying a threshold.

Aspect 17: A method for wireless communications at a base station, comprising: transmitting, to a UE, control signaling indicating an SPS configuration scheduling a burst of multiple downlink shared channel transmission opportunities within a time interval of the SPS configuration; and transmitting, to the UE, downlink signaling in a downlink shared channel transmission opportunity of the multiple downlink shared channel transmission opportunities in accordance with the SPS configuration.

Aspect 18: A method for wireless communications at a UE, comprising: receiving, from a base station, control signaling indicating a CG scheduling a burst of multiple uplink shared channel transmission opportunities within a time interval for the CG; and transmitting, to the base station, uplink signaling in an uplink shared channel transmission opportunity of the multiple uplink shared channel transmission opportunities in accordance with the CG.

Aspect 19: The method of aspect 18, further comprising: determining a first symbol index and a first slot index for a first uplink shared channel transmission opportunity of the multiple uplink shared channel transmission opportunities associated with a first burst of the CG; determining a second symbol index for a second uplink shared channel transmission opportunity of the multiple uplink shared channel transmission opportunities associated with the first burst based at least in part on a corresponding SLIV included in the control signaling; and determining a second slot index for the second uplink shared channel transmission opportunity based at least in part on the first slot index and a slot offset indicated by a TDRA table entry indicated by the control signaling.

Aspect 20: The method of any of aspects 18 through 19, further comprising: determining a first feedback process identifier associated with a first uplink shared channel transmission opportunity of the multiple uplink shared channel transmission opportunities associated with a first burst of the CG according to a formula and based at least in part on a first value for a feedback process identifier offset included in the formula, a quantity of activated uplink shared channel transmission opportunities of the multiple uplink shared channel transmission opportunities included in the formula, or both; determining a second feedback process identifier associated with a second uplink shared channel transmission opportunity of the multiple uplink shared channel transmission opportunities associated with the first burst based at least in part on incrementing the first feedback process identifier; and determining a third feedback process identifier associated with a first uplink shared channel transmission opportunity of the multiple uplink shared channel transmission opportunities associated with a second burst of the CG according to the formula and based at least in part on a second value for the feedback process identifier offset included in the formula, the quantity of activated uplink shared channel transmission opportunities included in the formula, or both.

Aspect 21: The method of any of aspects 18 through 20, further comprising: determining a first feedback process identifier associated with a first uplink shared channel transmission opportunity of the multiple uplink shared channel transmission opportunities associated with a first burst of the CG based at least in part on applying a first feedback process identifier offset value to a formula; determining a second feedback process identifier associated with a second uplink shared channel transmission opportunity associated with the first burst based at least in part on applying a second feedback process identifier offset value to the formula; and determining a third feedback process identifier associated with a first uplink shared channel transmission opportunity of the multiple uplink shared channel transmission opportunities associated with a second burst of the CG based at least in part on applying the first feedback process identifier offset value to the formula.

Aspect 22: The method of any of aspects 18 through 21, further comprising: receiving, from the base station, DCI signaling comprising a feedback process identifier bit field configured with an index value indicating the CG, wherein the control signaling comprises RRC signaling; and activating the CG based at least in part on the feedback process identifier bit field of the DCI signaling configured with the index value indicating the CG, wherein transmitting the uplink signaling is based at least in part on activating the CG.

Aspect 23: The method of aspect 22, further comprising: determining that the DCI signaling activates the CG further based at least in part on the DCI signaling comprising a RV bit field configured with at least a threshold quantity of initial bits set to zero, configured with all bits set to zero, or both.

Aspect 24: The method of any of aspects 22 through 23, further comprising: determining that the DCI signaling activates a subset of the multiple uplink shared channel transmission opportunities for the CG based at least in part on one or more bit values of a RV bit field included in the DCI signaling.

Aspect 25: The method of any of aspects 18 through 24, further comprising: receiving, from the base station, DCI signaling comprising a RV bit field configured with at least a threshold quantity of initial bits set to zero, configured with all bits set to zero, or both, the RV bit field indicating release of the CG; and releasing the CG based at least in part on the RV bit field of the DCI signaling.

Aspect 26: The method of any of aspects 18 through 25, wherein transmitting the uplink signaling in the uplink shared channel transmission opportunity comprises: transmitting an initial portion of the uplink signaling in an initial uplink shared channel transmission opportunity of the multiple uplink shared channel transmission opportunities associated with a burst of the CG or in any uplink shared channel transmission opportunity of the multiple uplink shared channel transmission opportunities associated with the burst.

Aspect 27: The method of aspect 26, further comprising: receiving, from the base station, RRC signaling indicating that the uplink signaling is configured to start at the initial uplink shared channel transmission opportunity or at any uplink shared channel transmission opportunity, wherein transmitting the initial portion of the uplink signaling is based at least in part on the RRC signaling.

Aspect 28: The method of any of aspects 18 through 27, further comprising: initiating one or more timers based at least in part on transmitting the uplink signaling, the one or more timers associated with the CG, wherein each timer of the one or more timers is initiated based at least in part on a respective uplink shared channel transmission opportunity in which the uplink signaling is transmitted for a burst of the CG or wherein the one or more timers initiated based at least in part on a last uplink shared channel transmission opportunity in which the uplink signaling is transmitted for the burst; and monitoring for feedback from the base station for a duration configured by the one or more timers based at least in part on the initiating.

Aspect 29: The method of any of aspects 18 through 28, further comprising: determining one or more repetition factors and a time domain pattern for the uplink signaling, wherein: the one or more repetition factors comprises a single repetition factor for each uplink shared channel transmission opportunity in which the uplink signaling is transmitted or the one or more repetition factors comprise a plurality of repetition factors corresponding to respective uplink shared channel transmission opportunities in which the uplink signaling is transmitted, the time domain pattern indicates to transmit each repetition for a first uplink shared channel transmission opportunity before transmitting a first repetition for a second uplink shared channel transmission opportunity or to transmit a first repetition for each uplink shared channel transmission opportunity before transmitting a second repetition for the first uplink shared channel transmission opportunity, and the uplink signaling is transmitted based at least in part on the one or more repetition factors and the time domain pattern.

Aspect 30: A method for wireless communications at a base station, comprising: transmitting, to a UE, control signaling indicating a CG scheduling a burst of multiple uplink shared channel transmission opportunities within a time interval for the CG; and receiving, from the UE, uplink signaling in an uplink shared channel transmission opportunity of the multiple uplink shared channel transmission opportunities in accordance with the CG.

Aspect 31: An apparatus for wireless communications at a UE, comprising a processor; and a memory coupled with the processor, wherein the memory comprises instructions executable by the processor to cause the apparatus to perform a method of any of aspects 1 through 16.

Aspect 32: An apparatus for wireless communications at a UE, comprising at least one means for performing a method of any of aspects 1 through 16.

Aspect 33: A non-transitory computer-readable medium storing code for wireless communications at a UE, the code comprising instructions executable by a processor to perform a method of any of aspects 1 through 16.

Aspect 34: An apparatus for wireless communications at a base station, comprising a processor; and a memory coupled with the processor, wherein the memory comprises instructions executable by the processor to cause the apparatus to perform a method of aspect 17.

Aspect 35: An apparatus for wireless communications at a base station, comprising at least one means for performing a method of aspect 17.

Aspect 36: A non-transitory computer-readable medium storing code for wireless communications at a base station, the code comprising instructions executable by a processor to perform a method of aspect 17.

Aspect 37: An apparatus for wireless communications at a UE, comprising a processor; and a memory coupled with the processor, wherein the memory comprises instructions executable by the processor to cause the apparatus to perform a method of any of aspects 18 through 29.

Aspect 38: An apparatus for wireless communications at a UE, comprising at least one means for performing a method of any of aspects 18 through 29.

Aspect 39: A non-transitory computer-readable medium storing code for wireless communications at a UE, the code comprising instructions executable by a processor to perform a method of any of aspects 18 through 29.

Aspect 40: An apparatus for wireless communications at a base station, comprising a processor; and a memory coupled with the processor, wherein the memory comprises instructions executable by the processor to cause the apparatus to perform a method of aspect 30.

Aspect 41: An apparatus for wireless communications at a base station, comprising at least one means for performing a method of aspect 30.

Aspect 42: A non-transitory computer-readable medium storing code for wireless communications at a base station, the code comprising instructions executable by a processor to perform a method aspect 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors; and
   one or more memories coupled with the one or more processors, wherein the one or more memories comprise instructions executable by the one or more processors to cause the apparatus to:
   receive control signaling indicating a semi-persistent scheduling configuration that schedules a burst of multiple downlink shared channel transmission opportunities to receive multiple separate downlink signals within a time interval of the semi-persistent scheduling configuration, wherein a respective downlink shared channel transmission opportunity of the multiple downlink shared channel transmission opportunities is scheduled for a respective downlink signal of the multiple separate downlink signals; and
   receive a downlink signal via a downlink shared channel transmission opportunity of the multiple downlink shared channel transmission opportunities in accordance with the semi-persistent scheduling configuration.

2. The apparatus of claim 1, wherein the instructions are further executable by the one or more processors to cause the apparatus to:
   determine a first slot index for a first downlink shared channel transmission opportunity of the multiple downlink shared channel transmission opportunities associated with a first burst of the semi-persistent scheduling configuration; and
   determine a second slot index for a second downlink shared channel transmission opportunity of the multiple downlink shared channel transmission opportunities associated with the first burst based at least in part on the first slot index and a start and length indicator value included in a time domain resource allocation table entry indicated by the control signaling.

3. The apparatus of claim 1, wherein the instructions are further executable by the one or more processors to cause the apparatus to:
   determine a first feedback process identifier associated with a first downlink shared channel transmission opportunity of the multiple downlink shared channel transmission opportunities associated with a first burst of the semi-persistent scheduling configuration according to a formula;
   determine a second feedback process identifier associated with a second downlink shared channel transmission opportunity of the multiple downlink shared channel transmission opportunities associated with the first burst based at least in part on incrementing the first feedback process identifier; and
   determine a third feedback process identifier associated with a first downlink shared channel transmission opportunity of the multiple downlink shared channel transmission opportunities associated with a second burst of the semi-persistent scheduling configuration according to the formula.

4. The apparatus of claim 1, wherein the instructions are further executable by the one or more processors to cause the apparatus to:

determine a first feedback process identifier associated with a first downlink shared channel transmission opportunity of the multiple downlink shared channel transmission opportunities associated with a first burst of the semi-persistent scheduling configuration according to a formula;

determine a second feedback process identifier associated with a second downlink shared channel transmission opportunity of the multiple downlink shared channel transmission opportunities associated with the first burst based at least in part on incrementing the first feedback process identifier; and determine a third feedback process identifier associated with a first downlink shared channel transmission opportunity of the multiple downlink shared channel transmission opportunities associated with a second burst of the semi-persistent scheduling configuration based at least in part on incrementing a last feedback process identifier associated with a last downlink shared channel transmission opportunity of the multiple downlink shared channel transmission opportunities associated with the first burst.

5. The apparatus of claim 1, wherein the instructions are further executable by the one or more processors to cause the apparatus to:

determine a first feedback process identifier associated with a first downlink shared channel transmission opportunity of the multiple downlink shared channel transmission opportunities associated with a first burst of the semi-persistent scheduling configuration based at least in part on applying a first feedback process identifier offset value to a formula;

determine a second feedback process identifier associated with a second downlink shared channel transmission opportunity of the multiple downlink shared channel transmission opportunities associated with the first burst based at least in part on applying a second feedback process identifier offset value to the formula; and determine a third feedback process identifier associated with a first downlink shared channel transmission opportunity of the multiple downlink shared channel transmission opportunities associated with a second burst of the semi-persistent scheduling configuration based at least in part on applying the first feedback process identifier offset value to the formula.

6. The apparatus of claim 1, wherein the instructions are further executable by the one or more processors to cause the apparatus to:

receive downlink control information signaling comprising a feedback process identifier bit field configured with an index value indicating the semi-persistent scheduling configuration, wherein the control signaling comprises radio resource control signaling; and activate the semi-persistent scheduling configuration based at least in part on the feedback process identifier bit field of the downlink control information signaling configured with the index value indicating the semi-persistent scheduling configuration, wherein receiving the downlink signal is based at least in part on activating the semi-persistent scheduling configuration.

7. The apparatus of claim 6, wherein the instructions are further executable by the one or more processors to cause the apparatus to:

determine that the downlink control information signaling activates the semi-persistent scheduling configuration further based at least in part on the downlink control information signaling comprising a redundancy version bit field configured with at least a threshold quantity of initial bits set to zero, configured with all bits set to zero, or both.

8. The apparatus of claim 6, wherein the instructions are further executable by the one or more processors to cause the apparatus to:

determine that the downlink control information signaling activates a subset of the multiple downlink shared channel transmission opportunities for the semi-persistent scheduling configuration based at least in part on the downlink control information signaling comprising a redundancy version bit field, wherein each downlink shared channel transmission opportunity of the subset is activated by a corresponding bit of the redundancy version bit field.

9. The apparatus of claim 6, wherein the instructions are further executable by the one or more processors to cause the apparatus to:

determine that the downlink control information signaling activates a subset of consecutive downlink shared channel transmission opportunities of the multiple downlink shared channel transmission opportunities for the semi-persistent scheduling configuration based at least in part on the downlink control information signaling comprising a redundancy version bit field, wherein the redundancy version bit field comprises a quantity of consecutive bits set to zero indicating a corresponding quantity of the subset of consecutive downlink shared channel transmission opportunities activated based at least in part on the downlink control information signaling.

10. The apparatus of claim 6, wherein the downlink control information signaling further comprises a new data indicator bit field indicating activation of the semi-persistent scheduling configuration, activation of a subset of the multiple downlink shared channel transmission opportunities for the semi-persistent scheduling configuration, or a retransmission grant.

11. The apparatus of claim 6, wherein the instructions are further executable by the one or more processors to cause the apparatus to:

receive second downlink control information signaling comprising a second feedback process identifier bit field configured with a second index value indicating the semi-persistent scheduling configuration, wherein the second downlink control information signaling comprises deactivation downlink control information; and deactivate one or more of the multiple downlink shared channel transmission opportunities for the semi-persistent scheduling configuration based at least in part on one or more bit values of a redundancy version bit field of the second downlink control information signaling.

12. The apparatus of claim 1, wherein the instructions to receive the downlink signal via the downlink shared channel transmission opportunity are executable by the one or more processors to cause the apparatus to:

receive an initial portion of the downlink signal via an initial downlink shared channel transmission opportunity of the multiple downlink shared channel transmission opportunities associated with the burst of the semi-persistent scheduling configuration or via any downlink shared channel transmission opportunity of the multiple downlink shared channel transmission opportunities associated with the burst.

13. The apparatus of claim 12, wherein the instructions are further executable by the one or more processors to cause the apparatus to:
receive radio resource control signaling indicating that the downlink signal is configured to start at the initial downlink shared channel transmission opportunity or at any downlink shared channel transmission opportunity, wherein receiving the initial portion of the downlink signal is based at least in part on the radio resource control signaling.

14. The apparatus of claim 1, wherein the instructions are further executable by the one or more processors to cause the apparatus to:
receive downlink control information signaling indicating a release of the semi-persistent scheduling configuration;
transmit in response to the downlink control information signaling indicating the release, an indication of an acknowledgment bit for the downlink control information signaling indicating the release; and
release the semi-persistent scheduling configuration based at least in part on the downlink control information signaling indicating the release.

15. The apparatus of claim 14, wherein the instructions are further executable by the one or more processors to cause the apparatus to:
generate a codebook comprising the acknowledgment bit, wherein a location of the acknowledgment bit in the codebook corresponds to:
a first downlink share channel transmission opportunity of the multiple downlink shared channel transmission opportunities, a last downlink shared channel transmission opportunity of the multiple downlink shared channel transmission opportunities, a plurality of downlink shared channel transmission opportunities of the multiple downlink shared channel transmission opportunities, or a combination thereof for the semi-persistent scheduling configuration,
a time domain resource allocation field value included in the downlink control information signaling indicating the release,
a same slot in which the downlink control information signaling indicating the release is received, or
a combination thereof, wherein transmitting the indication of the acknowledgment bit is based at least in part on the codebook.

16. The apparatus of claim 14, wherein:
the downlink control information signaling indicates a plurality of releases of a plurality of semi-persistent scheduling configurations; and
the indication of the acknowledgment bit corresponds to a first semi-persistent scheduling configuration of the plurality of semi-persistent scheduling configurations with a semi-persistent scheduling configuration index value satisfying a threshold.

17. An apparatus for wireless communications at a network device, comprising:
one or more processors; and
one or more memories coupled with the one or more processors, wherein the one or more memories comprise instructions executable by the one or more processors to cause the apparatus to:
transmit, to a user equipment (UE), control signaling indicating a semi-persistent scheduling configuration that schedules a burst of multiple downlink shared channel transmission opportunities to transmit multiple separate downlink signals within a time interval of the semi-persistent scheduling configuration, wherein a respective downlink shared channel transmission opportunity of the multiple downlink shared channel transmission opportunities is scheduled for a respective downlink signal of the multiple separate downlink signals; and
transmit, to the UE, a downlink signal via a downlink shared channel transmission opportunity of the multiple downlink shared channel transmission opportunities in accordance with the semi-persistent scheduling configuration.

18. An apparatus for wireless communications at a user equipment (UE), comprising:
one or more processors; and
one or more memories coupled with the one or more processors, wherein the one or more memories comprise instructions executable by the one or more processors to cause the apparatus to:
receive control signaling indicating a configured grant that schedules a burst of multiple uplink shared channel transmission opportunities to transmit multiple separate uplink signals within a time interval for the configured grant, wherein a respective uplink shared channel transmission opportunity of the multiple uplink shared channel transmission opportunities is scheduled for a respective uplink signal of the multiple separate uplink signals; and
transmit an uplink signal via an uplink shared channel transmission opportunity of the multiple uplink shared channel transmission opportunities in accordance with the configured grant.

19. The apparatus of claim 18, wherein the instructions are further executable by the one or more processors to cause the apparatus to:
determine a first symbol index and a first slot index for a first uplink shared channel transmission opportunity of the multiple uplink shared channel transmission opportunities associated with a first burst of the configured grant;
determine a second symbol index for a second uplink shared channel transmission opportunity of the multiple uplink shared channel transmission opportunities associated with the first burst based at least in part on a corresponding start and length indicator value included in the control signaling; and
determine a second slot index for the second uplink shared channel transmission opportunity based at least in part on the first slot index and a slot offset indicated by a time domain resource allocation table entry indicated by the control signaling.

20. The apparatus of claim 18, wherein the instructions are further executable by the one or more processors to cause the apparatus to:
determine a first feedback process identifier associated with a first uplink shared channel transmission opportunity of the multiple uplink shared channel transmission opportunities associated with a first burst of the configured grant according to a formula and based at least in part on a first value for a feedback process identifier offset included in the formula, a quantity of activated uplink shared channel transmission opportunities of the multiple uplink shared channel transmission opportunities included in the formula, or both;
determine a second feedback process identifier associated with a second uplink shared channel transmission opportunity of the multiple uplink shared channel transmission opportunities associated with the first burst based at least in part on incrementing the first feedback process identifier; and determine a third feedback process identifier associated with a first uplink shared channel transmission opportunity of the multiple uplink shared channel transmission opportunities associated with a second burst of the configured grant according to the formula and based at least in part on a second value for the feedback process identifier offset included in the formula, the quantity of activated uplink shared channel transmission opportunities included in the formula, or both.

21. The apparatus of claim 18, wherein the instructions are further executable by the one or more processors to cause the apparatus to:

determine a first feedback process identifier associated with a first uplink shared channel transmission opportunity of the multiple uplink shared channel transmission opportunities associated with a first burst of the configured grant based at least in part on applying a first feedback process identifier offset value to a formula;

determine a second feedback process identifier associated with a second uplink shared channel transmission opportunity associated with the first burst based at least in part on applying a second feedback process identifier offset value to the formula; and determine a third feedback process identifier associated with a first uplink shared channel transmission opportunity of the multiple uplink shared channel transmission opportunities associated with a second burst of the configured grant based at least in part on applying the first feedback process identifier offset value to the formula.

22. The apparatus of claim 18, wherein the instructions are further executable by the one or more processors to cause the apparatus to:

receive downlink control information signaling comprising a feedback process identifier bit field configured with an index value indicating the configured grant, wherein the control signaling comprises radio resource control signaling; and activate the configured grant based at least in part on the feedback process identifier bit field of the downlink control information signaling configured with the index value indicating the configured grant, wherein transmitting the uplink signal is based at least in part on activating the configured grant.

23. The apparatus of claim 22, wherein the instructions are further executable by the one or more processors to cause the apparatus to:

determine that the downlink control information signaling activates the configured grant further based at least in part on the downlink control information signaling comprising a redundancy version bit field configured with at least a threshold quantity of initial bits set to zero, configured with all bits set to zero, or both.

24. The apparatus of claim 22, wherein the instructions are further executable by the one or more processors to cause the apparatus to:

determine that the downlink control information signaling activates a subset of the multiple uplink shared channel transmission opportunities for the configured grant based at least in part on one or more bit values of a redundancy version bit field included in the downlink control information signaling.

25. The apparatus of claim 18, wherein the instructions are further executable by the one or more processors to cause the apparatus to:

receive downlink control information signaling comprising a redundancy version bit field configured with at least a threshold quantity of initial bits set to zero, configured with all bits set to zero, or both, the redundancy version bit field indicating release of the configured grant; and release the configured grant based at least in part on the redundancy version bit field of the downlink control information signaling.

26. The apparatus of claim 18, wherein the instructions to transmit the uplink signal via the uplink shared channel transmission opportunity are executable by the one or more processors to cause the apparatus to:

transmit an initial portion of the uplink signal via an initial uplink shared channel transmission opportunity of the multiple uplink shared channel transmission opportunities associated with the burst of the configured grant or via any uplink shared channel transmission opportunity of the multiple uplink shared channel transmission opportunities associated with the burst.

27. The apparatus of claim 26, wherein the instructions are further executable by the one or more processors to cause the apparatus to:

receive radio resource control signaling indicating that the uplink signal is configured to start at the initial uplink shared channel transmission opportunity or at any uplink shared channel transmission opportunity, wherein transmitting the initial portion of the uplink signal is based at least in part on the radio resource control signaling.

28. The apparatus of claim 18, wherein the instructions are further executable by the one or more processors to cause the apparatus to:

initiate one or more timers based at least in part on transmitting the uplink signal, the one or more timers associated with the configured grant, wherein each timer of the one or more timers is initiated based at least in part on the respective uplink shared channel transmission opportunity via which the uplink signal is transmitted for the burst of the configured grant or wherein the one or more timers are initiated based at least in part on a last uplink shared channel transmission opportunity via which the uplink signal is transmitted for the burst; and monitor for feedback for a duration configured by the one or more timers based at least in part on initiation of the one or more timers.

29. The apparatus of claim 18, wherein the instructions are further executable by the one or more processors to cause the apparatus to:

determine one or more repetition factors and a time domain pattern for the uplink signal, wherein:

the one or more repetition factors comprises a single repetition factor for each uplink shared channel transmission opportunity via which the uplink signal is transmitted or the one or more repetition factors comprise a plurality of repetition factors corresponding to respective uplink shared channel transmission opportunities via which the uplink signal is transmitted, the time domain pattern indicates to transmit each repetition for a first uplink shared channel transmission opportunity before transmitting a first repetition for a second uplink shared channel transmission opportunity or to transmit a first repetition for each uplink shared channel transmission opportunity before transmitting a second repetition for the first uplink shared channel transmission opportunity, and the uplink signal is transmitted based at least in part on the one or more repetition factors and the time domain pattern.

30. An apparatus for wireless communications at a network device, comprising:

one or more processors; and one or more memories coupled with the one or more processors, wherein the one or more memories comprise instructions executable by the one or more processors to cause the apparatus to:

transmit, to a user equipment (UE), control signaling indicating a configured grant that schedules a burst of multiple uplink shared channel transmission opportunities to receive multiple separate uplink signals within a time interval for the configured grant, wherein a respective uplink shared channel transmission opportunity of the multiple uplink shared channel transmission opportunities is scheduled for a respective uplink signal of the multiple separate uplink signals; and receive, from the UE, an uplink signal via an uplink shared channel transmission opportunity of the multiple uplink shared channel transmission opportunities in accordance with the configured grant.

* * * * *